US011390721B2

(12) United States Patent
Alexanian et al.

(10) Patent No.: US 11,390,721 B2
(45) Date of Patent: Jul. 19, 2022

(54) REGIOSELECTIVE C-H XANTHYLATION AS A PLATFORM TECHNOLOGY FOR POLYMER FUNCTIONALIZATION

(71) Applicant: The University of North Carolina at Chapel Hill, Chapel Hill, NC (US)

(72) Inventors: Erik Alexanian, Chapel Hill, NC (US); Frank Albert Leibfarth, Carrboro, NC (US); Jill Williamson, Chapel Hill, NC (US); Will Czaplyski, Cambridge, MA (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 139 days.

(21) Appl. No.: 16/753,390

(22) PCT Filed: Oct. 3, 2018

(86) PCT No.: PCT/US2018/054220
§ 371 (c)(1),
(2) Date: Apr. 3, 2020

(87) PCT Pub. No.: WO2019/070889
PCT Pub. Date: Apr. 11, 2019

(65) Prior Publication Data
US 2021/0332206 A1    Oct. 28, 2021

Related U.S. Application Data

(60) Provisional application No. 62/656,156, filed on Apr. 11, 2018, provisional application No. 62/567,460, filed on Oct. 3, 2017.

(51) Int. Cl.
| | |
|---|---|
| *C08J 7/12* | (2006.01) |
| *C08F 10/02* | (2006.01) |
| *C08F 10/06* | (2006.01) |
| *C08F 10/10* | (2006.01) |
| *C08G 63/91* | (2006.01) |
| *C08G 64/42* | (2006.01) |
| *C08G 65/334* | (2006.01) |

(52) U.S. Cl.
CPC ............ *C08J 7/12* (2013.01); *C08F 10/02* (2013.01); *C08F 10/06* (2013.01); *C08F 10/10* (2013.01); *C08G 63/912* (2013.01); *C08G 64/42* (2013.01); *C08G 65/3348* (2013.01); *C08F 2810/00* (2013.01); *C08J 2323/26* (2013.01); *C08J 2323/36* (2013.01); *C08J 2367/04* (2013.01); *C08J 2369/00* (2013.01); *C08J 2371/02* (2013.01)

(58) Field of Classification Search
CPC ....... C07C 333/00; C08J 7/12; C08J 2323/26; C08J 2323/36; C08J 2367/04; C08J 2369/00; C08J 2371/02; C08F 10/02; C08F 10/06; C08F 8/34; C08F 8/30; C08F 10/10; C08F 2810/00; C08G 63/912; C08G 64/42; C08G 65/3348
See application file for complete search history.

(56) References Cited

FOREIGN PATENT DOCUMENTS

| DE | 4333681 A1 * | 4/1995 | ............. C08F 28/02 |
|---|---|---|---|
| JP | 2007-00203 8 A | 1/2007 | |
| WO | WO 2008/103144 A1 | 8/2008 | |

OTHER PUBLICATIONS

Translation of DE 4333681 (Year: 1995).*
Derouet, European Polymer Journal, 43 (2007) p. 1806-1824 (Year: 2007).*
Nakai, Bulletin of the Chemical Society of Japan, vol. 42, p. 508-512 (1969) (Year: 1969).*
Nakagawa, Journal of Applied Polymer Science, vol. 15, p. 747-758 (1971) (Year: 1971).*
Bunescu et al., "Catalytic Hydroxylation of Polyethylenes," ACS Cent. Sci., 3(8):895-903, (2017).
Chu and Rovis, "Amide-directed photoredox-catalysed C-C bond formation at unactivated sp3 C-H bonds," Nature, 539(7628):272-275, (2016).
Czaplyski et al., "C-H Xanthylation: A Synthetic Platform for Alkane Functionalization," J. Am. Chem. Soc., 138(42):13854-13857, (2016).
Derouet et al., "Synthesis of N,N-diethyldithiocarbamate functionalized 1,4-polyisoprene, from natural rubber and synthetic 1,4-polyisoprene," European Polymer Journal, 43:1806-1824, (2007).
Harrisson et al., "RAFT Polymerization of Vinyl Esters: Synthesis and Applications," Polymers, 6:1437-1488, (2014).
Moad, G., "The synthesis of polyolefin graft copolymers by reactive extrusion," Prog. Polvm. Sci., 24(11:81-142, (1999).
Moad et al., "Living Radical Polymerization by the RAFT Process—A First Update," Aust. J. Chem., 59(10):669-692, (2006).
Quinn et al., "Site-Selective Aliphatic C-H Chlorination Using N-Chloroamides Enables a Synthesis of Chlorolissoclimide," Journal of the American Chemical Society, 138(2):696-702, (2016).
Williamson et al., "Regioselective C-H Xanthylation as a Platform for Polyolefin Functionalization," Angew. Chem. Int. Ed., 57:6261-6265, (2018).
Yang et al., "Advances in catalytic enantioselective fluorination, mono-, di-, and trifluoromethylation, and trifluoromethylthiolation reactions," Chem. Rev., 115(2):826-870, (2015).
International Search Report and Written Opinion in International Application No. PCT/US2018/054220, dated Jan. 29, 2019.
Bae et al., "Catalytic hydroxylation of polypropylenes," j. Am. Chern. Soc., 127(2):767-776, (2005).
Blanksby and Ellison, "Bond dissociation energies of organic molecules," Accounts of Chemical Research, 36(4):255-263, (2003).
Boaen and Hillmyer, "Post-polymerization functionalization of polyolefins," Chem. Soc. Rev., 34(3):267-275, (2005).

(Continued)

*Primary Examiner* — Robert C Boyle
(74) *Attorney, Agent, or Firm* — Alston & Bird LLP

(57) ABSTRACT

The subject matter described herein relates to methods for polymer xanthylation and the xanthylated polymers produced by such methods. Subsequent replacement of the xanthylate moiety allows facile entry into functionalized polymers.

28 Claims, 15 Drawing Sheets

(56) References Cited

OTHER PUBLICATIONS

Boaen and Hillmyer, "Selective and Mild Oxyfunctionalization of Model Polyolefins," Macromolecules, 36(19):7027-7034, (2003).
Chung, T.C. Mike, Functionalization of Polyolefins, Academic Press: London, pp. 9-17, (2002).
Depuy and King, "Pyrolytic Cis Eliminations," Chem. Rev., 60(5):431-457, (1960).
Foster et al., "Oxidation behavior and stabilization of metallocene and other polyolefins," Die Angew. Makro. Chemie., 252(1):11-32, (1997).
Gagosz et al., "A new tin-free source of amidyl radicals," Org. Lett., 4(16):2707-2709, (2002).
Kondo et al., "Rhodium-catalyzed, regiospecific functionalization of polyolefins in the melt," Journal of the American Chemical Society, 124(7):1164-1165, (2002).
Le Neindre and Nicolay, "One-pot deprotection and functionalization of polythiol copolymers via six different thiol-X reactions," Polym Int., 63(5):887-893, (2013).
Le Neindre and Nicolay, "Polythiol copolymers with precise architectures: a platform for functional materials," Polym Chem., 5(16):46014611, (2014).
Lin et al., "Cross-Linked Polypropylene Prepared by PP Copolymers Containing Flexible Styrene Groups," Macromolecules, 42(11):3750-3754, (2009).
Liu and Bielawski, "Direct azidation of isotactic polypropylene and synthesis of 'grafted to' derivatives thereof using azide-alkyne cycloaddition chemistry," Polym Int., 66(1):70-76, (2016).
Nguyen and Knowles, "Catalytic C-N Bond-Forming Reactions Enabled by Proton-Coupled Electron Transfer Activation of Amide N-H Bonds," ACS Catal., 6(5):2894-2903, (2016).
Schmidt et al., "Site-selective aliphatic C-H bromination using N-bromoamides and visible light," Journal of the Americal Chemical Society, 136(41):14389-14392, (2014).
Shao et al., "Shelf-stable electrophilic reagents for trifluoromethylthiolation," Accounts of Chemical Research, 48(5):1227-1236, (2015).
Zard, Samir Z., "On the Trail of Xanthates: Some New Chemistry from an Old Functional Group," Angew Chem. Int. Ed., 36(7):672-685, (1997).
Zhang et al., "Synthesis and Characterization of Maleic Anhydride Grafted Polypropylene with a Well-Defined Molecular Structure," Macromolecules, 46(11):4313-4323, (2013).
Zhou et al., "Dependence of Thermal Stability on Molecular Structure of RAFT/MADIX Agents: A Kinetic and Mechanistic Study," Macromolecules, 44(21):8446-8457, (2011).

\* cited by examiner

FIG. 8C
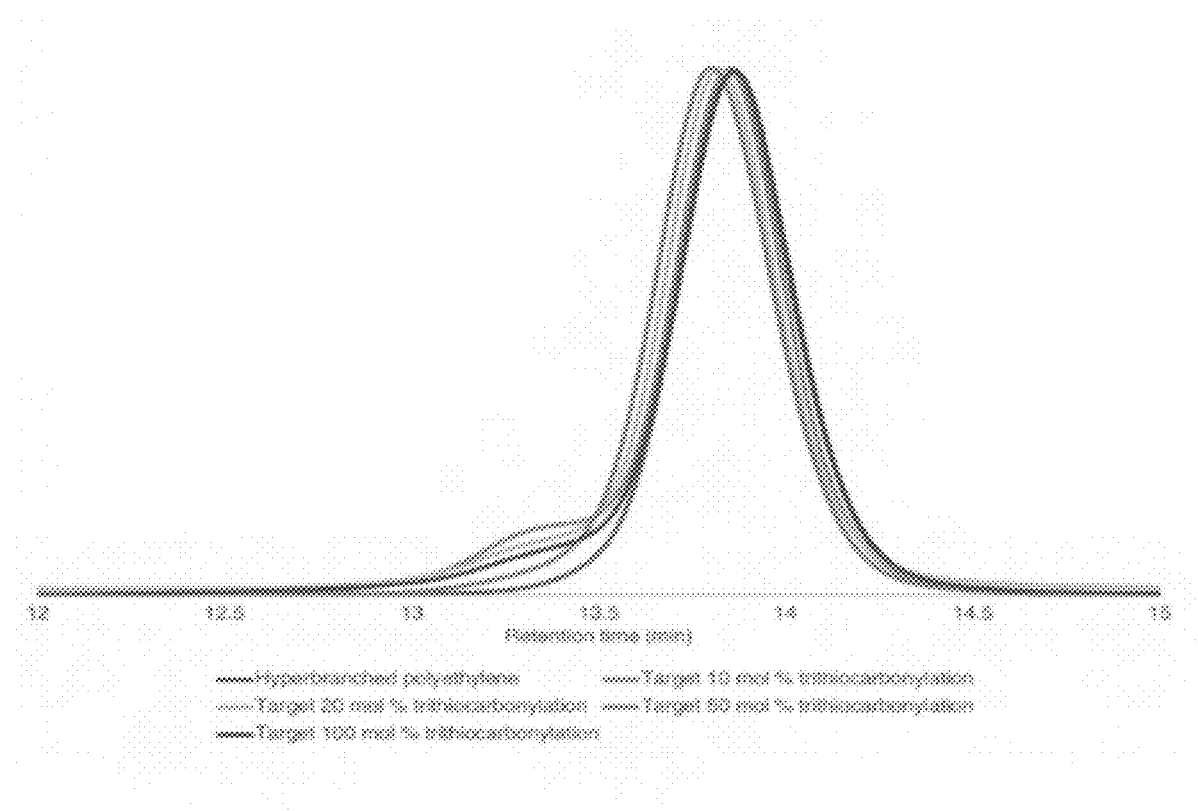
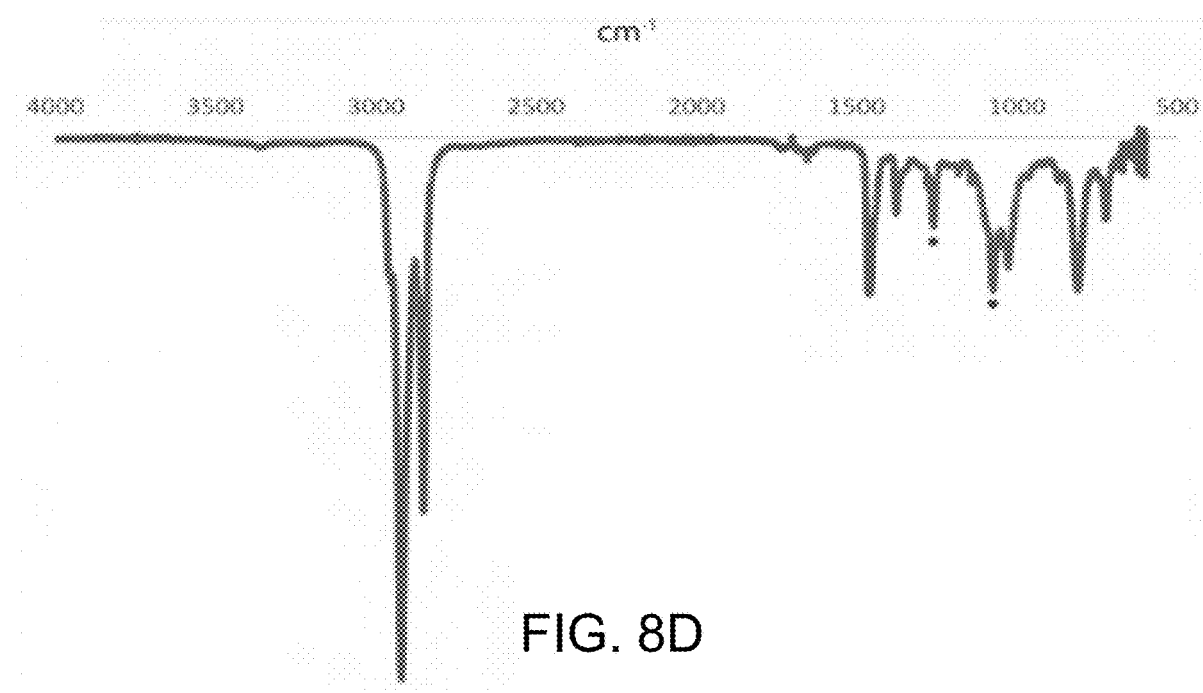
FIG. 8D

REGIOSELECTIVE C-H XANTHYLATION AS A PLATFORM TECHNOLOGY FOR POLYMER FUNCTIONALIZATION

CROSS-REFERENCE TO RELATED APPLICATIONS

This application is a national stage application filed under 35 U.S.C. § 371 of International Application No. PCT/US2018/054220 with an international filing date of Oct. 3, 2018, which claims the benefit of and priority to U.S. Provisional Patent Application Nos. 62/567,460, filed on Oct. 3, 2017, and 62/656,156, filed on Apr. 11, 2018, the entire contents of each of which are incorporated herein by reference.

GOVERNMENT INTEREST

This invention was made with government support under Grant Number GM120163 awarded by the National Institutes of Health. The government has certain rights in the invention.

FIELD OF THE INVENTION

The subject matter described herein relates to methods for polymer xanthylation and subsequent functionalization of the xanthylated polymers produced by such methods.

BACKGROUND

Polymers have and will continue to help to solve society's rapidly developing needs and show enormous potential for the development of new technologies. As such, the future of polymer chemistry will be influenced by the elaboration of new functional polymers.

Polyolefins are high-volume, low-cost engineering thermoplastics with high tensile strength, low density, attractive chemical resistance, and excellent processability. Currently, polyolefins constitute nearly 60% of world polymer production. For their ubiquity, however, these polyolefins do not typically interface with other materials, drastically limiting their ability to form composites, coatings, adhesives, or to be used in high-performance engineering applications.[1]

In addition to polyolefins, polyethers, polyesters, and polycarbonates containing at least one $sp^3$ hybridized carbon per repeat unit are some of the most versatile polymer classes known. Polyethers offer a variety of commercial applications in diverse industries such as construction, cosmetics, and biomedicine. Despite the current utility of polyethers, their amorphous, biocompatible, and non-ionic nature severely limits their use in other applications. Polyesters and polycarbonates are also important in a wide-variety of applications, including packaging, textiles, and food storage, but require functionality on their polymer backbone for further developmental use. Imparting functionality onto these polymers without comprising the desirable properties of the parent material would uncover new and unusual properties with which they are not typically associated.[2]

The C-H functionalization of polymers is an appealing approach to modify material properties while leveraging the high-volume production of current commercial infrastructure. This method requires no polymerization development, uses commercially available or known polymers, and holds the potential to introduce nearly any functionality desired. A general strategy for polymer C-H functionalization would: 1) diversify material properties; 2) uncover unprecedented material properties; and 3) upcycle plastic waste. The first goal involves a methodology to transform a single parent polymer into a variety of materials with unique properties, providing a platform to enhance the value of existing materials. The second goal encompasses a modular and general strategy to modify many commercial polymers with otherwise difficult-to-install functionality, uncovering new material properties not accessible through traditional synthetic routes. The third goal requires performing chemical modification that results in materials that are of higher value than the original polymer, thus, expanding the potential applications of post-industrial or post-consumer polymer waste.

The subject matter described herein achieves the above-mentioned goals by providing a method of direct C-H functionalization of polyolefins, polyethers, polyesters, and polycarbonates to install xanthate groups on the polymer backbone in a regioselective manner. This functionalization is demonstrated both photochemically and thermally and occurs without polymer chain degradation and results in minimal change to the molecular weight distribution of the material.

BRIEF SUMMARY

An aspect of the subject matter described herein relates to a method for xanthylating a polymer, said method comprising:

contacting a polymer selected from the group consisting of polyolefins, polyesters, polycarbonates, and polyesters with a compound of Formula I

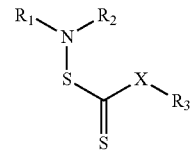

wherein $R_1$ is aryl, heteroaryl, $-COR_4$, or $-SO_2R_4$, wherein said aryl or heteroaryl can be optionally substituted, and wherein $R_4$ is optionally substituted linear or branched $C_{1-6}$ alkyl, aryl, heteroaryl, cycloalkyl, or heterocycloalkyl;

$R_2$ is optionally substituted linear or branched $C_{1-6}$ alkyl, aryl, heteroaryl, cycloalkyl, or heterocycloalkyl;

$R_3$ is optionally substituted linear or branched $C_{1-6}$ alkyl, aryl, or heteroaryl; and X is a bond, $-O-$, $-S-$, or $-NR^5$, wherein $R^5$ is optionally substituted linear or branched $C_{1-6}$ alkyl, to form a xanthylated polymer.

Another aspect of the subject matter described herein is a xanthylated polymer comprising at least one structural unit of Formula II

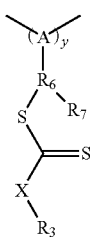

wherein y is an integer with a value between 1 and 1,000,000;

$R_6$ is a bond, or substituted linear or branched $C_{1-15}$ alkyl;

$R_7$ is absent or present, and when present is hydrogen or substituted linear or branched $C_{1-15}$ alkyl;

X is a bond, —O—, —S—, or —$NR^5$, wherein $R^5$ is optionally substituted linear or branched $C_{1-6}$ alkyl;

$R_3$ is optionally substituted linear or branched $C_{1-6}$ alkyl, aryl, or heteroaryl;

A is a repeat unit of a polymer covalently bound to the xanthate, selected from

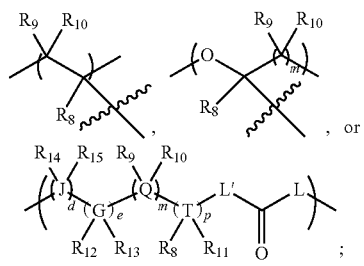

$R_8$, $R_9$, $R_{10}$, $R_{11}$, $R_{12}$, $R_{13}$, $R_{14}$, and $R_{15}$ in each instance, are absent or present, and when present are independently selected from hydrogen or optionally substituted linear or branched $C_{1-6}$ alkyl;

L and L' are each independently a bond or O;

J, G, Q, and T are independently selected from carbon, oxygen, (C—O), arene, or cycloalkane;

d, e, m and p, in each instance, are independently an integer between 0 and 20;

wherein at least one of d, e, m, and p is other than 0;

where at least one of J, G, Q, and T is a carbon covalently bound to $R_6$; and where the wavy line denotes the point of attachment of $R_6$ to the polymer backbone.

BRIEF DESCRIPTION OF THE FIGURES

FIG. 8C shows characterization of 2 mol % trithiocarbonylated hyperbranched polyethylene by gel permeation chromatography in THF compared against polystyrene standards.

FIG. 8D shows characterization of 2 mol % trithiocarbonylated hyperbranched polyethylene by infrared spectroscopy with distinct peaks at 1076 and 1262 $cm^1$.

DETAILED DESCRIPTION

Figure 1:
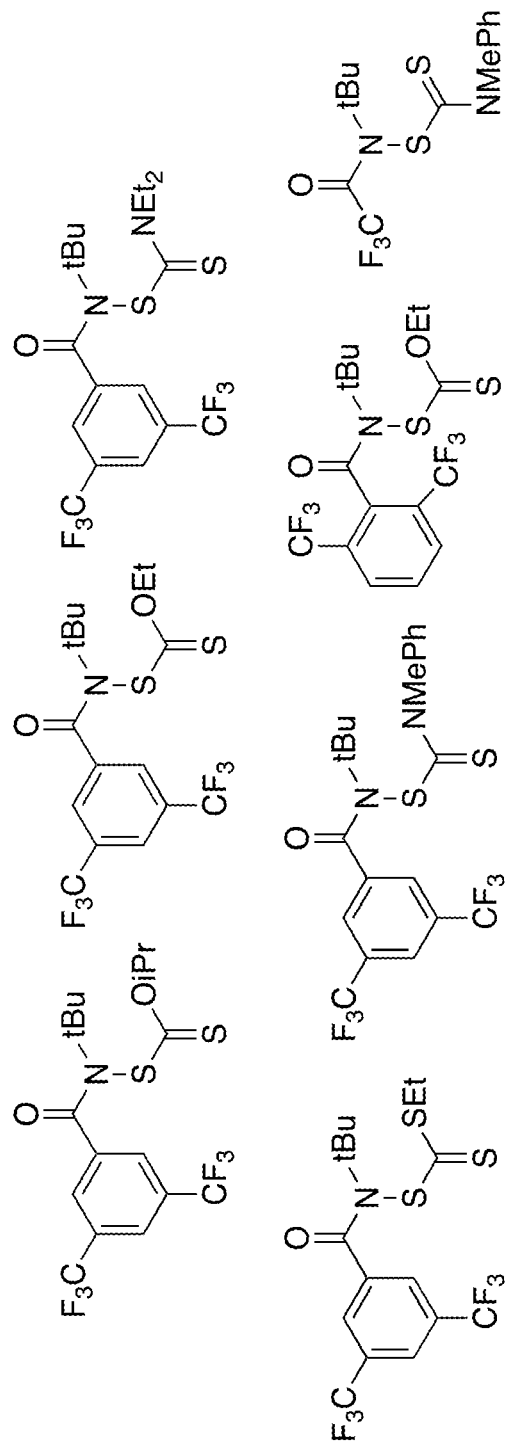
FIG. 1 shows several reagents used for functionalization of polymeric hydrocarbons.

Post-polymerization modification is an ideal avenue to transform inexpensive polymers into functional materials. This approach takes advantage of optimized commercial processes and imparts functionality statistically along the polymer backbone.

Commercially, post-polymerization modification of polyolefins relies on C—H bond homolysis, which is conducted using free radicals generated by the thermal decomposition of peroxides (>150° C.), and subsequent trapping the resulting carbon-centered radical with maleic anhydride or other α,β-unsaturated esters.[3] For branched polyolefins such as polypropylene, polybutene, linear low-density polyethylene (LLDPE), and poly(ethylene-alt-propylene), reactive grafting or crosslinking leads to preferential homolysis of tertiary C—H bonds that results in side reactions such as β-scission and isomerization. These deleterious processes rapidly degrade the molecular weight and, thus, the desirable physical properties of the polyolefin. For instance, maleic anhydride content for grafted polypropylene is inversely proportional to molecular weight and the final product is a complicated deep red mixture that requires extensive purification.[4]

Recent studies have sought to functionalize branched polyolefins without coincident chain degradation. Liu and Bielawski reported the azidation of isotactic polypropylene (i-PP) through an oxidative pathway, although the method still suffered from a decrease in both molecular weight and melting temperature ($T_m$) during reaction Transition metal catalyzed C—H activation has also been explored. Boaen and Hillmyer employed a manganese porphyrin catalyst for the functionalization of C—H bonds in a branched polyolefin using oxone as a terminal oxidant.[6] They reported up to 5 mol % oxidation of the polyolefin to a tertiary alcohol or ketone mix with interchain coupling observed. Hartwig and Hillmyer reported the rhodium-catalyzed borylation of a variety of branched polyolefins.[7,8] This is one of the only reported methodologies where the regioselectivity is reagent controlled and selective for primary carbons along the polymer. The pinacolborane functionality was converted to an alcohol through oxidation with hydrogen peroxide, providing polyolefins with up to 20 mol % functionalization. However, at higher levels of functionalization, crosslinking was observed during the oxidation step. Hartwig and coworkers have reported a nickel-catalyzed oxidation employing stoichiometric meta-chloroperoxybenzoic acid to install a mixture of hydroxyl, ketone, and chloride functionality onto polyethylene.[9] Importantly, for all metal-catalyzed processes, minimization of catalyst byproduct in the final polymer is imperative due to oxidative degradation processes that can be catalyzed by these byproducts.[10] A further limitation is that only a narrow set of chemical functionalities is accessible through previous methodologies, which limits the accessible properties and subsequent utility.

In addition to polyolefins, the potential of polyethers as functional materials has only recently been recognized through the synthesis of end-functional and hetero-bifunctional polyethers as linkers for disparate moieties. These seemingly simple chemical modifications have enabled coupling of poly(ethylene glycol) (PEG) to biotherapuetics and has already resulted in 12 clinically approved therapies. Even in these instances, however, the end-groups are the primary sites for chemical diversification and rarely is functionality located on the polymer backbone. A similar situation exists for polycarbonates and polyesters. A copolymerization strategy can incorporate limited functionality onto the polymer, but the functional group incompatibility of the polymerization conditions limits accessible materials, and the resulting polymers contain an uneven distribution of functionality due differences in copolymerization kinetics.

An alternative strategy is the direct, C—H functionalization of the polymer itself. This would require no polymerization development, would use commercially available or known polyethers, and holds the potential to introduce any functionality desired. Such approaches are virtually unexplored in polymer synthesis, however. The only previously reported systems involved oxidations with highly reactive hydroxyl radicals or metal-based oxidants, to provide polymers with hemiacetal or ester functionality, respectively. In both of these cases, significant degradation of the polyether backbone was observed. There is a clear need for new approaches to a polyether functionalization that avoid chain degradation and deliver new functionality in a practical and predictable fashion.

Described herein are new approaches toward the functionalization of polymers, including polyolefins, polyethers, polyesters, and polycarbonates under mild and metal-free reaction conditions comprising the use of N-xanthylamide compounds of Formula I.

The regioselectivity of the xanthylamide C—H bond functionalization prevents degradation of polymers during the xanthylation reaction. Significantly, adjusting the stoichiometry of a compound of Formula I in relation to the polymer enables the method to target and tune the extent of xanthylation. Further, the versatility of the xanthate functional group provides access to a wide variety of valuable polymer functionality from a single xanthylated polymer precursor. Accordingly, also described herein are N-xanthylamide compounds of Formula I and methods for the preparation of such N-xanthylamides.

Further described are new methods of achieving polymer functionalization through photochemically- and thermally-initiated xanthylation. Thermal inI itation involves the use of peroxides at temperatures <150° C. to achieve functionalization. The lower temperature imparted in this method makes it not only more energy-efficient, but also more cost-effective.

Application of the xanthylation methods described herein to commercial polymers shows the methods enhance the utility of lightweight thermoplastics and provide access to improved polymer properties.

The presently disclosed subject matter will now be described more fully hereinafter. However, many modifications and other embodiments of the presently disclosed subject matter set forth herein will come to mind to one skilled in the art to which the presently disclosed subject matter pertains having the benefit of the teachings presented in the foregoing descriptions. Therefore, it is to be understood that the presently disclosed subject matter is not to be limited to the specific embodiments disclosed and that modifications and other embodiments are intended to be included within the scope of the appended claims. In other words, the subject matter described herein covers all alternatives, modifications, and equivalents. In the event that one or more of the incorporated literature, patents, and similar materials differs from or contradicts this application, including but not limited to defined terms, term usage, described techniques, or the like, this application controls. Unless otherwise defined, all technical and scientific terms used herein have the same meaning as commonly understood by one of ordinary skill in this field. All publications, patent applications, patents, and other references mentioned herein are incorporated by reference in their entirety.

I. Definitions

The term "substituent" refers to an atom or a group of atoms that replaces a hydrogen atom on a molecule. The term "substituted" denotes that a specified molecule bears one or more substituents. The term "a compound of the formula" or "a compound of formula" or "compounds of the formula" or "compounds of formula" refers to any compound selected from the genus of compounds as defined by Formula I.

As used herein, the term "alkyl" refers to a straight-chained or branched hydrocarbon group. Examples of alkyl groups include methyl, ethyl, n-propyl, isopropyl, tert-butyl, and n-pentyl. Alkyl groups may be optionally substituted with one or more substituents.

The term "alkoxy" refers to an —O-alkyl radical. Alkoxy groups may be optionally substituted with one or more substituents.

"Acyl" as used herein alone or as part of another group refers to a —C(O)R radical, where R is any suitable substituent such as aryl, alkyl, alkenyl, alkynyl, cycloalkyl or other suitable substituent as described herein.

The term "acylamino" refers to an amino substituent which is further substituted with a —CO—R group. Examples of acylamino groups include acetamido and 2-phenylacetamido.

As used herein, the term "halogen", "hal" or "halo" means —F, —Cl, —Br or —I.

The term "cycloalkyl" refers to a hydrocarbon 3-8 membered monocyclic or 7-14 membered bicyclic ring system having at least one saturated ring or having at least one non-aromatic ring, wherein the non-aromatic ring may have some degree of unsaturation. Cycloalkyl groups may be optionally substituted with one or more substituents. In one embodiment, 0, 1, 2, 3, or 4 atoms of each ring of a cycloalkyl group may be substituted by a substituent. Representative examples of cycloalkyl group include cyclopropyl, cyclopentyl, cyclohexyl, cyclobutyl, cycloheptyl, cyclopentenyl, cyclopentadienyl, cyclohexenyl, cyclohexadienyl, and the like.

The term "aryl" refers to a hydrocarbon monocyclic, bicyclic or tricyclic aromatic ring system. Aryl groups may be optionally substituted with one or more substituents. In one embodiment, 0, 1, 2, 3, 4, 5 or 6 atoms of each ring of an aryl group may be substituted by a substituent. Examples of aryl groups include phenyl, naphthyl, anthracenyl, fluorenyl, indenyl, azulenyl, and the like.

The term "heteroaryl" refers to an aromatic 5-8 membered monocyclic, 8-12 membered bicyclic, or 11-14 membered tricyclic ring system having 1-4 ring heteroatoms if monocyclic, 1-6 heteroatoms if bicyclic, or 1-9 heteroatoms if tricyclic, said heteroatoms selected from O, N, or S, and the remainder ring atoms being carbon (with appropriate hydrogen atoms unless otherwise indicated). Heteroaryl groups may be optionally substituted with one or more substituents. In one embodiment, 0, 1, 2, 3, or 4 atoms of each ring of a heteroaryl group may be substituted by a substituent. Examples of heteroaryl groups include pyridyl, furanyl, thienyl, pyrrolyl, oxazolyl, oxadiazolyl, imidazolyl, thiazolyl, isoxazolyl, quinolinyl, pyrazolyl, isothiazolyl, pyridazinyl, pyrimidinyl, pyrazinyl, triazinyl, isoquinolinyl, indazolyl, and the like.

The term "heterocycloalkyl" refers to a nonaromatic 3-8 membered monocyclic, 7-12 membered bicyclic, or 10-14 membered tricyclic ring system comprising 1-3 heteroatoms if monocyclic, 1-6 heteroatoms if bicyclic, or 1-9 heteroatoms if tricyclic, said heteroatoms selected from O, N, S, B, P or Si, wherein the nonaromatic ring system is completely saturated. Heterocycloalkyl groups may be optionally substituted with one or more substituents. In one embodiment, 0, 1, 2, 3, or 4 atoms of each ring of a heterocycloalkyl group may be substituted by a substituent. Representative heterocycloalkyl groups include piperidinyl, piperazinyl, tetrahydropyranyl, morpholinyl, thiomorpholinyl, 1,3-dioxolanyl, tetrahydrofuryl, tetrahydrothienyl, thienyl, and the like.

As used herein, the term "arene" refers an aromatic ring or multiple aromatic rings that are fused together. Examples of arenes include, for example, benzene, naphthalene, anthracene, and the like. The term arene also includes heteroarenes (i.e., aromatic compounds in which one or more of the carbon atoms in an aromatic ring has been replaced by a heteroatom, such as O, N, or S). Examples of heteroarenes include, for example, pyridine, furan, indole, benzimidazole, thiophene, benzthiazole, and the like.

As used herein, the term "cycloalkane" refers, in accordance with some embodiments, refers to alkanes that are appropriately cyclic, such as but not limited to, $C_3$-$C_{12}$ cycloalkane (including, but not limited to, $C_5$-$C_7$ cycloalkane). Examples of cycloalkane groups include, but are not limited to, cyclopropane, cyclobutane, cyclopentane, cyclohexane, cycloheptane, and cyclooctane.

As used herein, the term "catechols" or a "catechol functional group" refers to an aromatic six-carbon ring with two hydroxyl groups attached to adjacent carbons, such as 1,2-dihydroxybenzene. "Catechol-amines" refers to a catechol structure with a side-chain amine.

As used herein, unless defined otherwise, the phrase "optionally substituted," "substituted" or variations thereof denote an optional substitution, including multiple degrees of substitution, with one or more substituent group, for example, one, two or three. The phrase should not be interpreted as duplicative of the substitutions herein described and depicted. These moieties can be substituted with groups selected from, but not limited to, halo (e.g., haloalkyl), alkyl, haloalkyl, hydroxyalkyl, alkenyl, alkynyl, cycloalkyl (including spiroalkyl, e.g., —C(CH$_2$)$_{2-4}$—spiroalkyl), cycloalkylalkyl, aryl, arylalkyl, aryl substituted heteroaryl, heterocyclo, heterocycloalkyl, alkylheterocycloalkyl, heteroaryl, heteroarylalkyl, hydroxyl, alkoxy (thereby creating a polyalkoxy such as polyethylene glycol), alkenyloxy, alkynyloxy, haloalkoxy, cycloalkoxy, cycloalkylalkyloxy, aryloxy, arylalkyloxy, heterocyclooxy, heterocyclolalkyloxy, mercapto, alkyl-S(O)$_m$, haloalkyl-S(O)$_m$, alkenyl-S(O)$_m$, alkynyl-S(O)$_m$, cycloalkyl-S(O)$_m$, cycloalkylalkyl-S(O)$_m$, aryl-S(O)$_m$, arylalkyl-S(O)$_m$, heterocyclo-S(O)$_m$, heterocycloalkyl-S(O)$_m$, amino, carboxy, alkylamino, —(CH$_2$)$_m$—NH(CH$_2$)$_m$CH$_3$, —(CH$_2$)$_m$—NH(CH$_2$)$_m$OH, alkenylamino, alkynylamino, haloalkylamino, cycloalkylamino, cycloalkylalkylamino, arylamino, arylalkylamino, heterocycloamino, heterocycloalkylamino, disubstitutedamino, acylamino, acyloxy, ester, amide, sulfonamide, urea, alkoxyacylamino, aminoacyloxy, nitro, polar group or cyano where m=0, 1, 2 or 3. In one embodiment, alkyl or loweralkyl can be substituted with groups selected from a polar group, —(CH$_2$)$_m$—N(R$^{50}$)$_2$, —(CH$_2$)$_m$—NH(CH$_2$)$_m$R$^{50}$, —(CH$_2$)$_m$NH(CH$_2$)$_{2-3}$N(R$^{50}$)$_2$, —S(O)$_2$OR$^{50}$, —CONHNHR$^{50}$, aminosulfonyl —C(CH$_2$)$_2$R$^{50}$ wherein each R$^{50}$ is independently selected from hydrogen, alkyl, alkenyl, alkynyl, aryl, arylalkyl, cycloalkyl, cycloalkylalkyl, heterocyclo, heterocycloalkyl, heteroaryl, or heteroarylalkyl.

As used herein, the term "free radical initiator" refers to a chemical or form of energy that can produce a radical species and promote radical reactions. Non-limiting examples of chemicals used as free radical initiators are halogen molecules, azo compounds, and organic and inorganic peroxides. Specific non-limiting examples are di-tert-butyl peroxide, dilauroyl peroxide (DLP), 2,5-dimethyl-2,5-di-tertiary-butyl-peroxyhexane, dicumyl peroxide; alkyl peroxides such as tertiary-butyl hydroperoxide, tertiary-octyl hydroperoxide, cumene hydroperoxide; aroyl peroxides such as benzoyl peroxide (BPO); peroxy esters such as tertiary-butyl peroxypivalate, tertiary-butyl perbenzoate; and azo compounds such as azo-bis-isobutyronitrile (AIBN). Forms of energy useful as a free radical initiators are heat and light. Non-limiting examples of light sources used as free radical initiators are light emitting diodes (LED) and compact fluorescent lamps (CFL).

The term "covalently bound" or "covalently linked" refers to a chemical bond formed by sharing of one or more pairs of electrons.

As used herein, the "contacting" refers to reagents in close proximity so that a reaction may occur.

As used herein, "ambient temperature" or "room temperature" refers to a temperature in the range of about 20 to 25° C.

It is to be noted that the term "a" or "an" entity refers to one or more of that entity; for example, "a polyolefin" is understood to represent one or more polyolefins. As such, the terms "a" (or "an"), "one or more," and "at least one" can be used interchangeably herein.

Throughout this specification and the claims, the words "comprise," "comprises," and "comprising" are used in a non-exclusive sense, except where the context requires otherwise. It is understood that embodiments described herein include "consisting of" and/or "consisting essentially of" embodiments.

As used herein, the term "about," when referring to a value is meant to encompass variations of, in some embodiments ±50%, in some embodiments ±±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

As used herein, the terms "increase," "increases," "increased," "increasing", "improve", "enhance", and similar terms indicate an elevation in the specified parameter of at least about 5%, 10%, 15%, 20%, 25%, 30%, 35%, 40%, 45%, 50%, 55%, 60%, 65%, 70%, 75%, 80%, 85%, 90%, 95%, 100%, 150%, 200%, 300%, 400%, 500% or more.

As used herein, the terms "reduce," "reduces," "reduced," "reduction", "inhibit", and similar terms refer to a decrease in the specified parameter of at least about 5%, 10%, 15%, 20%, 25%, 30%, 35%, 40%, 45%, 50%, 55%, 60%, 65%, 70%, 75%, 80%, 85%, 90%, 95%, 97%, or 100%.

Where a range of values is provided, it is understood that each intervening value, to the tenth of the unit of the lower limit, unless the context clearly dictates otherwise, between the upper and lower limit of the range and any other stated or intervening value in that stated range, is encompassed. The upper and lower limits of these small ranges which may independently be included in the smaller rangers is also encompassed, subject to any specifically excluded limit in the stated range. Where the stated range includes one or both of the limits, ranges excluding either or both of those included limits are also included.

Efforts have been made to ensure accuracy with respect to numbers used (e.g. amounts, temperature, etc.) but some experimental errors and deviations should be accounted for.

One skilled in the art will recognize many methods and materials similar or equivalent to those described herein, which could be used in the practicing the subject matter described herein. The present disclosure is in no way limited to just the methods and materials described.

II. N-Xanthylamide Compounds of Formula I

The N-Xanthylamide compounds disclosed herein are compounds of Formula I which have the following structure:

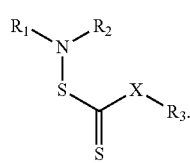

In embodiments, the subject matter herein is directed to a compound of Formula I:

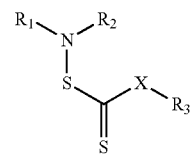

wherein $R_1$ is aryl, heteroaryl, —$COR_4$, or —$SO_2R_4$, wherein said aryl or heteroaryl can be optionally substituted, and wherein $R_4$ is optionally substituted linear or branched $C_{1-6}$ alkyl, aryl, heteroaryl, cycloalkyl, or heterocycloalkyl;

$R_2$ is optionally substituted linear or branched $C_{1-6}$ alkyl, aryl, heteroaryl, cycloalkyl, or heterocycloalkyl;

$R_3$ is optionally substituted linear or branched $C_{1-6}$ alkyl, aryl, or heteroaryl; and X is a bond, —O—, —S—, or —$NR^5$, wherein $R^5$ is optionally substituted linear or branched $C_{1-6}$ alkyl.

As any embodiment above, a compound of Formula I wherein $R_1$ is —$COR_4$ or —$SO_2R_4$, and $R_4$ is optionally substituted linear or branched $C_{1-6}$ alkyl, aryl, or heteroaryl.

As in any embodiment above, the compound wherein $R_1$ is —$COR_4$ and $R_4$ is optionally substituted linear or branched $C_{1-6}$ alkyl, or aryl.

As in any embodiment above, the compound wherein $R_4$ is substituted one, two, or three times by $CF_3$.

As in any embodiment above, the compound wherein $R_2$ is optionally substituted linear or branched $C_{1-6}$ alkyl or cycloalkyl.

As in any embodiment above, the compound wherein $R_2$ is optionally substituted linear or branched $C_{1-6}$ alkyl.

As in any embodiment above, the compound wherein $R_2$ is branched $C_{1-6}$ alkyl.

As in any embodiment above, the compound wherein $R_2$ is tert-butyl.

As in any embodiment above, the compound wherein X is —O—, —S—, or —$NR^5$, wherein $R^5$ is optionally substituted linear or branched $C_{1-6}$ alkyl.

As in any embodiment above, the compound wherein $R_3$ is optionally substituted linear or branched $C_{1-6}$ alkyl or aryl.

As in any embodiment above, the compound wherein $R_3$ is phenyl, —$CH_2CH$, —$CF_2CF_3$, or —$CH(CH_3)_2$.

As in any embodiment above, wherein —X—$R^3$ is selected from the group consisting of —$OCF_2CF_3$, —$OCH_2CH_3$, —$N(CH_2CH_3)_2$, —$SCH_2CH_3$, —$OCH(CH_3)_2$, —$N(CH_3)C_6H_5$, and phenyl.

As in any embodiment above, the compound wherein $R_3$ is -phenyl, —$CH_2CH$, or —$CH(CH_3)_2$.

As in any embodiment above, wherein —X—$R^3$ is selected from the group consisting of —$OCH_2CH_3$, —$N(CH_2CH_3)_2$, —$SCH_2CH_3$, —$OCH(CH_3)_2$, and —$N(CH_3)C_6H_5$.

As in any embodiment above, wherein Formula I has the structure

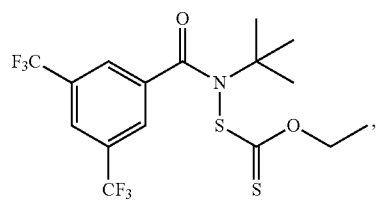

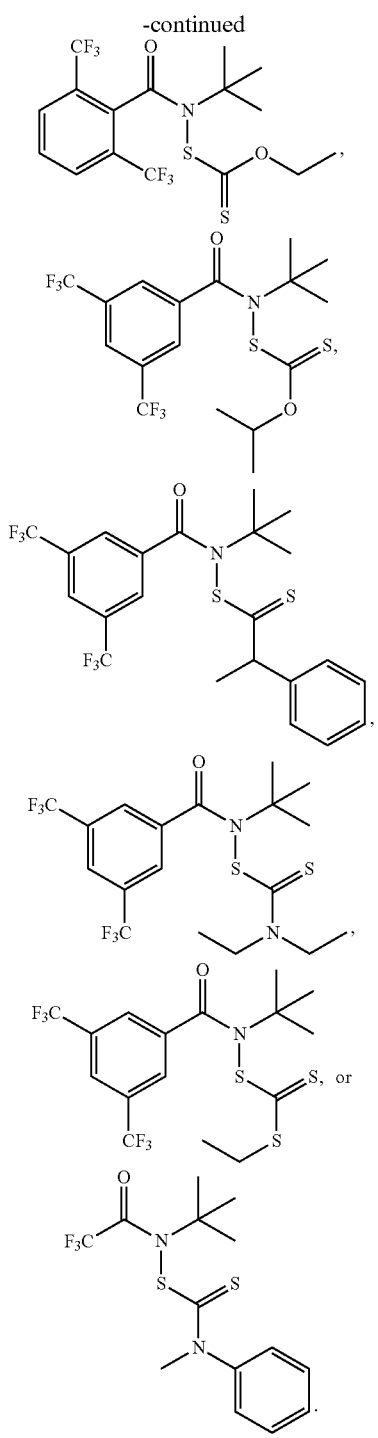

As in any embodiment above, the compound wherein $R_4$ is

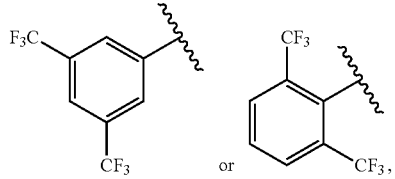 [SMILES: *c1cc(C(F)(F)F)cc(C(F)(F)F)c1 ; *c1c(C(F)(F)F)cccc1C(F)(F)F]

where the wavy line denotes the point of attachment.

As in any embodiment above, the compound wherein X is —O—.

As in any embodiment above, the compound wherein $R_3$ is linear $C_{1-6}$ alkyl.

As in any embodiment above, the compound wherein $R_3$ is —CH$_2$CH$_3$.

As in any embodiment above, the compound wherein —X—R$^3$ is selected from the group consisting of —OCF$_2$CF$_3$, —OCH$_2$CH$_3$, —N(CH$_2$CH$_3$)$_2$, —SCH$_2$CH$_3$, and phenyl.

As in any embodiment above, the compound wherein —X—R$^3$ is —OCH$_2$CH$_3$.

As in any embodiment above, the compound wherein said compound of Formula I has the structure

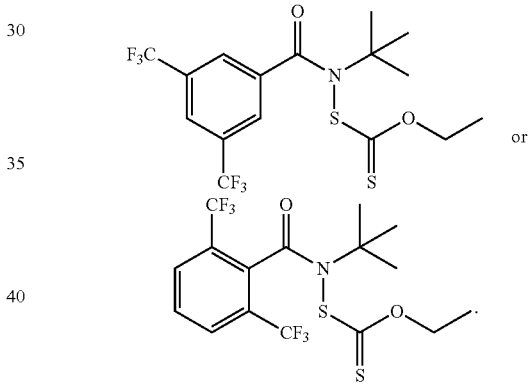

III. Xanthylated Polymers, Formation and Use

The methods described herein are useful in the regioselective xanthylation of polymers which may be followed by functionalization of the xanthylated polymers described herein.

In embodiments, the subject matter described herein is directed to a method for xanthylating a polymer, the method comprising:

contacting a polymer selected from the group consisting of polyolefins, polyesters, polycarbonates, and polyesters with a compound of Formula I

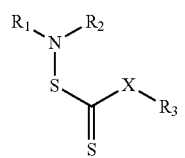

As in any embodiment above, the compound wherein $R_4$ is optionally substituted aryl, heteroaryl, cycloalkyl, or heterocycloalkyl.

As any embodiment above, a compound of Formula I wherein $R_1$ is —COR$_4$ or —SO$_2$R$_4$, and $R_4$ is optionally substituted aryl, or heteroaryl.

As in any embodiment above, the compound wherein $R_1$ is —COR$_4$ and $R_4$ is optionally substituted aryl.

As in any embodiment above, the compound wherein $R_4$ is substituted one, two, or three times by CF$_3$.

wherein $R_1$ is aryl, heteroaryl, —$COR_4$, or —$SO_2R_4$, wherein said aryl or heteroaryl can be optionally substituted, and wherein $R_4$ is optionally substituted linear or branched $C_{1-6}$ alkyl, aryl, heteroaryl, cycloalkyl, or heterocycloalkyl;

$R_2$ is optionally substituted linear or branched $C_{1-6}$ alkyl, aryl, heteroaryl, cycloalkyl, or heterocycloalkyl;

$R_3$ is optionally substituted linear or branched $C_{1-6}$ alkyl, aryl, or heteroaryl; and X is a bond, —O—, —S—, or —$NR^5$, wherein $R^5$ is optionally substituted linear or branched $C_1$-6 alkyl, to form a xanthylated polymer.

In certain embodiments, the subject matter described herein is directed to a method for xanthylating a polymer, the method comprising:

contacting a polymer with a compound of Formula I

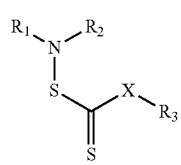

I wherein $R_1$ is aryl, heteroaryl, —$COR_4$, or —$SO_2R_4$, wherein the aryl or heteroaryl can be optionally substituted, and wherein $R_4$ is optionally substituted aryl, heteroaryl, cycloalkyl, or heterocycloalkyl;

$R_2$ is optionally substituted linear or branched $C_{1-6}$ alkyl, aryl, heteroaryl, cycloalkyl, or heterocycloalkyl;

$R_3$ is optionally substituted linear or branched $C_{1-6}$ alkyl, aryl, or heteroaryl; and X is a bond, —O—, —S—, or —$NR^5$, wherein $R^5$ is optionally substituted linear or branched $C_{1-6}$ alkyl, to form a xanthylated polymer.

As in any embodiment above, a method wherein the xanthylated polymer comprises a structural unit of Formula II

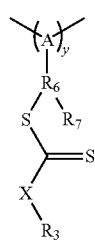

II wherein y is an integer with a value between 1 and 1,000,000;

$R_6$ is a bond, or substituted linear or branched $C_{1-15}$ alkyl;

$R_7$ is absent or present, and when present is hydrogen or substituted linear or branched $C_{1-15}$ alkyl;

X is a bond, —O—, —S—, or —$NR^5$, wherein $R^5$ is optionally substituted linear or branched $C_{1-6}$ alkyl;

$R_3$ is optionally substituted linear or branched $C_{1-6}$ alkyl, aryl, or heteroaryl;

A is a repeat unit of a polymer covalently bound to the xanthate, selected from

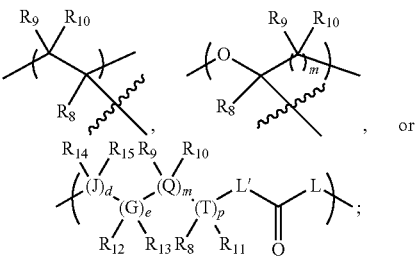

$R_8$, $R_9$, $R_{10}$, $R_{11}$, $R_{12}$, $R_{13}$, $R_{14}$, and $R_{15}$ in each instance, are absent or present, and when present are independently selected from hydrogen or optionally substituted linear or branched $C_{1-15}$ alkyl;

L and L' are each independently a bond or O;

J, G, Q, and T are independently selected from carbon, oxygen, (C=O), arene, or cycloalkane;

d, e, m and p, in each instance, are independently an integer between 0 and 20;

wherein at least one of d, e, m, and p is other than 0;

where at least one of J, G, Q, and T is a carbon covalently bound to $R_6$;

where the wavy line denotes the point of attachment of $R_6$ to the polymer backbone;

wherein A can be further represented by

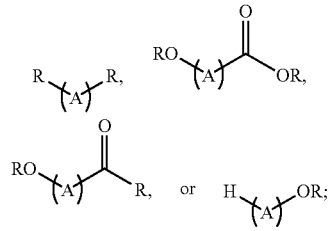

and where R is H, optionally substituted linear or branched $C_{1-6}$ alkyl, or aryl.

As in any embodiment above, a method wherein the xanthylated polymer comprises a structural unit of Formula II

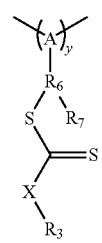

II wherein A is the repeat unit of a polymer covalently bound to the xanthate;

$R_6$ is a bond, or substituted linear or branched $C_{1-15}$ alkyl;

$R_7$ is absent or present, and when present is hydrogen or substituted linear or branched $C_{1-15}$ alkyl;

y is an integer with a value between 1 and 1,000,000; and

X is a bond, —O—, —S—, or —NR$^5$, wherein R$^5$ is optionally substituted linear or branched C$_1$-6 alkyl;

R$_3$ is optionally substituted linear or branched C$_{1-6}$ alkyl, aryl, or heteroaryl. As in any embodiment above, a method wherein said polymer is selected from the group consisting of poly(alkyl glycols) such as polyethylene glycol (PEG), poly(propylene glycol), poly(tetrahydrofuran), poly(oxetane), poly(glycidyl ethers) such as poly(methyl glycidyl ether), poly(ethyl glycidyl ether), poly(isopropyl glycidyl ether), poly(allyl glycidyl ether), ether Pluronic® surfactants such as poly(ethylene glycol)-block-poly(propylene glycol)-block-poly(ethylene glycol), poly(2-ethyloxirane), poly(2-butyloxirane), poly(2-hexyloxirane), polycaprolactone, poly(ethylene terephthalate), polylactide, polyglycolide, poly-δ-valerolactone, polyhydroxybuterate, Tritan™ such as polyesters made or derived from tetramethyl cyclobutanediol, poly(trimethylenecarbonate), bisphenol-A-containing polycarbonates, polypolyethylene (PE), polypropylene (PP), polymethylpentene (PMP), polybutene-1 (PB-1), polyisobutylene (PIB), poly-1-octene, poly-1-decene, hydrogenated polyisoprene, poly-1-hexene, poly(norbornene), and ethylene propylene rubber (EPR).

As in any embodiment above, a method wherein said polymer is a branched polymer.

As in any embodiment above, a method wherein said polymer comprises a homopolymer, a copolymer or a terpolymer derived from the polymerization of at least one monomer. A homopolymer comprises one type of monomer; a copolymer comprises two different types of monomers; a terpolymer comprises three different types of monomers.

As in any embodiment above, a method wherein said polymer has a molecular weight in the range from about 250 g/mol to about 25,000,000 g/mol.

As in any embodiment above, a method wherein said polymer is regioselectively xanthylated. As used herein, the terms "regioselective xanthylation" or "regioselectively xanthylated" refers to the process in which one specific positional xanthylated isomer is formed in preference over other potential positional xanthylated isomers. For example, the subject matter described herein shows a preference for xanthylation at 2° (secondary) and 1° (primary) carbons in comparison to xanthylation at a 3° (tertiary) carbon.

As in any embodiment above, a method wherein the ratio of regioselective xanthylation of 2°:1° carbons is in a range from about 5:1 to about 1:1, or from about 2.5:1 to about 1:1. In a further embodiment, no xanthylation is observed at any 3° carbons.

In other embodiments, the subject matter described herein shows a preference for xanthylation alpha to an ether oxygen. Herein, alpha or alpha hydrogens refers to hydrogens that are attached to a carbon that is bound next to an ether oxygen.

As in any embodiment above, a method further comprising the step of contacting said xanthylated polymer with a reagent to form a functionalized polymer, a crosslinked polymer, or a grafted polymer.

As in any embodiment above, a method wherein said contacting forms a crosslinked branched polymer.

As in any embodiment above, a method wherein said crosslinked branched polymer is a polymer elastomer or thermoset.

As in any embodiment above, a method wherein xanthylation results in group-transfer of a xanthate to the polymer backbone.

As in any embodiment above, a method wherein the polymer has at least one sp$^3$ carbon. Herein, "sp$^3$" refers to a hybridized orbital consisting of a 2s orbital and three 2p orbitals that can hold up to 8 electrons.

As in any embodiment above, a method wherein said functionalized polymer contains a functional group selected from the group consisting of thiols, epoxides, anhydrides, carboxylic acids, amines, amides, boron containing compounds, silicon containing compounds, cyano-containing compounds, sulfates, sulfonates, sulfites, esters, thioesters, dithioesters, ether, halides, phosphates, phosphoonates, phosphines, phosphites, olefins, alkyl-thiols, perfluorinated alkyl, fluoro-alkyl-thiols, thiol-enes, sugars, catechols, and catechol-amides, and mixtures thereof.

As in any embodiment above, a method wherein said functionalized polymer contains a functional group selected from the group consisting of perfluorinated alkyl, fluoro-alkyl-thiols, thiol-enes, sugars, catechols, and catechol-amines.

As in any embodiment above, a method wherein the xanthylated polymer is a polyolefin which comprises a structural unit of Formula III

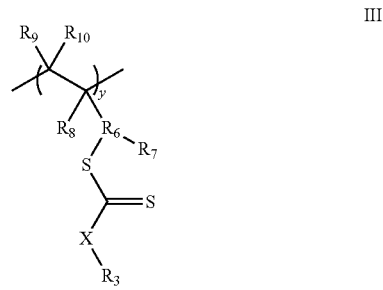

wherein R$_6$ is a bond, or substituted linear or branched C$_{1-15}$ alkyl;

R$_7$ is absent or present, and when present is hydrogen or substituted linear or branched C$_{1-15}$ alkyl;

R$_8$, R$_9$, and R$_{10}$ in each instance, is independently selected from hydrogen or substituted linear or branched C$_{1-15}$ alkyl;

y is an integer with a value between 1 and 1,000,000;

X is a bond, —O—, —S—, or —NR$^5$, wherein R$^5$ is optionally substituted linear or branched C$_{1-6}$ alkyl; and R$_3$ is optionally substituted linear or branched C$_{1-6}$ alkyl, aryl, or heteroaryl.

As in any embodiment above, a method wherein the xanthylated polyolefin has a carbon backbone.

As in any embodiment above, a method wherein the polyolefin comprises a homopolymer, a copolymer or a terpolymer derived from the polymerization of at least one olefin monomer.

As in any embodiment above, a method wherein the polyolefin is selected from the group consisting of polyethylene (PE), polypropylene (PP), polymethylpentene (PMP), polybutene-1 (PB-1), polyisobutylene (PIB), poly-1-octene, poly-1-decene, hydrogenated polyisoprene, poly-1-hexene, poly(norbornene), and ethylene propylene rubber (EPR).

As in any embodiment above, a method wherein the polyolefin is polypropylene.

As in any embodiment above, a method wherein the polyolefin is a copolymer derived from polymerization of a mixture of ethylene and propylene.

As in any embodiment above, a method wherein the polyolefin is a branched polyolefin.

As in any embodiment above, a method wherein the polyolefin has a molecular weight in the range from about 500 g/mol to about 10,000,000 g/mol.

As in any embodiment above, a method wherein said polyolefin has a molecular weight in the range from about 1,000 g/mol to about 10,000,000 g/mol.

As in any embodiment above, a method wherein the polyolefin is regioselectively xanthylated.

As in any embodiment above, a method wherein the ratio of regioselective xanthylation of 2°:1° carbons is in a range from about 5:1 to about 1:1, or from about 2.5:1 to about 1:1. In a further embodiment, no xanthylation is observed at any 3° carbons.

As in any embodiment above, a method wherein the xanthylated polyolefin comprises the structural unit of Formula IV

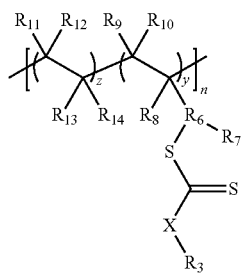

IV wherein $R_6$ is a bond, or substituted linear or branched $C_{1-15}$ alkyl;

$R_7$ is absent or present, and when present is hydrogen or substituted linear or branched $C_{1-15}$ alkyl;

$R_8$, $R_9$, $R_{10}$, $R_{11}$, $R_{12}$, $R_{13}$, and $R_{14}$, in each instance, is independently selected from hydrogen or substituted linear or branched $C_{1-15}$ alkyl;

X is a bond, —O—, —S—, or —$NR^5$, wherein $R^5$ is optionally substituted linear or branched $C_{1-6}$ alkyl;

$R_3$ is optionally substituted linear or branched $C_{1-6}$ alkyl, aryl, or heteroaryl;

n is an integer from 1 to 500,000; and z and y are integers from 1 to 1,000,000, wherein the ratio of z:y is in the range from about 100,000:1 to about 1:1.

In certain embodiments, z and y are integers from 1 to 1,000, wherein the ratio of z:y is in the range from about 1000:1 to about 1:1.

As in any embodiment above, a method wherein the ratio of z:y is in the range from about 1000:1 to about 1:1, about 500:1 to about 1:1, about 100:1 to about 1:1, about 50:1 to about 1:1, about 20:1 to about 1:1, about 15:1 to about 5:1, or about 12:1 to about 7:1. In a further embodiment, the ratio of z:y is different for each iteration of n. The repeat units represented by z and y may be present such that the repeat units have any mixture of repeating or non-repeating ratios.

For example, the ratio of z:y corresponds to the percent of the polyolefin of Formula IV that is xanthylated, such that about 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.30%, 0.40%, 0.50%, 0.60%, 0.70%, 0.80%, 0.90%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25% of the xanthylated polyolefin of Formula IV is xanthylated.

As in any embodiment above, z is 0.01 to 0.99 and y is 0.1 to 0.9 wherein z and y are mole fractions and together z and y=1.

As in any embodiment above, a method further comprising the step of contacting the xanthylated polyolefin with a reagent to form a functionalized polyolefin, a crosslinked polyolefin, or a grafted polyolefin.

As in any embodiment above, a method wherein the contacting forms a crosslinked branched polyolefin.

As in any embodiment above, a method wherein the crosslinked branched polyolefin is a polyolefin elastomer or thermoset.

As in any embodiment above, a method wherein the functionalized polyolefin contains a functional group selected from the group consisting of thiols, epoxides, anhydrides, carboxylic acids, amines, amides, boron containing compounds, silicon containing compounds, cyano-containing compounds, sulfates, sulfonates, sulfites, esters, thioesters, dithioesters, ether, halides, phosphates, phosphonates, phosphines, phosphites, olefins, alkyl-thiols, perfluorinated alkyl, fluoro-alkyl-thiols, thiol-enes, sugars, catechols, and catechol-amides, and mixtures thereof.

As in any embodiment above, a method wherein the functionalized polyolefin contains a functional group selected from the group consisting of perfluorinated alkyl, fluoro-alkyl-thiols, thiol-enes, sugars, catechols, and catechol-amines.

As in any embodiment above, a method wherein said xanthylated polyolefin comprises the structural unit:

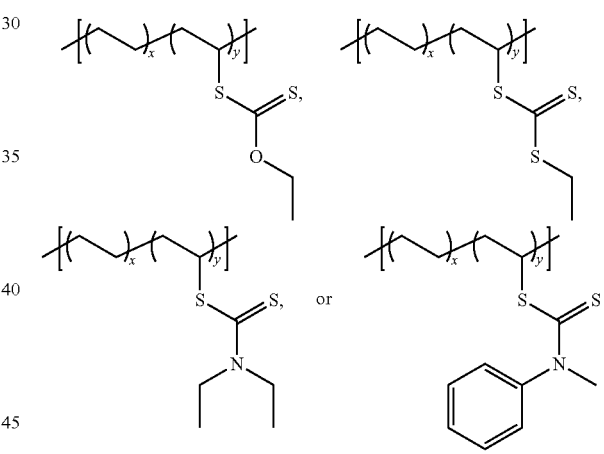

wherein n is an integer from 1 to 500,000; and z and y are integers from 1 to 1,000,000, wherein the ratio of z:y is in the range from about 100,000:1 to about 1:1.

As in any embodiment above, a method wherein the xanthylated polymer is a polyether which comprises the structural unit of Formula V

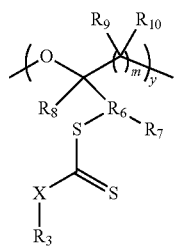

V wherein $R_6$ is a bond, or substituted linear or branched $C_{1-15}$ alkyl;

$R_7$ is absent or present, and when present is hydrogen or substituted linear or branched $C_{1-15}$ alkyl;

$R_8$ $R_9$, and $R_{10}$ are each independently selected from hydrogen or substituted linear or branched $C_1$-15 alkyl;

X is a bond, —O—, —S—, or —NR$^5$, wherein R$^5$ is optionally substituted linear or branched $C_{1-6}$ alkyl;

$R_3$ is optionally substituted linear or branched $C_{1-6}$ alkyl, aryl, or heteroaryl;

m is an integer between 0 and 20; and y is an integer with a value between 1 and 1,000,000.

As in any embodiment above, a method wherein the polyether is a branched polyether.

As in any embodiment above, a method wherein the polyether has a molecular weight in the range from about 250 g/mol to about 25,000,000 g/mol.

As in any embodiment above, a method wherein the polyether is regioselectively xanthylated.

As in any embodiment above, a method wherein xanthylation results in group-transfer of a xanthate to the polyether backbone.

As in any embodiment above, a method wherein the polyether undergoes xanthylation alpha to an ether oxygen.

As in any embodiment above, a method wherein the polyether has at least one sp$^3$ carbon. Herein, "sp$^3$" refers to a hybridized orbital consisting of a 2s orbital and three 2p orbitals that can hold up to 8 electrons.

As in any embodiment above, a method wherein the polyether comprises a homopolymer, a copolymer or a terpolymer.

As in any embodiment above, a method wherein the polyether is selected from the group consisting of polyethylene glycol (PEG), poly(propylene glycol), poly(tetrahydrofuran), poly(oxetane), poly(methyl glycidyl ether), poly(ethyl glycidyl ether), poly(isopropyl glycidyl ether), poly(allyl glycidyl ether), ether Pluronic® surfactants such as poly(ethylene glycol)-block-poly(propylene glycol)-block-poly(ethylene glycol), poly(2-ethyloxirane), poly(2-butyloxirane), and poly(2-hexyloxirane).

As in any embodiment above, a method wherein the polyether is polyethylene glycol (PEG).

As in any embodiment above, a method wherein the xanthylated polyether comprises the structural unit of Formula VI

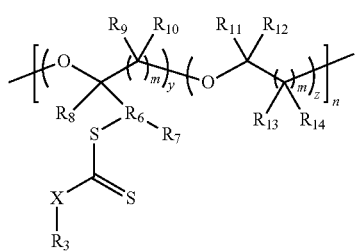

VI wherein $R_6$ is a bond, or substituted linear or branched $C_{1-15}$ alkyl;

$R_7$ is absent or present, and when present is hydrogen or substituted linear or branched $C_{1-15}$ alkyl;

X is a bond, —O—, —S—, or —NR$^5$, wherein R$^5$ is optionally substituted linear or branched $C_{1-6}$ alkyl;

$R_3$ is optionally substituted linear or branched $C_{1-6}$ alkyl, aryl, or heteroaryl;

$R_8$, $R_9$, $R_{10}$, $R_{11}$, $R_{12}$, $R_{13}$, and $R_{14}$ in each instance, is independently selected from hydrogen or substituted linear or branched $C_{1-15}$ alkyl;

m is an integer between 0 and 20;

z and y are integers from 1 to 1,000,000, wherein the ratio of z:y is in the range from about 100,000:1 to about 1:1; and n is an integer from 1 to 500,000.

In certain embodiments, z and y are integers from 1 to 1,000, wherein the ratio of z:y is in the range from about 1000:1 to about 1:1.

As in any embodiment above, a method wherein the ratio of z:y is in the range from about 1000:1 to about 1:1, about 500:1 to about 1:1, about 100:1 to about 1:1, about 50:1 to about 1:1, about 20:1 to about 1:1, about 15:1 to about 5:1, or about 12:1 to about 7:1. In a further embodiment, the ratio of z:y is different for each iteration of n. The repeat units represented by z and y may be present such that the repeat units have any mixture of repeating or non-repeating ratios.

For example, the ratio of z:y corresponds to the percent of the polyether of Formula VI that is xanthylated, such that about 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.30%, 0.40%, 0.50%, 0.60%, 0.70%, 0.80%, 0.90%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, or 25% of the xanthylated polyether of Formula VI is xanthylated.

As in any embodiment above, z is 0.01 to 0.99 and y is 0.1 to 0.9 wherein z and y are mole fractions and together z and y=1.

As in any embodiment above, a method, wherein m is 1.

As in any embodiment above, a method wherein m is 1, $R_8$ is hydrogen, $R_9$ is hydrogen, and $R_{10}$ is hydrogen.

As in any embodiment above, a method wherein $R_6$ is a bond, $R_7$ is absent, X is O, and $R_3$ is —CH$_2$CH$_3$.

As in any embodiment above, a method wherein m is 1, $R_8$ is hydrogen, $R_9$ is hydrogen, $R_{10}$ is hydrogen, $R_6$ is a bond, $R_7$ is absent, X is O, and $R_3$ is —CH$_2$CH$_3$.

As in any embodiment above, a method wherein said polyether has the structure:

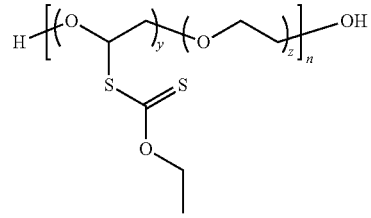

wherein z and y are integers from 1 to 1,000,000, wherein the ratio of z:y is in the range from about 100,000:1 to about 1:1; and n is an integer from 1 to 500,000.

As in any embodiment above, a method further comprising the step of contacting the xanthylated polyether with a reagent to form a functionalized polyether, a crosslinked polyether, or a grafted polyether.

As in any embodiment above, a method wherein the contacting forms a crosslinked branched polyether.

As in any embodiment above, a method wherein the crosslinked branched polyether is a polyether elastomer or thermoset.

As in any embodiment above, a method wherein the functionalized polyether contains a functional group selected from the group consisting of thiols, epoxides, anhydrides, carboxylic acids, amines, amides, boron containing compounds, silicon containing compounds, cyano-containing compounds, sulfates, sulfonates, sulfites, esters, thioesters, dithioesters, ether, halides, phosphates, phosphonates, phosphines, phosphites, olefins, alkyl-thiols, perfluorinated alkyl, fluoro-alkyl-thiols, thiol-enes, sugars, catechols, and catechol-amides, and mixtures thereof.

As in any embodiment above, a method wherein the functionalized polyether contains a functional group selected from the group consisting of perfluorinated alkyl, fluoro-alkyl-thiols, thiol-enes, sugars, catechols, and catechol-amines.

As in any embodiment above, a method wherein the xanthylated polymer is a polyester or polycarbonate which comprises the structural unit of Formula VII

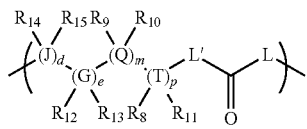

VII wherein $R_8$, $R_9$, $R_{10}$, $R_{11}$, $R_{12}$, $R_{13}$, $R_{14}$, and $R_{15}$ in each instance, are absent or present, and when present are independently selected from hydrogen or optionally substituted linear or branched $C_{1-15}$ alkyl;

L and L' are each independently a bond or O;

J, G, Q, and T are each independently selected from carbon, oxygen, (C=O), arene, or cycloalkane;

d, e, m and p, in each instance, are independently an integer between 0 and 20;

wherein at least one of d, e, m, and p is other than 0;

where at least one of $R_8$, $R_9$, $R_{10}$, $R_{11}$, $R_{12}$, $R_{13}$, $R_{14}$, and $R_{15}$ is

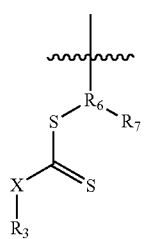

where the wavy line denotes the point of attachment of $R_6$ to the polymer backbone;

$R_6$ is a bond, or substituted linear or branched $C_1$-15 alkyl;

$R_7$ is absent or present, and when present is hydrogen or substituted linear or branched $C_{1-15}$ alkyl;

X is a bond, —O—, —S—, or —$NR^5$, wherein $R^5$ is optionally substituted linear or branched $C_{1-6}$ alkyl;

$R_3$ is optionally substituted linear or branched $C_{1-6}$ alkyl, aryl, or heteroaryl; and y is an integer with a value between 1 and 1,000,000.

As in any embodiment above, a method wherein the polyester or polycarbonate is a branched polyester or polycarbonate.

As in any embodiment above, a method wherein the polyester or polycarbonate has a molecular weight in the range from about 250 g/mol to about 25,000,000 g/mol.

As in any embodiment above, a method wherein the polyester or polycarbonate is regioselectively xanthylated.

As in any embodiment above, a method wherein xanthylation results in group-transfer of a xanthate to the polyester or polycarbonate backbone.

As in any embodiment above, a method wherein the polyester or polycarbonate has at least one $sp^3$ carbon.

As in any embodiment above, a method wherein the polyester or polycarbonate comprises a homopolymer, a copolymer or a terpolymer.

As in any embodiment above, a method wherein the polyester or polycarbonate is polycaprolactone, poly(ethylene terephthalate), polylactide, polyglycolide, poly-6-valerolactone, polyhydroxybuterate, Tritan™, such as polyesters made derived from tetramethyl cyclobutanediol, poly(trimethylenecarbonate), or bisphenol-A-containing polycarbonates.

As in any embodiment above, a method wherein the polymer is polycaprolactone.

As in any embodiment above, a method wherein the xanthylated polyester or polycarbonate comprises the structural unit of Formula VIII

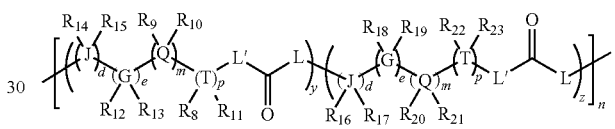

VIII wherein $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, and $R_{23}$ in each instance, are absent or present, and when present are independently selected from hydrogen or optionally substituted linear or branched $C_{1-15}$ alkyl;

L and L' are each independently a bond or O;

J, G, Q, and T are each independently selected from carbon, oxygen, (C=O), arene, or cycloalkane;

d, e, m and p, in each instance, are independently an integer between 0 and 20;

wherein at least one of d, e, m, and p is other than 0;

where at least one of $R_8$, $R_9$, $R_{10}$, $R_{11}$, $R_{12}$, $R_{13}$, $R_{14}$, and $R_{15}$ is

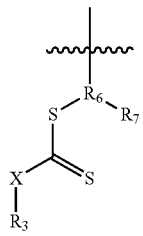

where the wavy line denotes the point of attachment of $R_6$ to the polymer backbone;

$R_6$ is a bond, or substituted linear or branched $C_{1-15}$ alkyl;

$R_7$ is absent or present, and when present is hydrogen or substituted linear or branched $C_{1-15}$ alkyl;

X is a bond, —O—, —S—, or —NR, wherein $R^5$ is optionally substituted linear or branched $C_{1-6}$ alkyl;

$R_3$ is optionally substituted linear or branched $C_{1-6}$ alkyl, aryl, or heteroaryl;

z and y are integers from 1 to 1,000,000, wherein the ratio of z:y is in the range from about 100,000:1 to about 1:1; and n is an integer from 1 to 500,000.

In certain embodiments, z and y are integers from 1 to 1,000, wherein the ratio of z:y is in the range from about 1000:1 to about 1:1.

As in any embodiment above, a method wherein the ratio of z:y is in the range from about 1000:1 to about 1:1, about 500:1 to about 1:1, about 100:1 to about 1:1, about 50:1 to about 1:1, about 20:1 to about 1:1, about 15:1 to about 5:1, or about 12:1 to about 7:1. In a further embodiment, the ratio of z:y is different for each iteration of n. The repeat units represented by z and y may be present such that the repeat units have any mixture of repeating or non-repeating ratios.

For example, the ratio of z:y corresponds to the percent of the polyester or polycarbonate of Formula VII that is xanthylated, such that about 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.30%, 0.40%, 0.50%, 0.60%, 0.70%, 0.80%, 0.90%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, or 25% of the xanthylated polyester or polycarbonate of Formula VII is xanthylated.

As in any embodiment above, z is 0.01 to 0.99 and y is 0.1 to 0.9 wherein z and y are mole fractions and together z and y=1.

As in any embodiment above, a method wherein $R_6$ is a bond, $R_7$ is absent, X is O, and $R_3$ is —$CH_2CH_3$.

As in any embodiment above, a method wherein L is a bond, L' is a bond, p is 5, m is 1, e is 0 and d is 0.

As in any embodiment above, a method wherein T is C and Q is O.

As in any embodiment above, a method wherein said polymer comprises the structural unit

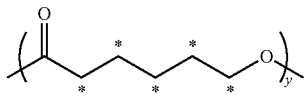

wherein * denotes possible points of attachment of

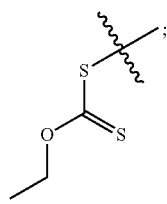 [SMILES: *SC(=S)OCC]

and
wherein y is an integer from 1 to 1,000,000.

As in any embodiment above, a method wherein said polymer comprises the structural unit

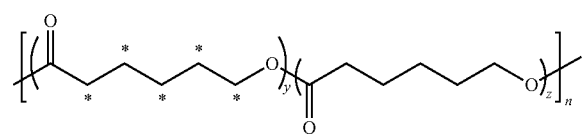

wherein * denotes possible points of attachment of

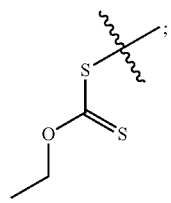

where z and y are integers from 1 to 1,000,000, wherein the ratio of z:y is in the range from about 100,000:1 to about 1:1; and n is an integer from 1 to 500,000.

As in any embodiment above, a method wherein the functionalized polyester or polycarbonate contains a functional group selected from the group consisting of perfluorinated alkyl, fluoro-alkyl-thiols, thiol-enes, sugars, catechols, and catechol-amines.

As in any embodiment above, a method further comprising the step of contacting the xanthylated polyester or polycarbonate with a reagent to form a functionalized polyester or polycarbonate, a crosslinked polyester or polycarbonate, or a grafted polyester or polycarbonate.

As in any embodiment above, a method wherein the contacting forms a crosslinked branched polyester or polycarbonate.

As in any embodiment above, a method wherein the crosslinked branched polyester or polycarbonate is a polyester or polycarbonate elastomer or thermoset.

As in any embodiment above, a method wherein the functionalized polyester or polycarbonate contains a functional group selected from the group consisting of thiols, epoxides, anhydrides, carboxylic acids, amines, amides, boron containing compounds, silicon containing compounds, cyano-containing compounds, sulfates, sulfonates, sulfites, esters, thioesters, dithioesters, ether, halides, phosphates, phosphoonates, phosphines, phosphites, olefins, alkyl-thiols, perfluorinated alkyl, fluoro-alkyl-thiols, thiolenes, sugars, catechols, and catechol-amides, and mixtures thereof.

As in any embodiment above, a method wherein the functionalized polyester or polycarbonate contains a functional group selected from the group consisting of perfluorinated alkyl, fluoro-alkyl-thiols, thiol-enes, sugars, catechols, and catechol-amines.

As in any embodiment above, a method wherein $R_1$ is —$COR_4$ or —$SO_2R_4$, and $R_4$ is optionally substituted linear or branched $C_{1-6}$ alkyl, aryl, or heteroaryl.

As in any embodiment above, a method wherein $R_1$ is —$COR_4$ and $R_4$ is optionally substituted linear or branched $C_{1-6}$ alkyl, or aryl.

As in any embodiment above, a method wherein $R_4$ is a linear or branched $C_{1-6}$ alkyl or aryl that is substituted one, two, or three times by $CF_3$.

As in any embodiment above, a method wherein $R_2$ is optionally substituted linear or branched $C_{1-6}$ alkyl or cycloalkyl.

As in any embodiment above, a method wherein $R_2$ is optionally substituted linear or branched $C_{1-6}$ alkyl.

As in any embodiment above, a method wherein $R_2$ is branched $C_{1-6}$ alkyl.

As in any embodiment above, a method wherein $R_2$ is tert-butyl.

As in any embodiment above, a method wherein X is —O—, —S—, or —NR$^5$, wherein R$^5$ is optionally substituted linear or branched C$_{1-6}$ alkyl.

As in any embodiment above, a method wherein R$_3$ is optionally substituted linear or branched C$_{1-6}$ alkyl or aryl.

As in any embodiment above, a method wherein R$_3$ is phenyl, —CH$_2$CH, —CF$_2$CF$_3$, or —CH(CH$_3$)$_2$.

As in any embodiment above, a method wherein —X—R$^3$ is selected from the group consisting of —OCF$_2$CF$_3$, —OCH$_2$CH$_3$, —N(CH$_2$CH$_3$)$_2$, —SCH$_2$CH$_3$, —OCH(CH$_3$)$_2$, —N(CH$_3$)C$_6$H$_5$, and phenyl.

As in any embodiment above, a method wherein R$_3$ is phenyl, —CH$_2$CH or —CH(CH$_3$)$_2$.

As in any embodiment above, a method wherein —X—R$^3$ is selected from the group consisting of —OCH$_2$CH$_3$, —N(CH$_2$CH$_3$)$_2$, —SCH$_2$CH$_3$, —OCH(CH$_3$)$_2$, and —N(CH$_3$)C$_6$H$_5$.

As in any embodiment above, a method wherein Formula I has the structure

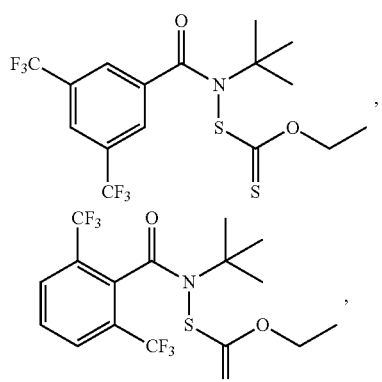

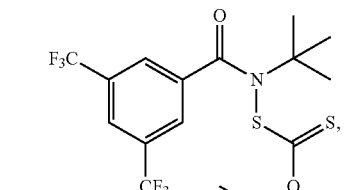

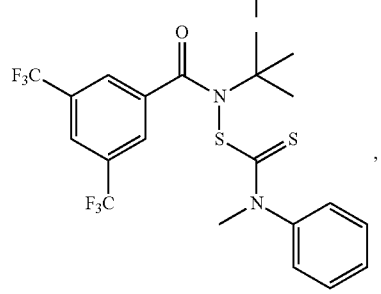

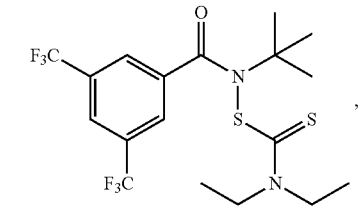

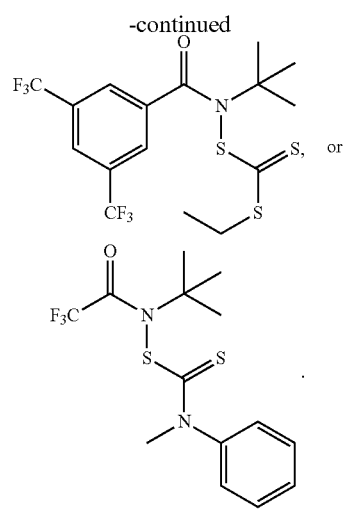

As in any embodiment above, a method wherein R$_1$ is —COR$_4$ or —SO$_2$R$_4$, and R$_4$ is optionally substituted aryl or heteroaryl.

As in any embodiment above, a method wherein R$_1$ is —COR$_4$ and R$_4$ is optionally substituted aryl.

As in any embodiment above, a method wherein R$_4$ is substituted one, two, or three times by CF$_3$.

As in any embodiment above, a method wherein R$_4$ is

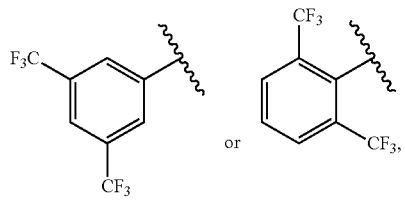

where the wavy line denotes the point of attachment.

As in any embodiment above, a method wherein —X—R$^3$ is selected from the group consisting of —OCF$_2$CF$_3$, —OCH$_2$CH$_3$, —N(CH$_2$CH$_3$)$_2$, —SCH$_2$CH$_3$, and phenyl.

As in any embodiment above, a method wherein —X—R$^3$ is —OCH$_2$CH$_3$.

As in any embodiment above, a method wherein the compound of Formula I has the structure

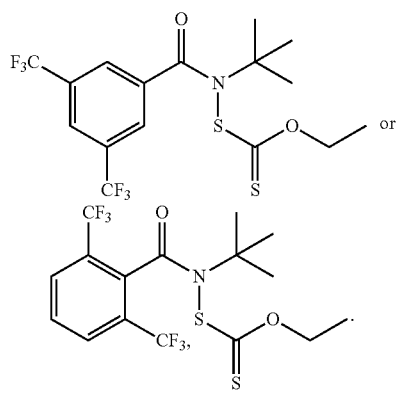

As in any embodiment above, a method wherein the contacting occurs in the presence of a free radical initiator selected from the group consisting of halogen molecules, azo compounds, organic and inorganic peroxides, heat, and light.

As in any embodiment above, a method wherein the free radical initiator is a wavelength of light.

As in any embodiment above, a method wherein the wavelength of light is between about 250 nm and about 500 nm. In an embodiment, the wavelength of light is in the range from about 250 nm to about 275 nm, from about 300 nm to about 600 nm, from about 400 nm to about 500 nm, from about 425 nm to about 475 nm. In further embodiments, the wavelength of light is about 400 nm, 410 nm, 420 nm, 430 nm, 440 nm, 450 nm, 460 nm, 470 nm, 480 nm, 490 nm, or 500 nm.

As in any embodiment above, a method wherein said wavelength of light is between about 370 nm and about 420 nm.

As in any embodiment above, a method wherein the free radical initiator is an organic peroxide.

As in any embodiment above, a method wherein the free radical initiator is dicumyl peroxide.

As in any embodiment above, a method wherein the method is conducted at a temperature in a range from about 0° C. to about 300° C. In other embodiments, the suitable temperature is in the range between about 30° C. to about 300° C., about 40° C. to about 250° C., about 75° C. to about 200° C., or about 100° C. to about 150° C. In further embodiments, the temperature is at least about 30° C., 40° C., 50° C., 60° C., 70° C., 75° C., 80° C., 90° C., 100° C., 105° C., 110° C., 120° C., 130° C., 140° C., 150° C., 160° C., 170° C., 180° C., 190° C., 200° C., 225° C., 250° C., or 275° C.

As in any embodiment above, a method wherein the method is conducted at a temperature in a range from about 80° C. to about 260° C.

As in any embodiment above, a method wherein the method is conducted at a temperature in a range from about 100° C. to about 200° C.

As in any embodiment above, a method wherein the method is conducted at a temperature of about 130° C.

As in any embodiment above, a method wherein the method is conducted at a temperature of about 150° C.

As in any embodiment above, a method wherein the method is conducted at a temperature of about 180° C.

As in any embodiment above, a method wherein the contacting occurs over a period of time in the range between about 1 second to about 24 hours, including, but not limited to, at least about 1 second, at least about 10 seconds, at least about 20 seconds, at least about 30 seconds, at least about 1 minute, at least about 5 minutes, at least about 15 minutes, at least about 30 minutes, at least about 1 hour, at least about 2 hours, at least about 3 hours, at least about 4 hours, at least about 6 hours, at least about 8 hours, at least about 10 hours, at least about 12 hours, at least about 14 hours, at least about 16 hours, at least about 18 hours, at least about 20 hours, at least about 22 hours or at least about 24 hours. In further embodiments, the time is in the range from about 1 second to about 1 minute, about 1 minute to about 10 minutes, about 10 minutes to about 1 hour, about 1 hour to about 2 hours, about 2 hours to about 4 hours, about 4 hours to about 8 hours, about 8 hours to about 16 hours, or about 16 hours to about 24 hours. In a further embodiment, the period of time is about 16 hours.

As in any embodiment above, a method wherein the compound of Formula I is present in a range from about 1 mol % to about 50 mol % compared to a polymer repeat unit. In further embodiments, the compound of Formula I is present in a range from about 5 mol % to about 40 mol %, about 10 mol % to about 30 mol %, or about 15 mol % to about 25 mol % compared to a polymer repeat unit, including, but not limited to, at least 1 mol %, at least 2 mol %, at least 3 mol %, at least 4 mol %, at least 5 mol %, at least 6 mol %, at least 7 mol %, at least 8 mol %, at least 9 mol %, at least 10 mol %, at least 11 mol %, at least 12 mol %, at least 13 mol %, at least 14 mol %, at least 15 mol %, at least 16 mol %, at least 17 mol %, at least 18 mol %, at least 19 mol %, at least 20 mol %, at least 21 mol %, at least 22 mol %, at least 23 mol %, at least 24 mol %, at least 25 mol %, at least 30 mol %, at least 35 mol %, at least 40 mol %, or at least 45 mol %. In an embodiment, the compound of Formula I is present in at least 10% compared to a polymer repeat unit.

As in any embodiment above, a method wherein at least 0.01% to at least 30% of the polymer repeat unit is xanthylated. In further embodiments, a method wherein at least 0.10% to at least 25% of the polymer repeat unit is xanthylated. In further embodiments, at least 0.01%, at least 0.02%, at least 0.03%, at least 0.04%, at least 0.05%, at least 0.06%, at least 0.07%, at least 0.08%, at least 0.09%, at least 0.10%, at least 0.11%, at least 0.12%, at least 0.13%, at least 0.14%, at least 0.15%, at least 0.16%, at least 0.17%, at least 0.18%, at least 0.19%, at least 0.20%, at least 0.25%, at least 0.30%, at least 0.40%, at least 0.50%, at least 0.60%, at least 0.70%, at least 0.80%, or at least 0.90% of the polymer repeat unit is xanthylated. In certain embodiments, a method wherein at least 0.1% of the polymer repeat unit is xanthylated. In further embodiments, at least 1.1%, at least 1.2%, at least 1.3%, at least 1.4%, at least 1.5%, at least 1.6% at least 1.7%, at least 1.8%, at least 1.9%, or at least 2% of the polymer repeat unit is xanthylated. In further embodiments, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, or at least 30% of the polymer repeat unit is xanthylated.

As in any embodiment above, a method wherein at least 0.01% to at least 30% of the polymer monomers are xanthylated. In further embodiments, a method wherein at least 0.10% to at least 25% of the monomers xanthylated. In further embodiments, at least 0.01%, at least 0.02%, at least 0.03%, at least 0.04%, at least 0.05%, at least 0.06%, at least 0.07%, at least 0.08%, at least 0.09%, at least 0.10%, at least 0.11%, at least 0.12%, at least 0.13%, at least 0.14%, at least 0.15%, at least 0.16%, at least 0.17%, at least 0.18%, at least 0.19%, at least 0.20%, at least 0.25%, at least 0.30%, at least 0.40%, at least 0.50%, at least 0.60%, at least 0.70%, at least 0.80%, or at least 0.90% of the monomers are xanthylated. In certain embodiments, a method wherein at least 0.1% of the monomers are xanthylated. In further embodiments, at least 1.1%, at least 1.2%, at least 1.3%, at least 1.4%, at least 1.5%, at least 1.6% at least 1.7%, at least 1.8%, at least 1.9%, or at least 2% of the monomers are xanthylated. In further embodiments, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, or at least 30% of the monomers are xanthylated.

As in any embodiment above, a method wherein the contacting occurs in the absence of solvent. For example, the contacting may occur with the polymer in the liquid state and a compound of Formula 1 dissolved in the liquid polymer. In another example, the contacting may occur when a compound of Formula I is applied directly to the surface of the polymer. In an additional embodiment, the contacting may occur in the presence of a photomask, which may provide for a patterned surface. As used herein, the term "photomask" refers to a patterning tool that defines a pattern for the surface of a polymer.

As in any embodiment above, a method wherein the contacting occurs in presence of solvent. The reactants and reagents may be miscible or immiscible in the solvent. In an embodiment, the concentration of Compound 1 present relevant to the amount of solvent is in the range from about 0.001M to about 10M, from about 0.01M to about 5M, from about 0.1M to about 1M, or from about 0.25M to about 0.75M, including, but not limited to at least about 0.001M, 0.01M, 0.1M, 0.2M, 0.25M, 0.5M, 0.75M, 1M, 5M, or 10M. In an embodiment, the concentration of Compound 1 present is about 0.20M.

In an embodiment, a xanthylated polymer comprising at least one structural unit of Formula II

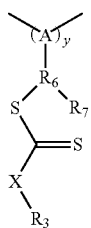

II wherein y is an integer with a value between 1 an 1,000,000;

$R_6$ is a bond, or substituted linear or branched $C_{1-15}$ alkyl;

$R_7$ is absent or present, and when present is hydrogen or substituted linear or branched $C_{1-15}$ alkyl;

X is a bond, —O—, —S—, or —NR$^5$, wherein R$^5$ is optionally substituted linear or branched $C_{1-6}$ alkyl;

$R_3$ is optionally substituted linear or branched $C_{1-6}$ alkyl, aryl, or heteroaryl;

A is a repeat unit of a polymer covalently bound to the xanthate, selected from

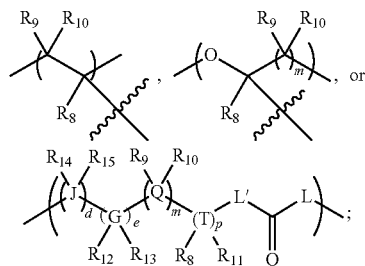

$R_8$, $R_9$, $R_{10}$, $R_{11}$, $R_{12}$, $R_{13}$, $R_{14}$, and $R_{15}$ in each instance, are absent or present, and when present are independently selected from hydrogen or optionally substituted linear or branched $C_{1-15}$ alkyl;

L and L' are each independently a bond or O;

J, G, Q, and T are independently selected from carbon, oxygen, (C=O), arene, or cycloalkane;

d, e, m and p, in each instance, are independently an integer between 0 and 20;

wherein at least one of d, e, m, and p is other than 0;

where at least one of J, G, Q, and T is a carbon covalently bound to $R_6$; and where the wavy line denotes the point of attachment of $R_6$ to the polymer backbone;

wherein A can be further represented by

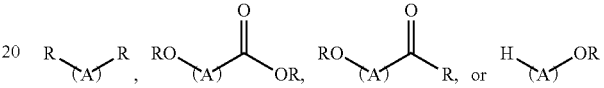

where R is H, optionally substituted linear or branched $C_{1-6}$ alkyl, or aryl.

In certain embodiments, a xanthylated polymer comprising at least one structural unit of Formula II

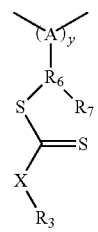

II wherein A is a repeat unit of a polymer covalently bound to the xanthate;

$R_6$ is a bond, or substituted linear or branched $C_{1-5}$ alkyl;

$R_7$ is absent or present, and when present is hydrogen or substituted linear or branched $C_{1-5}$ alkyl;

y is an integer with a value between 1 and 1,000,000;

X is a bond, —O—, —S—, or —NR$^5$, wherein R$^5$ is optionally substituted linear or branched $C_{1-6}$ alkyl; and $R_3$ is optionally substituted linear or branched $C_{1-6}$ alkyl, aryl, or heteroaryl.

As in any embodiment above, a xanthylated polymer wherein the polymer is a polyolefin which comprises a structural unit of Formula III

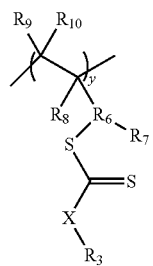

III wherein R₆ is a bond, or substituted linear or branched C$_{1-15}$ alkyl;

R$_7$ is absent or present, and when present is hydrogen or substituted linear or branched C$_{1-15}$ alkyl;

X is a bond, —O—, —S—, or —NR$^5$, wherein R$^5$ is optionally substituted linear or branched C$_{1-6}$ alkyl;

R$_3$ is optionally substituted linear or branched C$_{1-6}$ alkyl, aryl, or heteroaryl;

R$_8$, R$_9$, and R$_{10}$ in each instance, is independently selected from hydrogen or substituted linear or branched C$_{1-15}$ alkyl; and y is an integer with a value between 1 and 1,000,000.

As in any embodiment above, a xanthylated polyolefin wherein the xanthylated polyolefin has a carbon backbone.

As in any embodiment above, a xanthylated polyolefin, wherein the xanthylated polyolefin comprises the structural unit of Formula IV

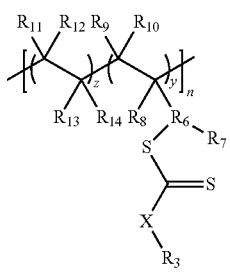

IV wherein R$_6$ is a bond, or substituted linear or branched C$_{1-15}$ alkyl;

R$_7$ is absent or present, and when present is hydrogen or substituted linear or branched C$_{1-15}$ alkyl;

R$_8$, R$_9$, R$_{10}$, R$_{11}$, R$_{12}$, R$_{13}$, and R$_{14}$, in each instance, is independently selected from hydrogen or substituted linear or branched C$_{1-15}$ alkyl;

X is a bond, —O—, —S—, or —NR$^5$, wherein R$^5$ is optionally substituted linear or branched C$_{1-6}$ alkyl;

R$_3$ is optionally substituted linear or branched C$_{1-6}$ alkyl, aryl, or heteroaryl;

n is an integer from 1 to 500,000; and z and y are integers from 1 to 1,000,000, wherein the ratio of z:y is in the range from about 100,000:1 to about 1:1.

In certain embodiments, z and y are integers from 1 to 1,000, wherein the ratio of z:y is in the range from about 1000:1 to about 1:1.

As in any embodiment above, a xanthylated polyolefin, wherein at least one of the R$_6$ is linear C$_{6-10}$ alkyl.

As in any embodiment above, a xanthylated polyolefin, wherein the xanthylated polyolefin is regioselectively xanthylated.

As in any embodiment above, a xanthylated polyolefin, wherein the xanthylated polyolefin is a branched polyolefin.

As in any embodiment above, a xanthylated polymer wherein the polymer is a polyether which comprises a structural unit of Formula V

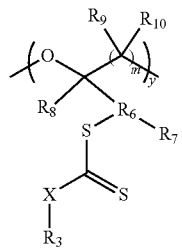

V wherein R$_6$ is a bond, or substituted linear or branched C$_{1-15}$ alkyl;

R$_7$ is absent or present, and when present is hydrogen or substituted linear or branched C$_{1-15}$ alkyl;

R$_8$ R$_9$, and R$_{10}$ are each independently selected from hydrogen or substituted linear or branched C$_{1-15}$ alkyl;

X is a bond, —O—, —S—, or —NR$^5$, wherein R$^5$ is optionally substituted linear or branched C$_{1-6}$ alkyl;

R$_3$ is optionally substituted linear or branched C$_{1-6}$ alkyl, aryl, or heteroaryl;

m is an integer between 0 and 20; and y is an integer with a value between 1 and 1,000,000.

As in any embodiment above, a xanthylated polyether, wherein the xanthylated polyether comprises the structural unit of Formula VI

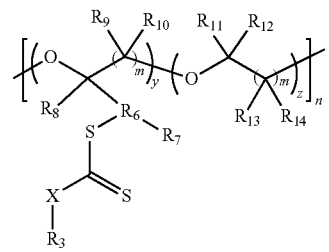

VI wherein R$_6$ is a bond, or substituted linear or branched C$_{1-15}$ alkyl;

R$_7$ is absent or present, and when present is hydrogen or substituted linear or branched C$_{1-15}$ alkyl;

R$_8$, R$_9$, R$_{10}$, R$_{11}$, R$_{12}$, R$_{13}$, and R$_{14}$ in each instance, is independently selected from hydrogen or substituted linear or branched C$_{1-15}$ alkyl;

X is a bond, —O—, —S—, or —NR$^5$, wherein R$^5$ is optionally substituted linear or branched C$_{1-6}$ alkyl;

R$_3$ is optionally substituted linear or branched C$_{1-6}$ alkyl, aryl, or heteroaryl;

m is an integer between 0 and 20;

z and y are integers from 1 to 1,000,000, wherein the ratio of z:y is in the range from about 100,000:1 to about 1:1; and n is an integer from 1 to 500,000.

In certain embodiments, z and y are integers from 1 to 1,000, wherein the ratio of z:y is in the range from about 1000:1 to about 1:1; and As in any embodiment above, a xanthylated polyether, wherein at least one of the R$_6$ is linear C$_{6-10}$ alkyl.

As in any embodiment above, a xanthylated polyether, wherein the xanthylated polyether is regioselectively xanthylated.

As in any embodiment above, a xanthylated polyether, wherein the xanthylated polyether is a branched polyether.

As in any embodiment above, a xanthylated polymer wherein the xanthylated polymer comprises

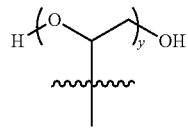

wherein at least 0.10% of the monomers are xanthylated with

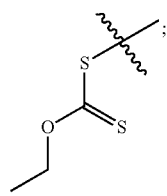

where y is an integer with a value between 1 and 1,000,000; and the wavy line denotes the point of attachment of

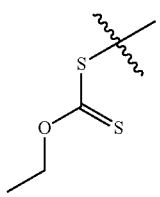 [SMILES: *SC(=S)OCC]

to the polymer backbone.

As in any embodiment above, a xanthylated polymer wherein the xanthylated polymer comprises

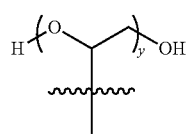

wherein at least 0.10% of the repeat units are xanthylated with

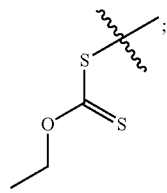

where y is an integer with a value between 1 and 1,000,000; and the wavy line denotes the point of attachment of

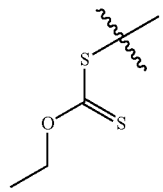 [SMILES: *SC(=S)OCC]

to the polymer backbone.

As in any embodiment above, a xanthylated polymer wherein said xanthylated

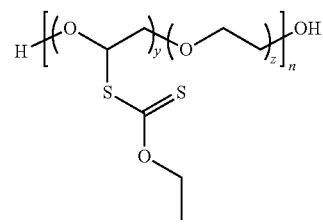

polymer has the structure:
wherein n is an integer from 1 to 500,000;
z is from about 0.01 to 0.99;
y is from about 0.1 to 0.9; and
wherein z and y represent the mole fraction of each unit and the sum of z and y is 1.

As in any embodiment above, a xanthylated polymer wherein the xanthylated polymer is a polyester or polycarbonate which comprises a structural unit of Formula VII

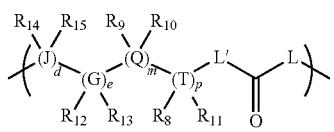

VII wherein $R_8$, $R_9$, $R_{10}$, $R_{11}$, $R_{12}$, $R_{13}$, $R_{14}$, and $R_{15}$ in each instance, are absent or present, and when present are independently selected from hydrogen or optionally substituted linear or branched $C_{1-15}$ alkyl;
y is an integer with a value between 1 and 1,000,000;
L and L' are each independently a bond or O;
J, G, Q, and T are each independently selected from carbon, oxygen, (C=O), arene, or cycloalkane;
d, e, m and p, in each instance, are independently an integer between 0 and 20;
wherein at least one of d, e, m, and p is other than 0;
where at least one of $R_8$, $R_9$, $R_{10}$, $R_{11}$, $R_{12}$, $R_{13}$, $R_{14}$, and $R_{15}$ is

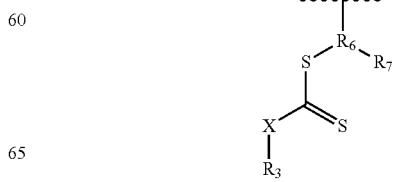

where the wavy line denotes the point of attachment of $R_6$ to the polymer backbone;

$R_6$ is a bond, or substituted linear or branched $C_{1-15}$ alkyl;

$R_7$ is absent or present, and when present is hydrogen or substituted linear or branched $C_{1-15}$ alkyl;

X is a bond, —O—, —S—, or —NR$^5$, wherein R$^5$ is optionally substituted linear or branched $C_{1-6}$ alkyl; and $R_3$ is optionally substituted linear or branched $C_{1-6}$ alkyl, aryl, or heteroaryl.

As in any embodiment above, a xanthylated polymer wherein the polymer is a polyester or polycarbonate which comprises a structural unit of Formula VIII

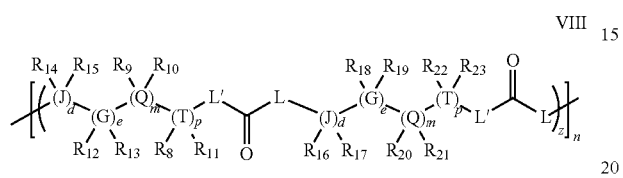

$R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, and $R_{23}$ in each instance, are absent or present, and when present are independently selected from hydrogen or optionally substituted linear or branched $C_{1-15}$ alkyl;

L and L' are each independently a bond or O;

J, G, Q, and T are each independently selected from carbon, oxygen, (C=O), arene, or cycloalkane;

d, e, m and p, in each instance, are independently an integer between 0 and 20;

wherein at least one of d, e, m, and p is other than 0;

where at least one of $R_8$, $R_9$, $R_{10}$, $R_{11}$, $R_{12}$, $R_{13}$, $R_{14}$, and $R_{15}$ is

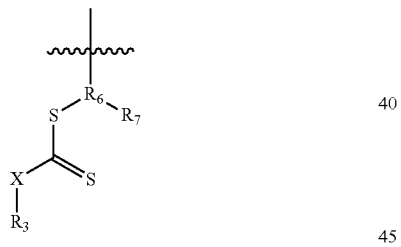

where the wavy line denotes the point of attachment of $R_6$ to the polymer backbone;

$R_6$ is a bond, or substituted linear or branched $C_{1-15}$ alkyl;

$R_7$ is absent or present, and when present is hydrogen or substituted linear or branched $C_{1-15}$ alkyl;

X is a bond, —O—, —S—, or —NR$^5$, wherein R$^5$ is optionally substituted linear or branched $C_{1-6}$ alkyl;

$R_3$ is optionally substituted linear or branched $C_{1-6}$ alkyl, aryl, or heteroaryl;

z and y are integers from 1 to 1,000,000, wherein the ratio of z:y is in the range from about 100,000:1 to about 1:1; and n is an integer from 1 to 500,000.

In certain embodiments, z and y are integers from 1 to 1,000, wherein the ratio of z:y is in the range from about 1000:1 to about 1:1.

As in any embodiment above, a xanthylated polyester or polycarbonate, wherein at least one of the $R_6$ is linear $C_{6-10}$ alkyl.

As in any embodiment above, a xanthylated polyester or polycarbonate, wherein the xanthylated polyester or polycarbonate is a branched polyester or polycarbonate.

As in any embodiment above, a xanthylated polymer wherein the xanthylated polymer comprises the structural unit

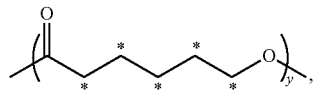

where * denotes possible points of attachment of

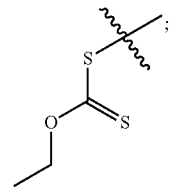 [SMILES: *SC(=S)OCC]

y is an integer with a value between 1 and 1,000,000; and wherein at least 1% of the monomers are xanthylated.

As in any embodiment above, a xanthylated polymer wherein the xanthylated polymer comprises the structural unit

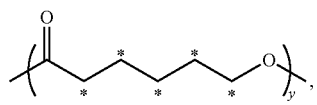

where * denotes possible points of attachment of

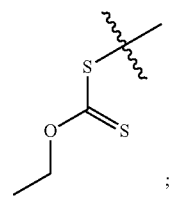

y is an integer with a value between 1 and 1,000,000; and wherein at least 1% of the repeat units are xanthylated.

As in any embodiment above, a xanthylated polymer wherein said xanthylated polymer comprises the structural unit

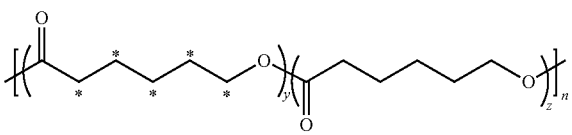

where * denotes possible points of attachment of

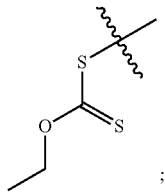 [SMILES: *SC(=S)OCC]

n is an integer from 1 to 500,000;
z is from about 0.01 to 0.99;
y is from about 0.1 to 0.9; and
wherein z and y represent the mole fraction of each unit and the sum of z and y is 1.

IV. Polymers

The polymers suitable for the subject matter described herein are not particularly restricted, and the selection of a suitable polymer is within the purview of a person skilled in the art.

As used through this specification, the term "polyolefin" is intended to have a broad meaning and includes any class of polymers produced from a simple olefin. The term "polyolefin" encompasses homopolymers, copolymers, terpolymers, etc. which are derived from the polymerization of at least one olefin monomer. Non-limiting examples of polyolefins are polyethylene (PE), polypropylene (PP), polymethylpentene (PMP), polybutene-1 (PB-1), polyisobutylene (PIB), poly-1-octene, poly-1-decene, hydrogenated polyisoprene, poly(norbornene) and ethylene propylene rubber (EPR).

As used throughout this specification, the term "olefin monomer" is intended to have a broad meaning and encompasses α-olefin monomers, diolefin monomers and polymerizable monomers containing at least one internal olefin linkage.

In a preferred embodiment, the olefin monomer is a α-olefin monomer. α-Olefin monomers are well known in the art and the choice thereof for use in the present process is within the purview of a person skilled in the art. Preferably, the α-olefin monomer is selected from the group comprising propylene, 1-butene, isobutene, 1-pentene, 1-hexene, 1-octene, 1-decene, branched isomers thereof, styrene, α-methylstyrene and mixtures thereof. In an embodiment, the α-olefin monomer is propylene.

In another embodiment, the olefin monomer comprises a diolefin monomer. Diolefin monomers are well known in the art and the choice thereof for use in the present process is within the purview of a person skilled in the art. In one embodiment, the diolefin monomer is an aliphatic compound. Non limiting examples of suitable aliphatic compounds may be selected from the group comprising 1,3-butadiene, isoprene, 2,3-dimethyl-1,3-butadiene, 2-ethyl-1,3-butadiene, piperylene, myrcene, allene, 1,2-butadiene, 1,4,9-decatrienes, 1,4-hexadiene, 1,6-octadiene, 1,5-hexadiene, 4-methyl-1,4-hexadiene, 5-methyl-1,4-hexadiene, 7-methyl-1,6-octadiene, phenylbutadiene, pentadiene and mixtures thereof. In another embodiment, the diolefin monomer is an alicyclic compound. Non-limiting examples of suitable alicyclic compounds may be selected from the group comprising norbornadiene, alkyl derivatives thereof, 5-alkylidene-2-norbornene compounds, 5-alkenyl-2-norbornene compounds and mixtures thereof, such as 5-methylene-2-norbornene, 5-ethylidene-2-norbornene, 5-propenyl-2-norbornene and mixtures thereof. Further non-limiting examples of suitable alicyclic compounds may be selected from the group comprising 1,4-cyclohexadiene, 1,5-cyclooctadiene, 1,5-cyclododecadiene, methyltetrahydroindene, dicyclopentadiene, bicyclo [2.2.1]hepta-2,5-diene and mixtures thereof.

It is possible to utilize mixtures of the various types of olefin monomers described hereinabove.

In one embodiment, the olefin monomer is a mixture of ethylene and at least one α-olefin (as described hereinabove) which results in the production of a copolymer. In an embodiment, such a monomer mixture comprises ethylene and propylene. In a further embodiment, the mixture comprises from about 30 to about 75 or from about 35 to about 65 weight percent ethylene and from about 25 to about 70 or from about 35 to about 65 weight percent α-olefin. In another embodiment, the olefin is a mixture of ethylene, at least one α-olefin (as described hereinabove) and at least one diolefin monomer (as described hereinabove) which results in the production of a terpolymer. The monomer mixture may comprise ethylene, propylene and one or both of 5-ethylidene-2-norbornene and 1,5-hexadiene. In an embodiment, the mixture of ethylene and α-olefin may be from about 0.5 to about 15 or from about 1 to about 10 weight percent of the diolefin monomer.

In an embodiment, the polyolefins may be selected from the group consisting of polypropylene, polyethylene, ethylene-propylene copolymers, polyisobutylene and blends of two or more of these polyolefins. In an embodiment, the polyolefin is polypropylene.

The polyolefin materials used in the present process may be commercially available and/or may be readily produced using free radical, Ziegler-Natta and/or metallocene polymerization techniques and the like.

As used herein, terms identifying polymers, such as "polyether," "polyester," "polycarbonate," and "polyolefin" are inclusive of not only polymers comprising repeating units derived from monomers known to polymerize to form a polymer of the named type, but are also inclusive of comonomers, derivatives, etc. which can copolymerize with monomers known to polymerize to produce the named polymer.

As used through this specification, the term "polyether" is intended to have a broad meaning and includes any class of polymers produced that contain an ether functional group in their main chain (i.e. R—O—R' where R and R' each an or alkyl or aryl group).

The term "polyether" encompasses homopolymers, copolymers, terpolymers, etc. Non-limiting examples of polyethers are polyethylene glycol (PEG), poly(propylene glycol), poly(tetrahydrofuran), poly(oxetane), Pluronic® surfactants such as poly(ethylene glycol)-block-poly(propylene glycol)-block-poly(ethylene glycol), poly(methyl glycidyl ether), poly(ethyl glycidyl ether), poly(isopropyl glycidyl ether), poly(allyl glycidyl ether), polyacetal, paraformaldehyde (POM), polyethylene oxide (PEO), polyoxyethylene (POE), polypropylene oxide, polyoxypropylene, polytetramethylene glycol (PTMG), poly(2-ethyloxirane), poly(2-butyloxirane), poly(2-hexyloxirane), and polytetramethylene ether glycol. Polyethylene glycol, for example, may be synthesized by the reaction of ethylene oxide with water and ethylene glycol or ethylene glycol oligomers.

As used through this specification, the term "polyester" is intended to have a broad meaning and includes any class of polymers that contain an ester functional group in their main chain (i.e. R—C═O(O)—R' where R and R' are each an alkyl or aryl group). The term "polyester" encompasses homopolymers, copolymers, terpolymers, etc. Non limiting examples by which polyesters can be generated are polycondensation and ring-opening polymerization. For example, polycondensation of glycolic acid can produce polyglycolide; ring-opening polymerization of lactide can generate polyactic acid; and ring-opening polymerization of caprolactone can generate polycaprolactone. Non-limiting examples of polyethers are polycaprolactone (PCL), poly(ethylene terephthalate) (PET), polylactide or polyactic acid (PLA), polyglycolide (PGA), poly-δ-valerolactone, polyhydroxybuterate, Tritan™ (such as polyesters derived from tetramethyl cyclobutanediol), polyhydroxyalkanoate (PHA), polyethylene adipate (PEA), polybutylene succinate (PBS), polybutylene terephthalate (PBT), and polytrimethylene terephthatate (PTT).

As used through this specification, the term "polycarbonate" is intended to have a broad meaning and includes any class of polymers that contain a carbonate functional group in their main chain (i.e. R—(O)C═O(O)—R' where R and R' are each an alkyl or aryl group). Nonlimiting examples of polycarbonates are poly(trimethylenecarbonate) and bisphenol-A-containing polycarbonates. Bisphenol A-derived polycarbonates, for example, may be synthesized from the reaction of bisphenol A with sodium hydroxide and phosphgene.

As used herein, the term "repeat unit" has the ordinary meaning understood by one of ordinary skill in the art. In some embodiments, the term "repeat unit" refers to a part of a polymer which attaches in at least two positions to another repeat unit or a terminal unit of the polymer.

As used herein, the term "branched repeat unit" has the ordinary meaning understood by one of ordinary skill in the art. In some embodiments, the term "branched repeat unit" refers to a repeat unit which attaches in at least three positions to another repeat unit or a terminal unit of the polymer.

As used herein, the term "terminal unit" has the ordinary meaning understood by one of ordinary skill in the art. In some embodiments, the term "terminal unit" refers to a part of a polymer which attaches at only one position to a repeat unit of the polymer.

The polymers, such as the polyolefins, polyesters, polyethers, and polycarbonates used in the present process may have a molecular weight (Mn) in the range from about 100 g/mol to about 25,000,000 g/mol, including, but not limited to, about 100 g/mol, about 200 g/mol, about 250 g/mol, about 300 g/mol, about 400 g/mol, about 500 g/mol, about 600 g/mol, about 700 g/mol, about 800 g/mol, about 900 g/mol, about 1,000 g/mol, about 2,000 g/mol, about 5,000 g/mol, about 10,000 g/mol, about 15,000 g/mol, about 20,000 g/mol, about 25,000 g/mol, about 50,000 g/mol, about 100,000 g/mol, about 150,000 g/mol, about 200,000 g/mol, about 300,000 g/mol, about 400,000 g/mol, about 500,000 g/mol, about 1,000,000 g/mol, about 2,000,000 g/mol, about 3,000,000 g/mol, about 4,000,000 g/mol, about 5,000,000 g/mol, about 6,000,000 g/mol, about 7,000,000 g/mol, about 8,000,000 g/mol, about 9,000,000 g/mol, about 10,000,000 g/mol, about 11,000,000 g/mol, about 12,000,000 g/mol, about 13,000,000 g/mol, about 14,000,000 g/mol, about 15,000,000 g/mol, about 16,000,000 g/mol, about 17,000,000 g/mol, about 18,000,000 g/mol, about 19,000,000 g/mol, about 20,000,000 g/mol, about 21,000,000 g/mol, about 22,000,000 g/mol, about 23,000,000 g/mol, about 24,000,000 g/mol, or about 25,000,000 g/mol.

Polymers can range in size from between about 100 g/mol to about 25,000,000 g/mol, about 200 g/mol to about 150,000 g/mol, about 500 g/mol to about 100,000 g/mol, about 1,000 g/mol to about 50,000 g/mol, about 2,000 g/mol to about 10,000 g/mol, or about 3,000 g/mol to about 6,000 g/mol. Polymers may also range in size from between about 200,000 g/mol to about 10,000,000 g/mol, between about 300,000 g/mol to about 8,000,000 g/mol, between about 400,000 g/mol to about 6,000,000 g/mol, between about 500,000 g/mol to about 4,000,000 g/mol, between about 750,000 g/mol to about 2,000,000 g/mol. Polymers may also range in size from between about 2,500,000 g/mol to about 5,000,000 g/mol, between about 6,000,000 g/mol to about 10,000,000 g/mol, between about 8,000,000 g/mol to about 12,000,000 g/mol, between about 9,000,000 g/mol to about 15,000,000 g/mol, between about 12,000,000 g/mol to about 20,000,000 g/mol, between about 13,000,000 g/mol to about 17,000,000 g/mol, between about 15,000,000 g/mol to about 22,000,000 g/mol, and between about 20,000,000 g/mol to about 25,000,000 g/mol. It will be understood by those of skill in the art that reference to molecular weight refers to a population of polymer molecules and not necessarily to single or particular polymer molecules.

As used herein, the term "xanthylated polymer" refers to a polymer wherein a xanthate group is covalently bonded to a carbon. The xanthate group may be attached to a 1°, 2°, or 3° carbon. The xanthate group may be covalently bonded to the carbon backbone of the polymer or a side-chain of the polymer. As used herein, the term "carbon backbone" or "polymer backbone" refers to the longest series of covalently bonded atoms that together create the continuous chain of the polymer. As used herein, the term "side-chain" refers to a chemical group that is attached to the polymer backbone.

Non-limiting examples of xanthylated polyolefins are represented by structural units of Formula II, III, and IV in addition to other examples described herein. Non-limiting examples of xanthylated polyethers are represented by structural units of Formula V and VI in addition to other examples described herein. Non-limiting examples of xanthylated polyesters or polycarbonates are represented by structural units of Formula VII and VIII in addition to other examples described herein.

As used herein, the term "functionalized polymer" refers to a polymer which contains a functional group. Non-limiting examples of "functionalized polymers" are represented by the structure of Formula IX, wherein the —S—CH$_2$—R$_2$ represents the functional group.

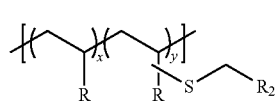

IX

As used herein, the term "functional group" refers to a chemical group which replaces the xanthate moiety on the xanthylated polymer. Non-limiting examples of functional groups include thiols, epoxides, anhydrides, carboxylic acids, amines, amides, boron containing compounds, silicon containing compounds, cyano-containing compounds, sulfates, sulfonates, sulfites, esters, thioesters, dithioesters, ether, halides, phosphates, phosphoonates, phosphines, phosphites, olefins, alkyl-thiols, perfluorinated alkyl, fluoroalkyl-thiols, thiol-enes, sugars, catechols, and catecholamides, and mixtures thereof. The choice of functional groups and of the compounds which contribute such functional groups may be selected by a person of ordinary skill in the art depending on the particular application for the modified polymer. While the methods described herein utilize a compound having at least one functional group, the number of functional groups introduced is not restricted and is within the purview of the worker skilled in the art.

As used herein, the term "crosslinked polymer" refers to a polymer in which one polymer chain is linked to another. Non-limiting examples of "crosslinked polymer" are represented by the structure of Formula X.

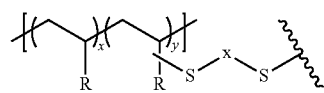

X

As used herein, the term "grafted polymer" refers to a branched polymer which contains a side chain where the components of the side chain are structurally different than that of the main chain. Although the side chains are structurally distinct from the main chain, the individual grafted chains may be homopolymers or copolymers. By grafting polymers onto polymer backbones, the final grafted copolymers gain new properties from their parent polymers. Non-limiting examples of "grafted polymers" may be represented by the structure of Formula XI.

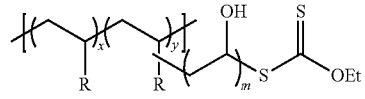

XI

As used herein, the term "xanthylated polyolefin" refers to a polyolefin wherein a xanthate group is covalently bonded to a carbon. The xanthate group may be covalently bonded to the carbon backbone of the polyolefin or a side-chain of the polyolefin.

As used herein, the term "xanthylated polyether" refers to a polyether wherein a xanthate group is covalently bonded to a carbon. The xanthate group may be covalently bonded to the polymer backbone of the polyether or a side-chain of the polyether.

As used herein, the term "xanthylated polyester" refers to a polyester wherein a xanthate group is covalently bonded to a carbon. The xanthate group may be covalently bonded to the polymer backbone of the polyester or a side-chain of the polyester.

As used herein, the term "xanthylated polycarbonate" refers to a polycarbonate wherein a xanthate group is covalently bonded to a carbon. The xanthate group may be covalently bonded to the polymer backbone of the polycarbonate or a side-chain of the polycarbonate.

As used herein, the term "thermoset" refers to a polymer that is irreversibly cured from a soft solid or viscous liquid prepolymer or resin.

As used herein, the term "elastomer" refers to a natural or synthetic polymer having elastic properties, e.g., rubber.

The following examples are offered by way of illustration and not by way of limitation.

EXAMPLES

Example 1: General Approach Using Compound 1

Xanthyl transfer reagent Compound 1 was used for xanthylation experiments. Compound 1 is pictured below:

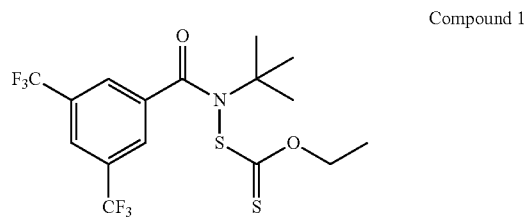 [SMILES: CCOC(=S)SN(C(=O)c1cc(C(F)(F)F)cc(C(F)(F)F)c1)C(C)(C)C]

Compound 1

Without being bound by theory, it is believed the reaction proceeds through an amidyl radical reactive intermediate.[17] As a soluble and well-defined model for branched polyolefins, polyethylethylene was used which has a number average molecular weight ($M_n$) of 3.6 kg/mol and a dispersity (Đ) of 1.24 when compared to polystyrene standards.

The polyethylethylene was prepared by the exhaustive reduction of a polybutadiene parent polymer with 90% 1,2 additions. The well-defined structure of the branched polyolefin enabled the visualization of even subtle changes in the $M_n$ and Đ under the reaction conditions by gel permeation chromatography (GPC).

Without being bound by theory, it is believed that a key the methods described herein is the use of electrophilic nitrogen-centered radicals (prepared from compounds such as those of Formula I) that have bond dissociation free energies (BDFE=107-110 kcal/mol) which are considerably higher than that of C—H bonds (BDFE=96-101 kcal/mol).[11] Due to their favorable thermodynamics, these amidyl radicals can perform intermolecular, C—H bond homolysis with regioselectivity dictated by the steric and electronic nature of the reagent.[12-15] This reagent-controlled selectivity provides the opportunity to disfavor the generation of tertiary radicals in the polymer backbone that are known to degrade material properties.

Dithiocarbonyl groups, xanthates in particular, are versatile groups from which a single intermediate can be transformed into a variety of functionalities important for polymer properties and/or further reactivity.[16] Xanthates, therefore, represent a "universal" synthetic intermediate to unlock an array of advanced materials from commodity polyolefins (Scheme 1).

Scheme 1 Shows Approaches to the Post-Polymerization Modification of Branched Polyolefins.

SCHEME 1

Current Commercial Approach: Maleic anhydride grafting

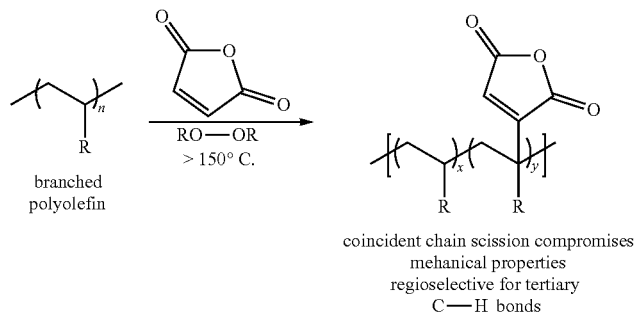

coincident chain scission compromises mehanical properties
regioselective for tertiary
C—H bonds Regiospecific functionalization: Rhodium catalyzed hydroxylation

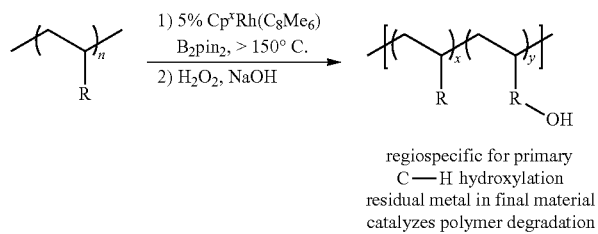

regiospecific for primary
C—H hydroxylation
residual metal in final material
catalyzes polymer degradation This work: regioselective polyolefin xanthylation

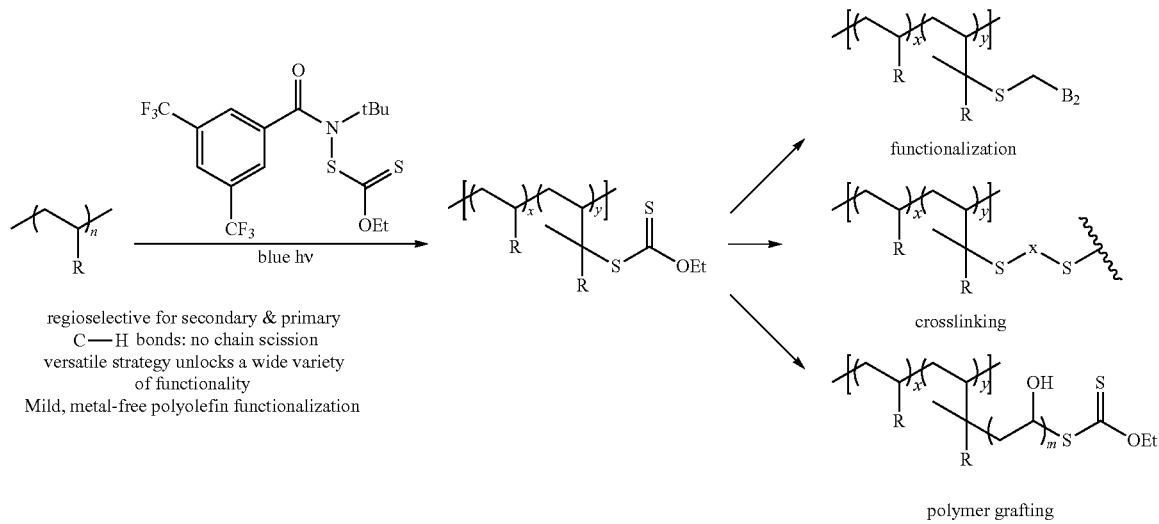

regioselective for secondary & primary
C—H bonds: no chain scission
versatile strategy unlocks a wide variety
of functionality
Mild, metal-free polyolefin functionalization functionalization crosslinking polymer grafting

Example 2: Synthesis of Compound 1

Initial studies towards the synthesis of Compound 1 using approaches involving the direct N-xanthylation of amides with strong base were unsuccessful (F. Gagosz, C. Moutrille, S. Z. Zard, *Org. Lett.* 4:2707-2709(2002)). However, a new approach to the synthesis of Compound 1 was developed that avoids the use of strongly basic conditions and is also amenable to large-scale preparation. In an embodiment, chlorobenzamide Compound S4 is contacted with potassium ethyl xanthate to yield shelf-stable N-xanthylamide Compound 1 on decagram scale. Additionally, Compound 1 shows no degradation after being stored foil-wrapped at 0° C. for four months. At room temperature in CDCl$_3$ solution in ambient laboratory light, less than 5% degradation is observed after two months.

N-(tert-butyl)-3,5-bis(trifluoromethyl)benzamide (Compound S3)

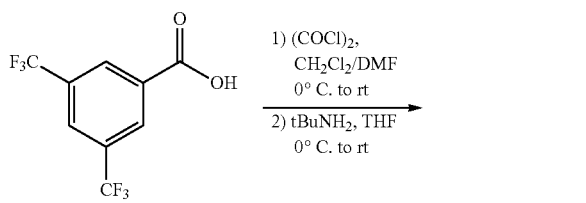

Oxalyl chloride (9.85 mL, 116.23 mmol) was added dropwise to a solution of 3,5-bis(trifluoromethyl)benzoic acid (15 g, 58.11 mmol) in CH$_2$Cl$_2$/DMF (232 mL/1 mL) at 0° C., and the resulting solution was allowed to warm to rt overnight. The mixture was concentrated in vacuo and resuspended in THF (200 mL) and chilled to 0° C. t-Butylamine (12.21 mL, 116.23 mmol) was added, and the mixture was warmed to rt and stirred overnight. The ammonium salts were filtered and the mixture was concentrated in vacuo and the residue suspended in Et$_2$O (250 mL) and washed with 3M NaOH (1×200 mL), 1M HCl (1×200 mL), brine (1×200 mL), dried with MgSO$_4$, and concentrated to afford Compound S3 as a pale yellow solid (16.12 g, 89% yield). Compound S3 was used without purification.

N-(tert-butyl)-N-chloro-3,5-bis(trifluoromethyl)benzamide (Compound S4)

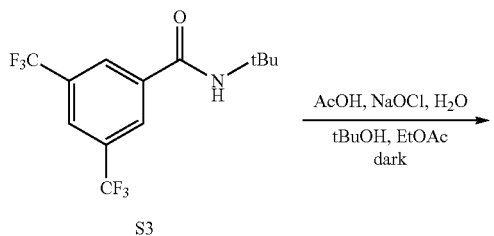

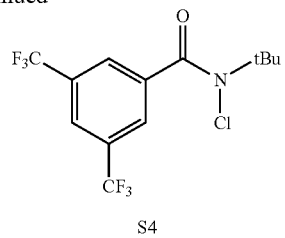

With the laboratory lights off, tBuOH (7.8 mL) was added to a solution of Compound S3 in EtOAc (296 mL). To this solution, a solution of AcOH (68 mL), NaOCl (172 mL), and H$_2$O (103 mL) was added dropwise over 2 h via addition funnel. The mixture was stirred vigorously for 2 days, then diluted with CH$_2$Cl$_2$ (200 mL) and quenched with sat. aq. NaHCO$_3$ (200 mL). The aqueous phase was extracted with CH$_2$Cl$_2$ (3×300 mL), and the combined organic phase was washed with brine (1×500 mL), dried with MgSO$_4$, and concentrated in vacuo followed by 1 day under high vacuum to afford Compound S4 as a yellow oil (14.2 g, 97% yield), which was used without any additional purification.

N-(tert-butyl)-N-((ethoxycarbonothioyl)thio)-3,5-bis(trifluoromethyl) benzamide (Compound 1)

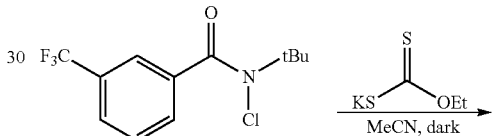

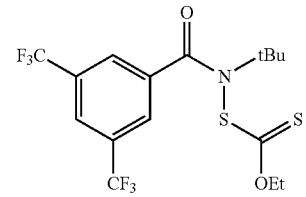

With the laboratory and hood lights off, in a 2-neck, 5 L round-bottom flask, potassium ethyl xanthate (6.55 g, 40.84 mmol) was suspended in MeCN (1.7 L). To this suspension was added a solution of Compound S4 (14.2 g, 40.84 mmol) in MeCN (350 mL) via cannula wire over 20 min. The round-bottom was foil wrapped and stirred for 16 h, at which point the suspension was concentrated in vacuo and left under high-vacuum for 20 h. The residue was taken up in CH$_2$Cl$_2$/H$_2$O (1:1, 2 L total volume) and the layers were separated. The organic layer was washed with brine, dried with MgSO$_4$, and concentrated in vacuo. The resultant orange solid was purified by careful flash column chromatography on silica (hexanes flush until the first yellow band had fully eluted, then 0-5% Et$_2$O in hexanes) to afford Compound 1 as a yellow solid (8.47 g, 48% yield).

$^1$H NMR (600 MHz, CDCl$_3$) δ 7.88 (s, 1H), 7.86 (s, 2H), 4.71-4.61 (m, 2H), 1.58 (s, 9H), 1.49 (t, J=7.1 Hz, 3H). $^{13}$C NMR (151 MHz, CDCl$_3$) δ 212.00, 172.59, 139.98, 131.60 (q, J=33.8 Hz), 127.11 (d, J=3.9 Hz), 123.69 (q, J=3.7 Hz), 123.05 (q, J=272.8 Hz), 70.84, 64.15, 28.94, 13.77. IR (film) 2981.41, 2938.02, 2360.44, 1680.66, 1368.25, 1279.59, 1183.11, 1136.83 cm$^{-1}$. HRMS (ES+) Exact mass calcd for C$_{16}$H$_{18}$F$_6$NO$_2$S$_2$ [M+H]$^+$, 434.0677. Found 434.0686.

Example 3: Synthesis of Additional Reagents of Formula (I)

New synthetic routes were developed to prepare reagents of Formula (I) for xanthylation studies (FIG. 1). Similar to the synthesis of Compound 1, functionalized amides were obtained through a chloroamide intermediate that was generated from a carboxylic acid starting material (Scheme 2). Scheme 2 shows approaches for preparing xanthylamides and trithiocarbonylamides.

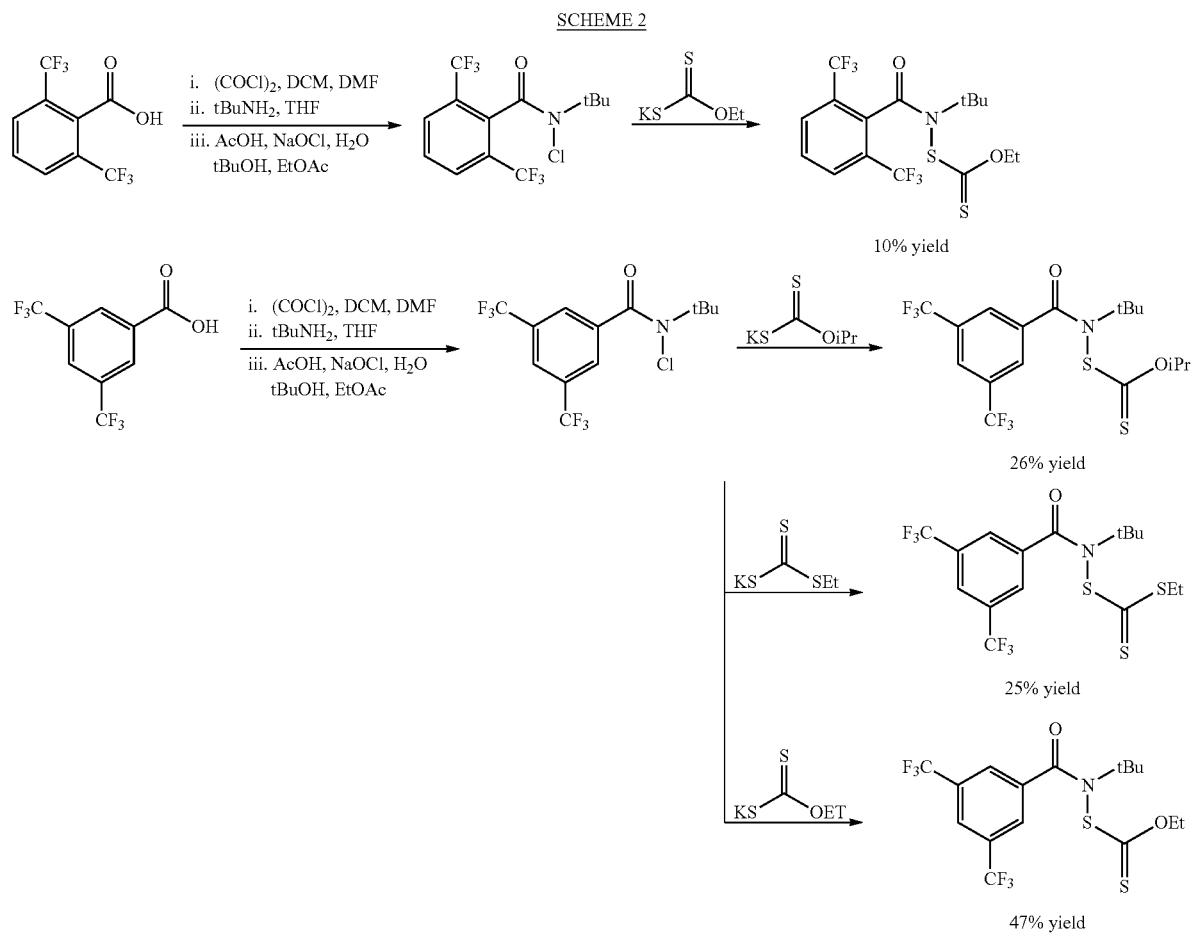

Dithiocarbamyl substrates are generally known to be less prone to aminolysis; formation of the amide was accomplished by amide coupling of an amine and an acid (Scheme 3). The synthetic route for the preparation of thiocarbamaylsulfenamides and subsequent amide coupling is shown in Scheme 3. When R=Et$_2$, the yield was 87%. When R=Me, Ph, the yield was 82%.

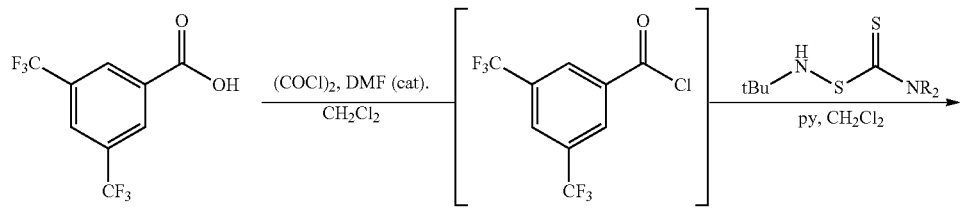

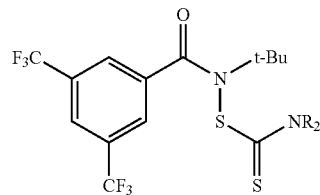

Reacting thiocarbamylsulfenamide with acetic anhydride afforded dithiocarbamyl trifluoroacetamide, which was used as a functionalizing agent on both polymeric and small molecule substrates (Scheme 4). The preparation route for the synthesis of dithiocarbamyl trifluoroacetamide is shown in Scheme 4. The overall yield was 89% over the two steps.

SCHEME 4

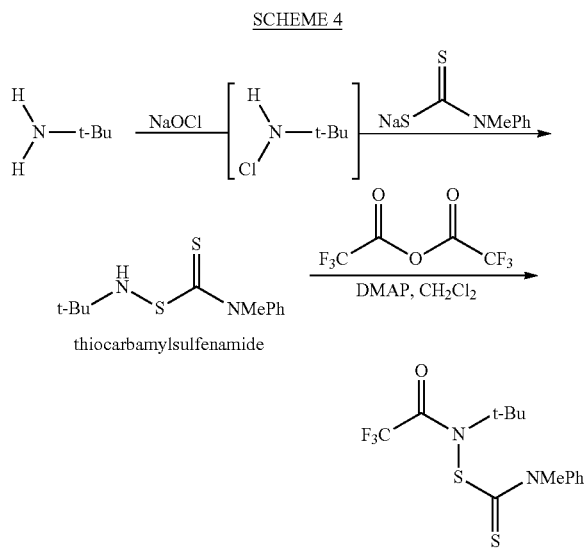

Example 4: Photochemical Xanthylation of Polyethylethylene

Reactions were performed by contacting polyethylethylene with varying amounts of Compound 1 in trifluorotoluene at room temperature under blue light irradiation at a concentration of 0.20 M relative to Compound 1 for 16 hours. Table 1 displays the results of a reaction screen for xanthyl transfer to polyethylethylene. The ratio of Compound 1 compared to the number of monomer repeat units was varied and percent functionalization was analyzed by integration of the $^1$H NMR spectra. Increasing the concentration of Compound 1 compared to repeat unit led to an increased amount of polyolefin xanthylation. Significantly, these conditions allowed control of the concentration of polyolefin functionality up to 22 mol %, which corresponds to 48 wt % xanthate. The efficiency of xanthyl group-transfer decreases as the ratio of Compound 1 to repeat unit increases. Without being bound by theory, this is attributed to the steric hindrance of the polymer at high mol % xanthylation. The only side product observed after reaction is the S—S dimer of ethyl xanthate, which is easily removed by polymer precipitation.

TABLE 1

The results of polyethylethylene xanthylation by photochemical initiation.

| other information | equiv. 1: repeat unit | % xanthylation | Regioselectivity 2°:1° | $T_g$ (° C.) |
|---|---|---|---|---|
| control | 0 | — | — | −53 |
|  | 1:20 | 3.0% | 2.3:1 | −44 |
|  | 1:10 | 6.0% | 1.8:1 | −40 |
|  | 1:5 | 11% | 1.8:1 | −35 |
|  | 1:2 | 18% | 2.3:1 | −27 |
|  | 1:1 | 22% | 2.2:1 | −23 |
| no solvent (60° C.) | 1:20 | 4.0% | 1.5:1 |  |
| CH$_4$Cl$_2$ (120° C.) | 1:10 | 5.0% | 1.8:1 |  |

Percent xanthylation and the regioselectivity were determined by $^1$H NMR.
The glass transition temperature ($T_g$) was measured during the second heating cycle at a ramp rate of 10° C./min.

Figure 2A:
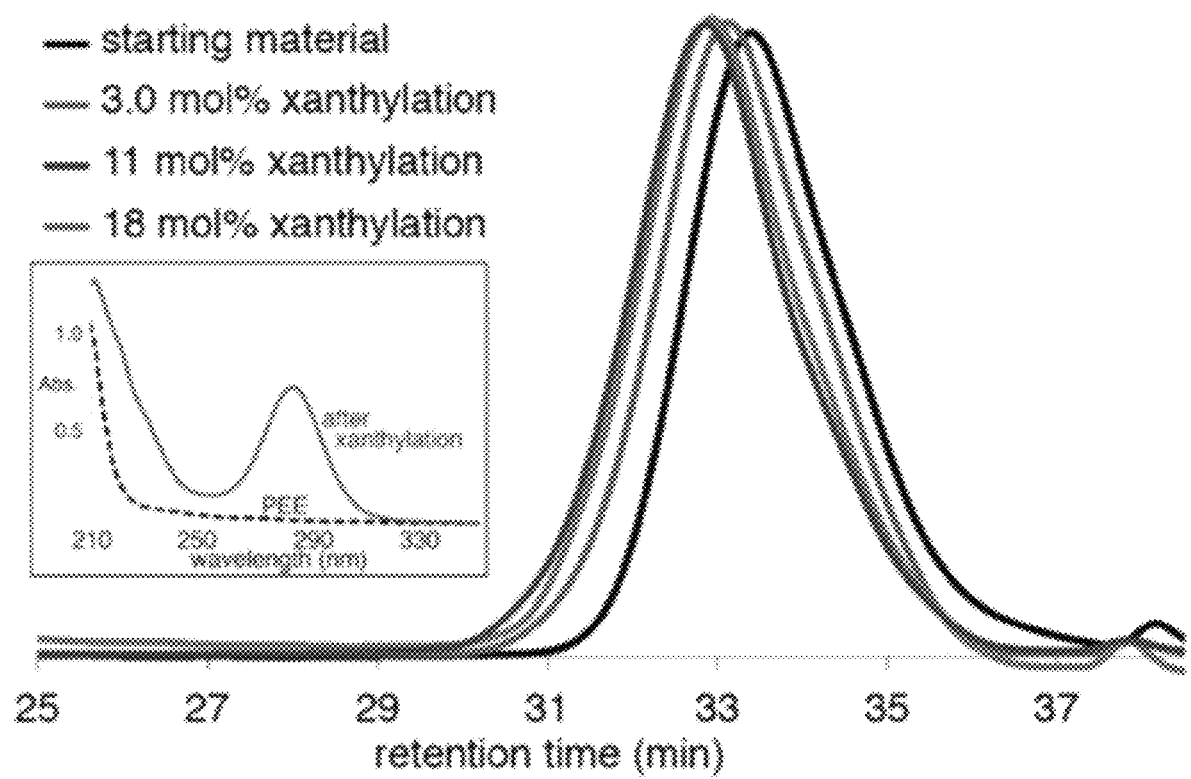
FIG. 2A shows GPC traces of polyethylethylene before and after xanthylation with an inset of the GPC photodiode array spectra at 33.0 minutes of samples both before and after xanthylation.

The GPC traces of the xanthylated polyolefin shift to lower retention time compared to the parent material and their molecular weight distributions remain constant (FIG. 2A). After reaction, the GPC trace shifted slightly to higher molecular weight while the molecular weight distribution (MWD) remained unchanged. As an example, the material with 6 mol % xanthylation demonstrated a M. of 4.6 kg/mol and a Đ of 1.22 and the material with 18% xanthylation achieved a M of 5.0 kg/mol and a Đ of 1.29. These results are in stark contrast to traditional radical-based functionialization of branched polyolefins using peroxide initiators, which typically result in chain scission and a significant broadening of the MWD.[3,4,18] Only when high concentrations of Compound 1 were used compared to repeat unit (such as entry 5, i.e., 1:1 ratio of Compound 1:repeat unit) was observed a small (>5%) high molecular weight shoulder in the GPC, which is attributed to radical-radical coupling of two polymer chains.

Figure 2B:
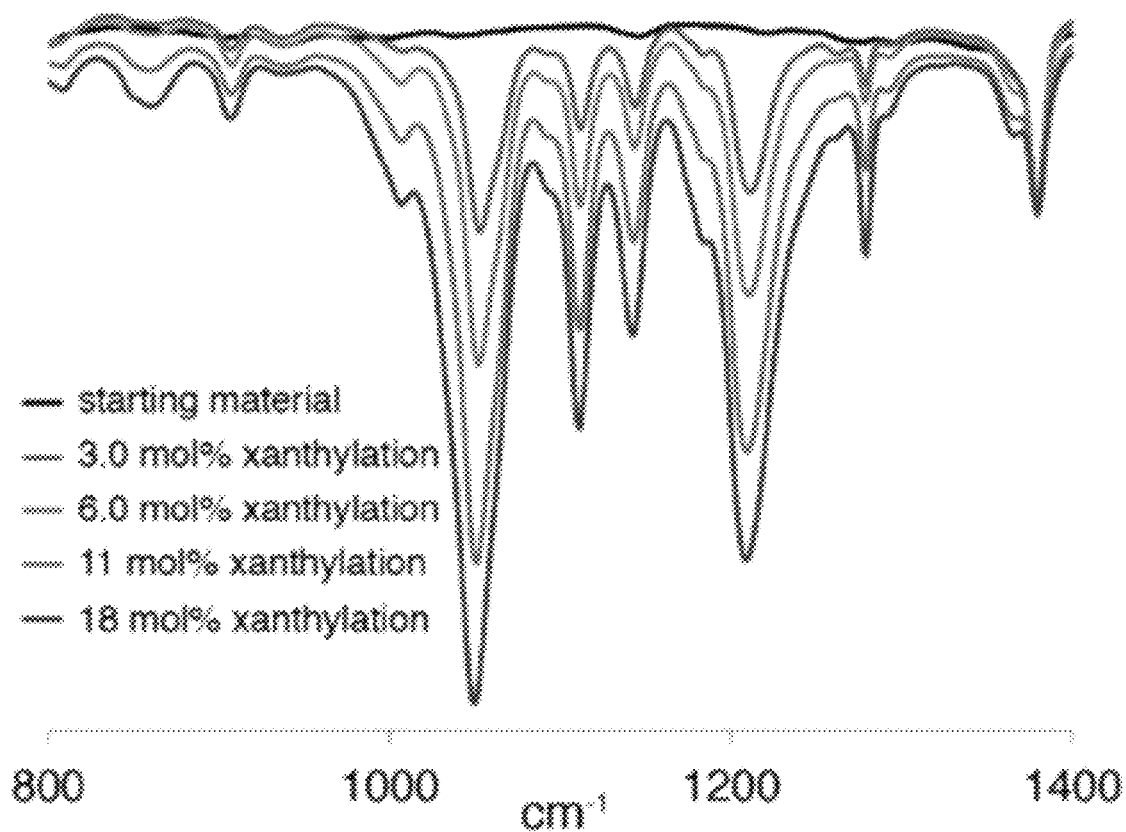
FIG. 2B shows an FT-IR spectra of polyethylethylene before and after xanthylation.

Analysis of the GPC photodiode array spectrum at a retention time of 33 minutes after reaction showed the appearance of a new absorption peak centered at 283 nm (FIG. 2A, inset). This adsorption peak matches that of other aliphatic xanthates and provides further evidence that the reaction conditions are leading to polymer xanthylation. Further, fourier transform infrared spectroscopy (FT-IR) demonstrated the appearance of absorbances commensurate with polymer-bound xanthate moieties at 1209 and 1050 cm$^{-1}$ (FIG. 2B). The intensity of these peaks increase as the mol % functionalization of polyethylethylene increases.

Figure 2C:
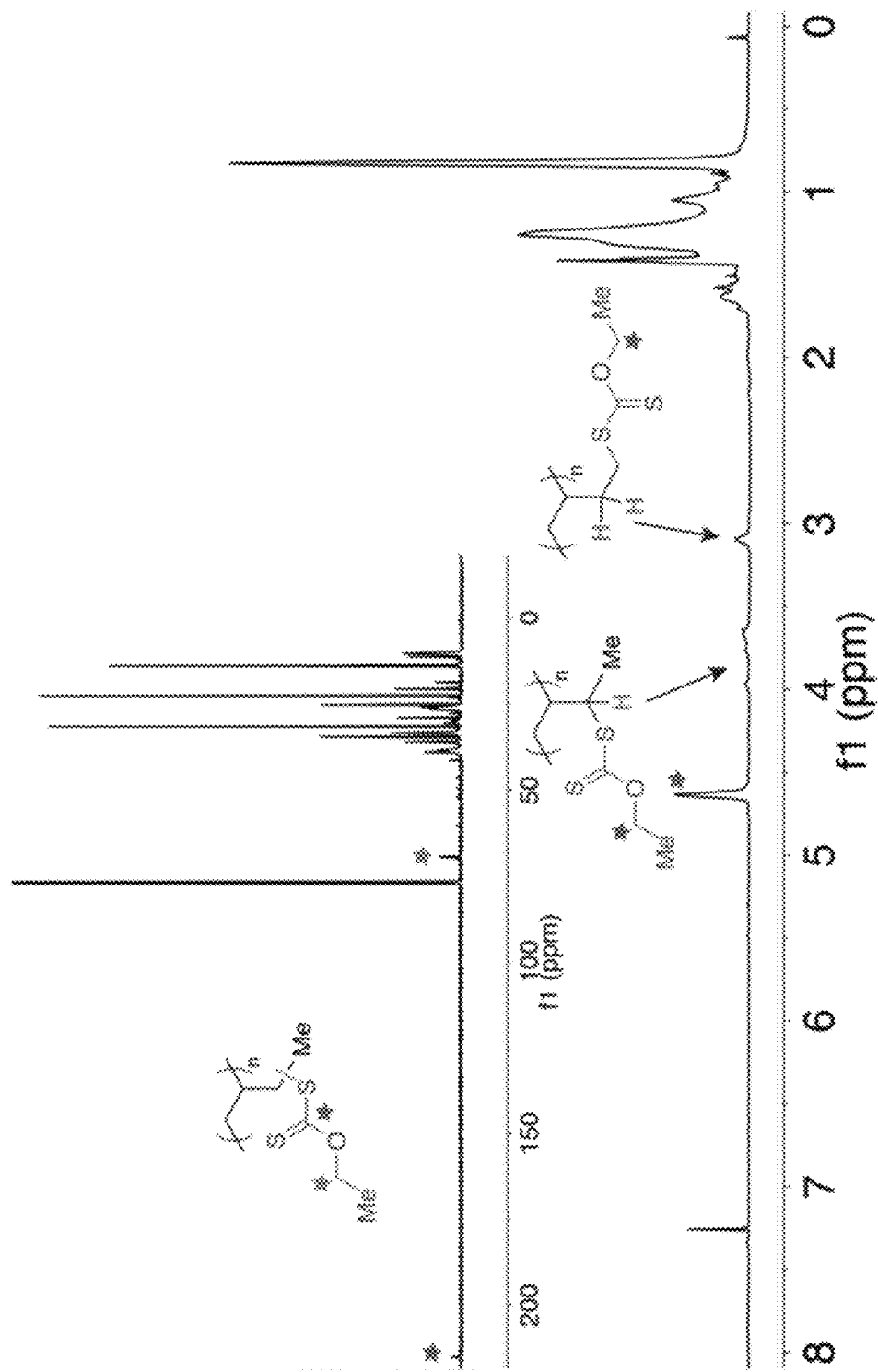
FIG. 2C shows $^1H$ NMR and $^{13}C$ NMR of polyethylethylene with 18 mol % xanthylation.

$^1$H NMR provided quantitative evidence of polyolefin xanthylation. The $^1$H and $^{13}$C NMR spectra of polyethylethylene containing 18 mol % xanthyl groups are shown in FIG. 2C. Compared to the parent polyethylethylene, new peaks appeared after reaction at 3.1 ppm, 3.7-4.0 ppm, and 4.6 ppm in the $^1$H NMR. Comparison with small molecule standards and previously reported substrates confirmed that the protons alpha to sulfur of primary xanthates appear further downfield (3.1 ppm) than those of secondary xanthates (3.7-4.0 ppm), while the resonance at 4.6 ppm corresponds to the protons alpha to oxygen. Heteronucleur aingle quantum coherence (HSQC) NMR unambiguously confirmed the peak assignments. Diffusion-ordered NMR spectroscopy (DOSY) confirmed that these peaks arose from species covalently bound to the polymer chain. For the polyethylethylene functionalization experiments reported herein, a preference of approximately two to one for secondary over primary xanthylation was observed by integration of the $^1$H NMR. This polyolefin functionalization is more selective for primary carbons than the functionalization of n-hexane alone, which occurs in 14:1 selectivity for secondary to primary xanthylation. Without being bound by theory, it is believed that this preference for primary xanthylation on the polymer is indicative of the increased steric hindrance of the polyolefin backbone shielding the methylene units of polyethylethylene.

Example 5: Photochemical Xanthylation of 4-Ethyl-2,6-dimethylheptane

To probe the ability of Compound 1 to xanthylate the tertiary carbons of polyethylethylene, the small molecule standard 4-ethyl-2,6-dimethylheptane was employed as an analogue to the steric environment of the polyethylethylene backbone.

After separately synthesizing the fully substituted xanthate that would arise from functionalization on the 4 position of the heptane derivative, the substrate was subjected to the reaction conditions used for polyethylethylene xanthylation. After reaction, no evidence of tertiary xanthylation was observed by gas chromatography, demonstrating that the sterics of reagent Compound 1 and thermodynamically favorable C—H abstraction capability of the amidyl radical reactive intermediate combine to favor homolysis of sterically accessible C—H bonds. Further, the rapid rate of radical xanthyl group-transfer is significantly faster than radical isomerization reactions that would lead to tertiary radicals capable of chain-degradation reactions such as β-scission. This rate difference, along with the lower effective free radical concentration provided by the degenerative group-transfer and captodative radical stabilization of xanthate groups, limits deleterious radical pathways that traditionally hinder the functionalization of branched polyolefins.

Figure 3A:
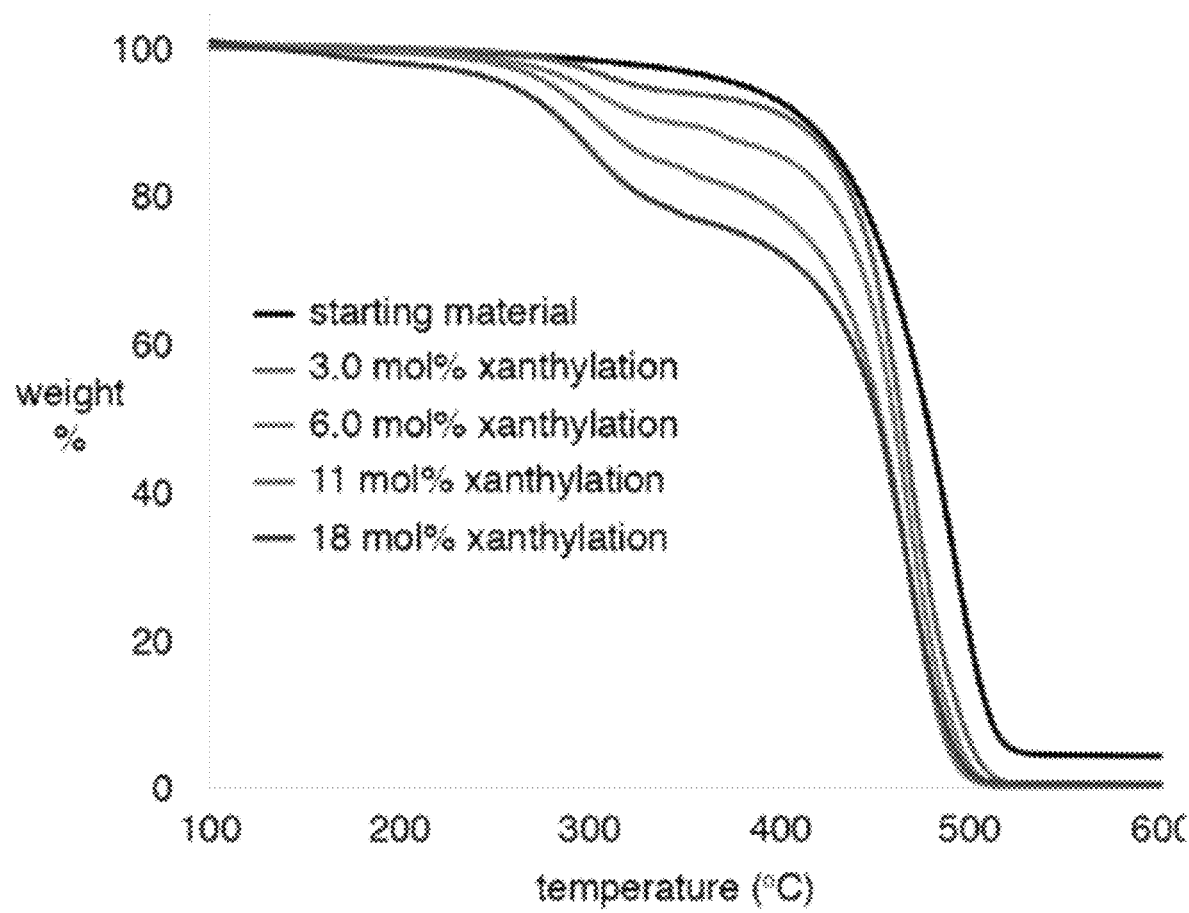
FIG. 3A shows TGA data of xanthylated polyethylethylene taken at a ramp rate of 10° C./min.
Figure 3B:
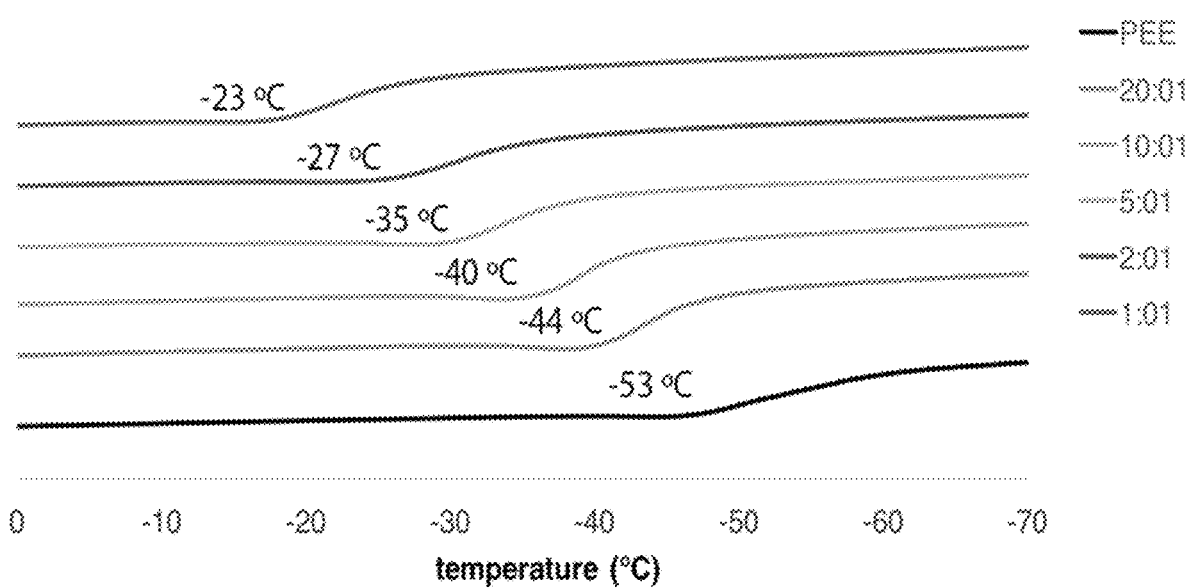
FIG. 3B shows DSC data of xanthylated polyethylethylene taken from a second heating cycle with a ramp rate of 10° C./min.

Example 6: Thermal Characterization of Photochemically Xanthylated Polyolefins The thermal properties of the xanthylated polyolefins demonstrate the influence of xanthylation. The decomposition behavior of the xanthylated polyolefins was significantly different than non-xanthylated polyolefins. As shown in the thermal gravimetric analysis (TGA) data in FIG. 3A, the unfunctionalized polyethylethylene polymer showed a decomposition temperature ($T_D$), measured where the polymer lost 10% of its initial mass, at 412° C. Each of the xanthylated polymers, however, demonstrated a partial mass loss starting at approximately 250° C., with the magnitude of the mass loss increasing with an increase in the mol % xanthylation. Xanthates are known to undergo thermal Chugaev-type eliminations at elevated temperatures to yield an alkene along with carbonyl sulfide.[19,20] Along with unique decomposition behavior, xanthylation significantly influences the glass transition temperature ($T_g$) of polyethylethylene as measured by differential scanning calorimetry (DSC). Polyethylethylene is an amorphous material with a $T_g$ of −53° C. (FIG. 3B). Increasing the concentration of a bulky xanthate group along the backbone yields up to a 27° C. increase in the $T_g$ of the material, with the extent of the increase related to the mol % of xanthate groups incorporated. This increase further confirms the impact of xanthylation on polyolefin properties and demonstrates how the methods described herein can provide tunable control over the thermal properties of polyolefins.

Example 7: Xanthylation of Polyethylene, Polypropylene, and Poly(iso-butylene)

Validation of polyolefin xanthylation on polyethylethylene demonstrated the methods, mild functionalization conditions, regioselectivity, and versatility. Most commercial polyolefins, however, are semicrystalline thermoplastics. Translation of homogeneous C—H functionalization chemistry to these intractable materials generally requires high temperature conditions in which they are soluble. Thermal analysis of Compound 1 confirmed its stability up to 150° C. Running the photochemical xanthylation reaction described in FIGS. 2A-2C with polyethylethylene as the substrate at 120° C. in dichlorobenzene led to almost identical results when compared to the room temperature reaction.

With these conditions established, C—H xanthylation was tested on commercial samples of polyethylene (PE), polypropylene (PP), and poly(iso-butylene). Xanthylation of all four of these branched polyolefin materials was successful. $^1$H NMR of the polymers after reaction demonstrated clear peaks arising from C—H xanthylation and GPC before and after reaction demonstrated that the $M_n$ and MWD remained consistent even for highly branched materials such as LDPE and PP. These initial experiments confirm the utility of the polyolefin xanthylation methodology to high volume commodity thermoplastics. The currently described results are in contrast to traditional peroxide-initiated functionalization of highly branched polyolefins such as LDPE and PP, which were previously challenging due to coincident decrease in molecular weight upon functionalization. Table 2 shows photochemical xanthylation of commodity polyolefins using Compound 1.

TABLE 2

Percent xanthylation as determined by $^1$H NMR

| substrate | % xanthylation |
|---|---|
| polypropylene | 2% |
| polyethylene | 8% |
| polyisobutylene | 4% |

Example 8: Photochemical Xanthylation of Polyethers

The direct C—H functionalization of poly(ethylene glycol) (PEG) to install thiocarbonyl groups (xanthates, trithiocarbonates, dithiocarbamates, and dithioesters) on the polymer backbone took place in a regioselective manner. This reactivity occurred without polymer chain degradation (i.e. a decrease in molecular weight) and resulted in a minimal change to the molecular weight distribution of the material.

Exposing a solution of PEG with a number average molecular weight (Mn) of 6.7 kg/mol and a dispersity of 1.03 to reagent 1a (Compound 1) in chlorobenzene under irradiation by blue LEDs for 2 hours resulted in the group-transfer of a xanthate to the backbone of PEG alpha to the ether oxygen (Scheme 5). When 20 mol % of reagent 1a was used compared to repeat unit, xanthylation occurred to 19 mol % of the monomer units, resulting in an increase of both Mn and dispersity to 8.2 kg/mol and 1.02, respectively.

Figures 4A, 4B:
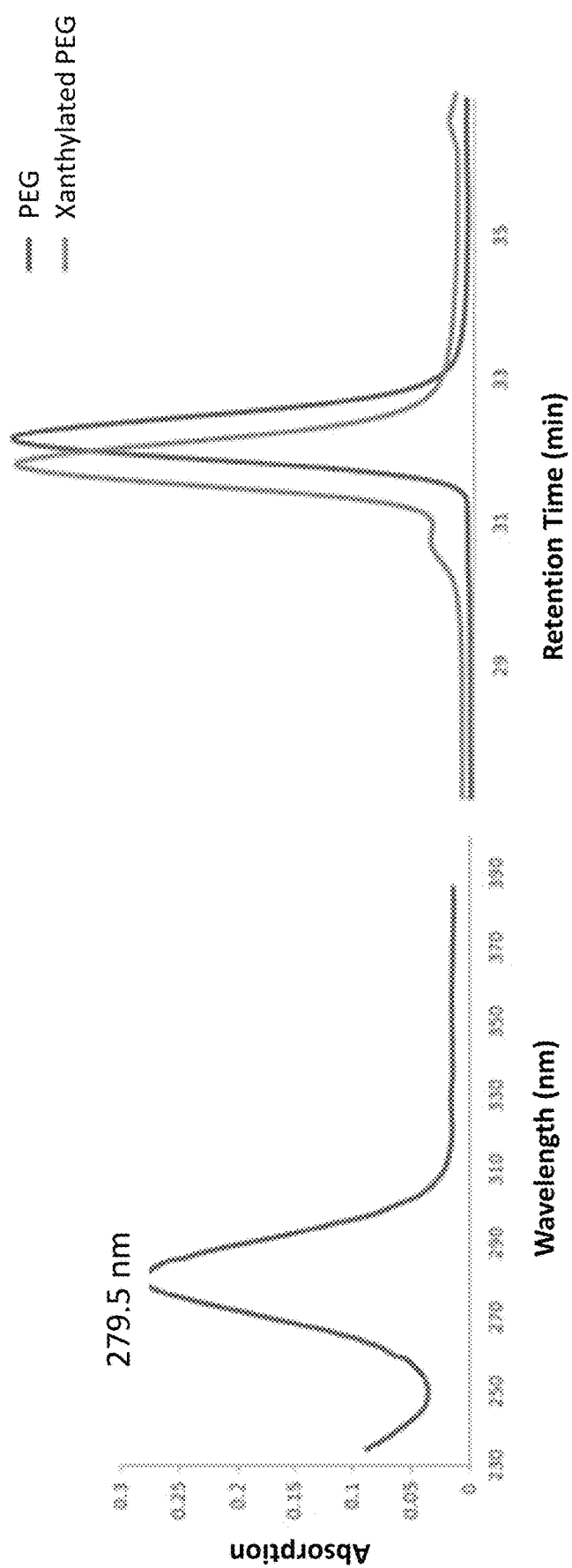
FIG. 4A shows a GPC photodiode array spectrum with an absorption peak at 280 nm for xanthlated PEG.
FIG. 4B shows GPC traces of PEG before and after xanthylation.
Figure 4C:
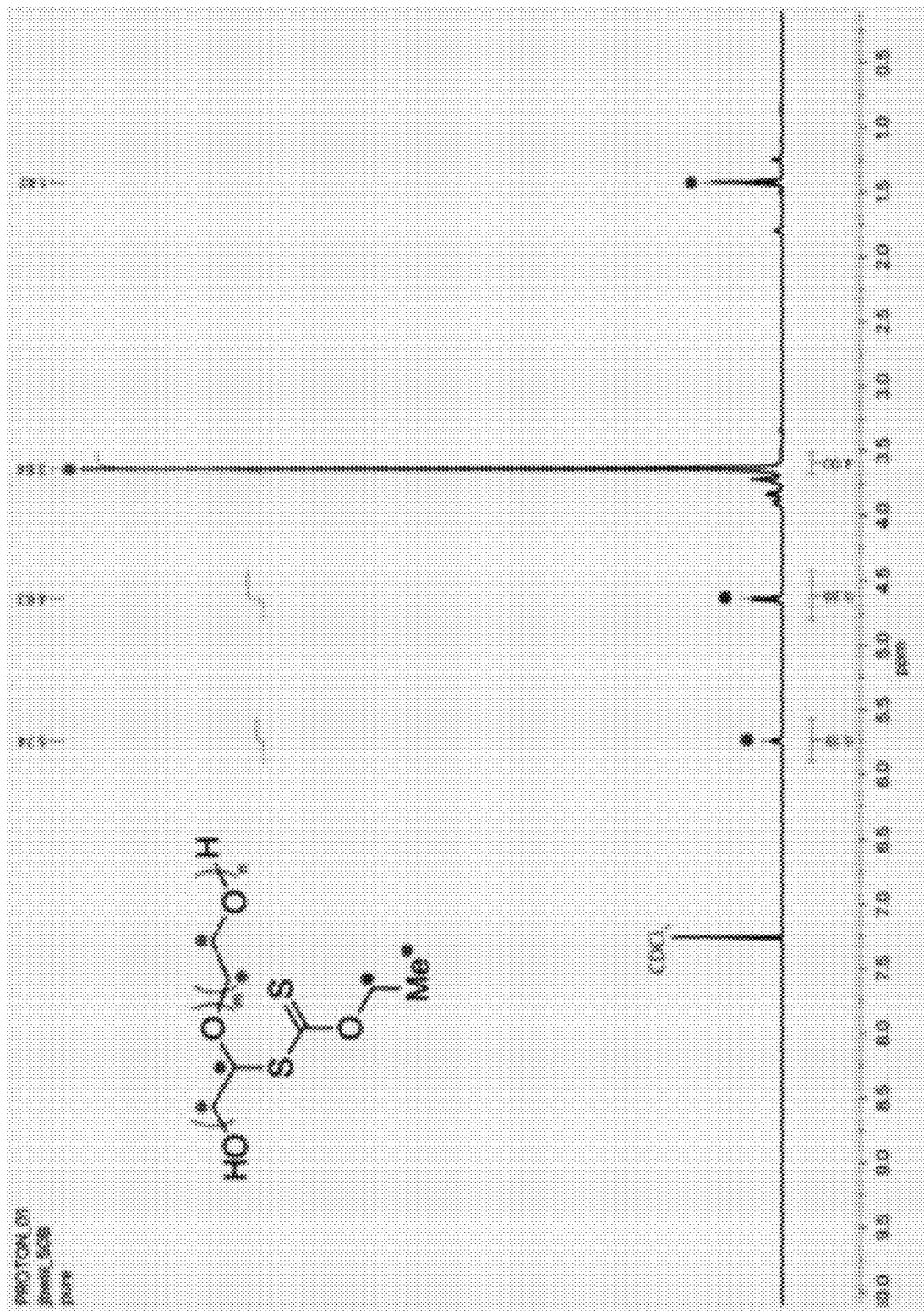
FIG. 4C shows the $^1H$ NMR spectrum of xanthylated PEG.

Evidence of xanthylation was clear in the photodiode array detector of the size exclusion chromatogram, which showed an absorption peak of the polymer appear after reaction at 280 nm (FIG. 4A and FIG. 4B). Furthermore, $^1$H NMR spectroscopy confirmed the polymer structural assignment (FIG. 4C). This initial demonstration of the reactivity of PEG confirms that C—H functionalization of polyethers alpha to the ether oxygen is successful using Compound 1.

SCHEME 5

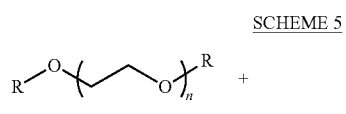

R = H, Me, Ph, etc.

$M_n$ = 6.7 kg/mol
PDI = 1.03

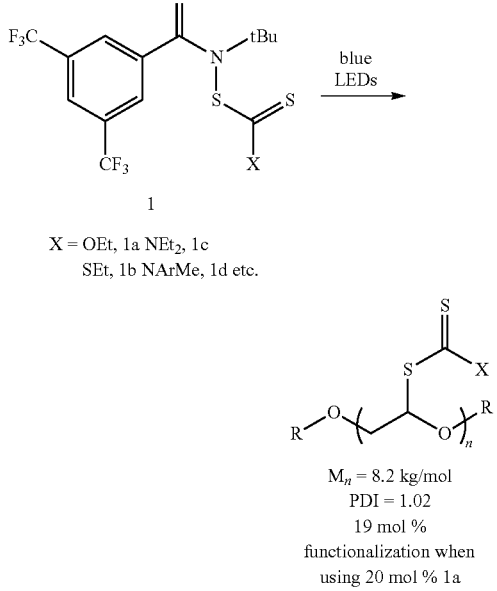

X = OEt, 1a NEt$_2$, 1c
SEt, 1b NArMe, 1d etc.

$M_n$ = 8.2 kg/mol
PDI = 1.02
19 mol % functionalization when using 20 mol % 1a

Example 9: Photochemical Xanthylation of Polyesters and Polycarbonates

The direct C—H functionalization of polycaprolactone was used as a model material for polyesters and polycarbonates to install thiocarbonyl groups (xanthates, trithiocarbonates, dithiocarbamates, and dithioesters) on the polymer backbone. This reactivity occurred without polymer chain degradation (i.e. a decrease in molecular weight) and resulted in a minimal change to the molecular weight distribution of the material.

Figure 5A:
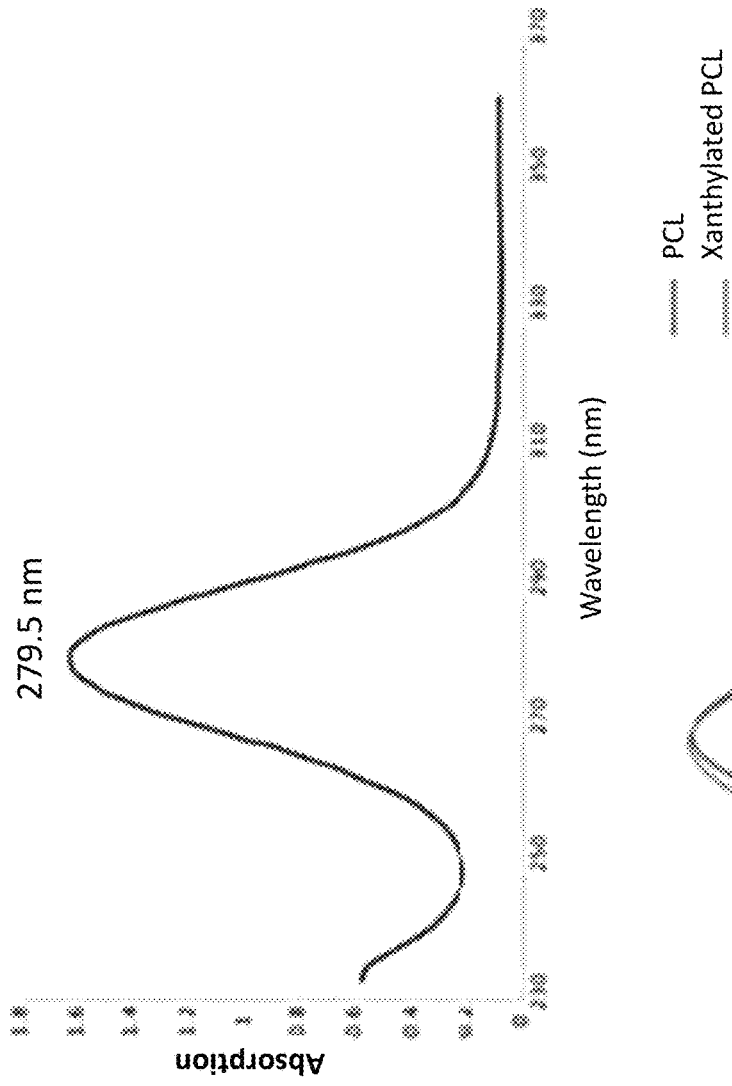
FIG. 5A shows a GPC photodiode array spectrum with an absorption peak at 280 nm for xanthlated polycaprolactone.
Figure 5B:
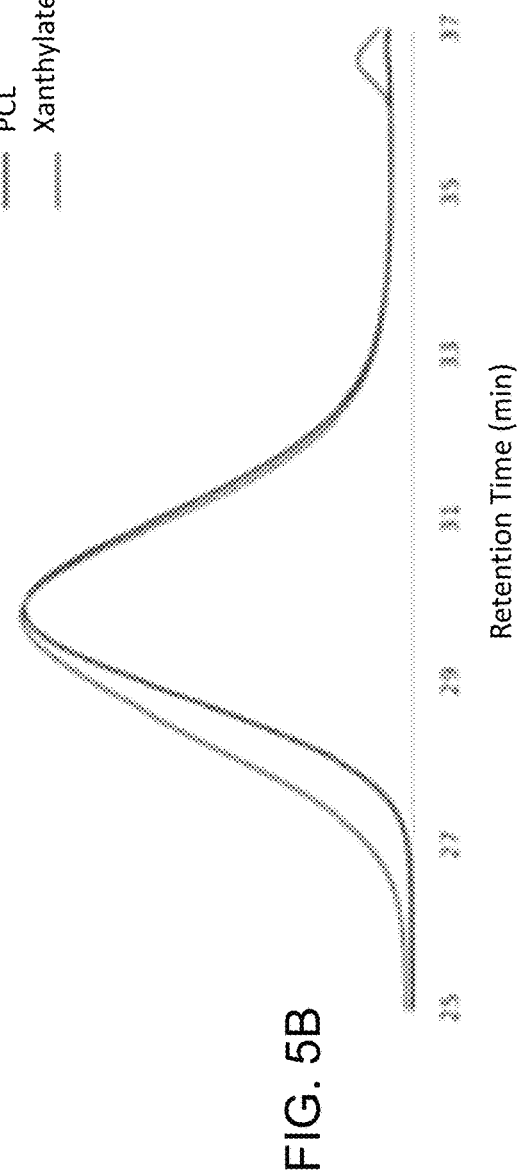
FIG. 5B shows GPC traces of polycaprolactone before and after xanthylation.

Exposing a solution of polycaprolactone with an $M_n$ of 19.0 kg/mol and a dispersity of 1.37 to reagent 1a (Compound 1) in dichlorobenzene under irradiation by blue LEDs for 19 hours resulted in the group-transfer of a xanthate to the backbone of polycaprolactone (Scheme 6). When 20 mol % of reagent 1a was used compared to repeat unit, xanthylation occurred to 20 mol % of the monomer units, resulting in an increase of both $M_n$ and dispersity to 21.0 kg/mol and 1.55, respectively. Evidence of xanthylation was clear in the photodiode array detector of the size exclusion chromatogram, which showed an absorption peak of the polymer appear after reaction at 280 nm (FIG. 5A and FIG. 5B). Furthermore, $^1$H NMR spectroscopy confirmed the polymer structural assignment. This initial demonstration of reactivity of polycaprolactone confirms that C—H

SCHEME 6

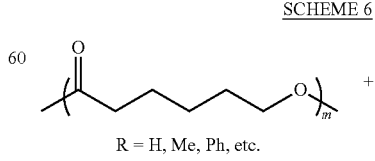

R = H, Me, Ph, etc.

$M_n$ = 19.0 kg/mol
PDI = 1.37

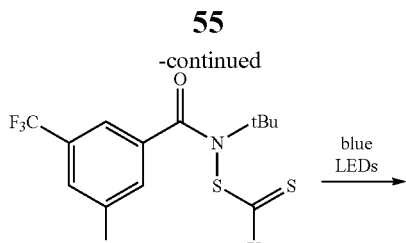

1

X = OEt, 1a NEt$_2$, 1c
SEt, 1b NArMe, 1d etc.

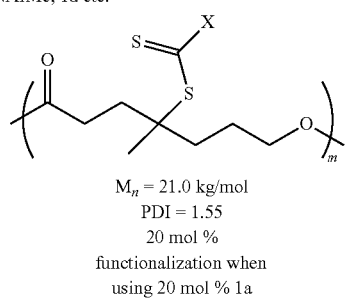

$M_n$ = 21.0 kg/mol
PDI = 1.55
20 mol %
functionalization when
using 20 mol % 1a functionalization of polyesters is successful using Compound 1.

Example 10: Thermal Xanthylation of Hyperbranched Polyethylene

Figure 6:
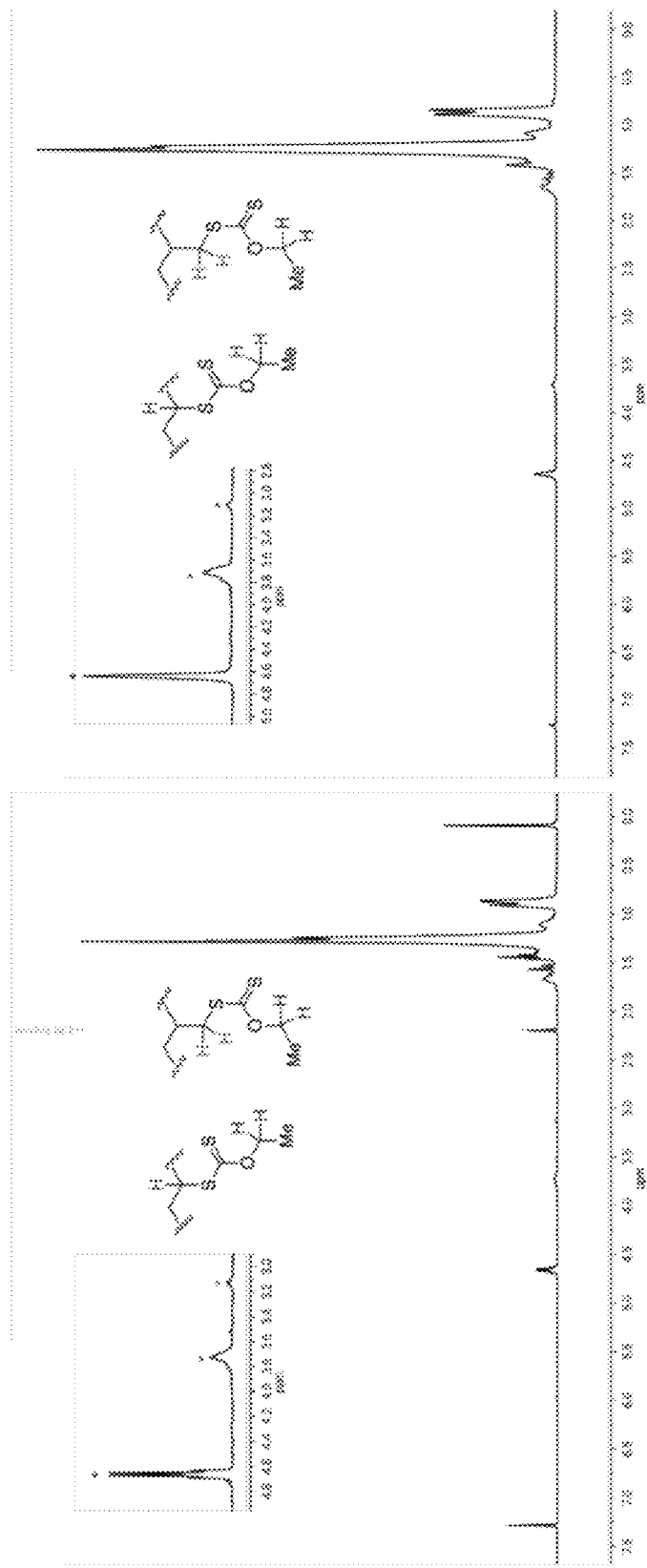
FIG. 6 shows $^1H$ NMR spectra of thermally initiated xanthylated hyperbranched polyethylene (left) and photochemically initiated xanthylated hyperbranched polyethylene (right). Solvent peaks are observed at 7.26 ppm for $CDCl_3$ and 2.20 for acetone.

It was discovered that catalytic quantities of dicumyl peroxide (DCP) provide efficient initiation to produce functionalized polyolefins (Table 3). These reactions were performed on a sample of hyperbranched, amorphous polyethylene (Scheme 7) with Compound 1 as the xanthylating agent. Briefly, a 1 dram vial equipped with a stir bar was charged with Compound 1 (1.0 equiv), polyethylene substrate (1.0 equiv), and dicumyl peroxide (10 mol %), fitted with a PTFE lined screw cap, and taken into the glovebox. The contents were dissolved in PhCl (0.5 M wrt substrate), and the resulting solution was sealed with Teflon tape and removed from the glovebox. The vial was placed on a block plate and stirred for 30 minutes prior to being set to heat at 130° C. The reaction was heated and stirred overnight. Upon completion, the reaction was concentrated in vacuo, and the crude residue was purified by precipitation in methanol at 0° C. to afford the functionalized product. The products of the thermally initiated system and photochemically initiated system revealed the same NMR of xanthylated hyperbranched polyolefin (FIG. 6).

SCHEME 7

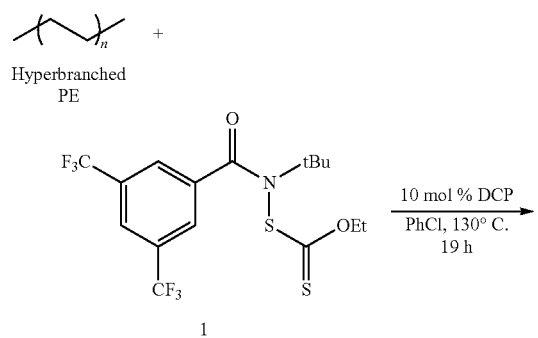

Hyperbranched PE

TABLE 3

| Thermal xanthylation of hyperbranched polyethylene | | | | | |
|---|---|---|---|---|---|
| Equiv. 1:repeat unit | mol % xanth. | Before | | After | |
| | | $M_n$ | Đ | $M_n$ | Đ |
| 1:10 | 4 | 35 | 1.17 | 46 | 1.50 |
| 1:5 | 9 | 35 | 1.17 | 44 | 1.32 |
| 1:2 | 9 | 35 | 1.17 | 45 | 1.26 |
| 1:1 | 10 | 35 | 1.17 | 42 | 1.29 |

*mol % xanth = mole % of polymer repeat units that include a xanthate functional group after reaction

Example 11: Thermal Xanthylation of High Density Polyethylene

Figure 7:
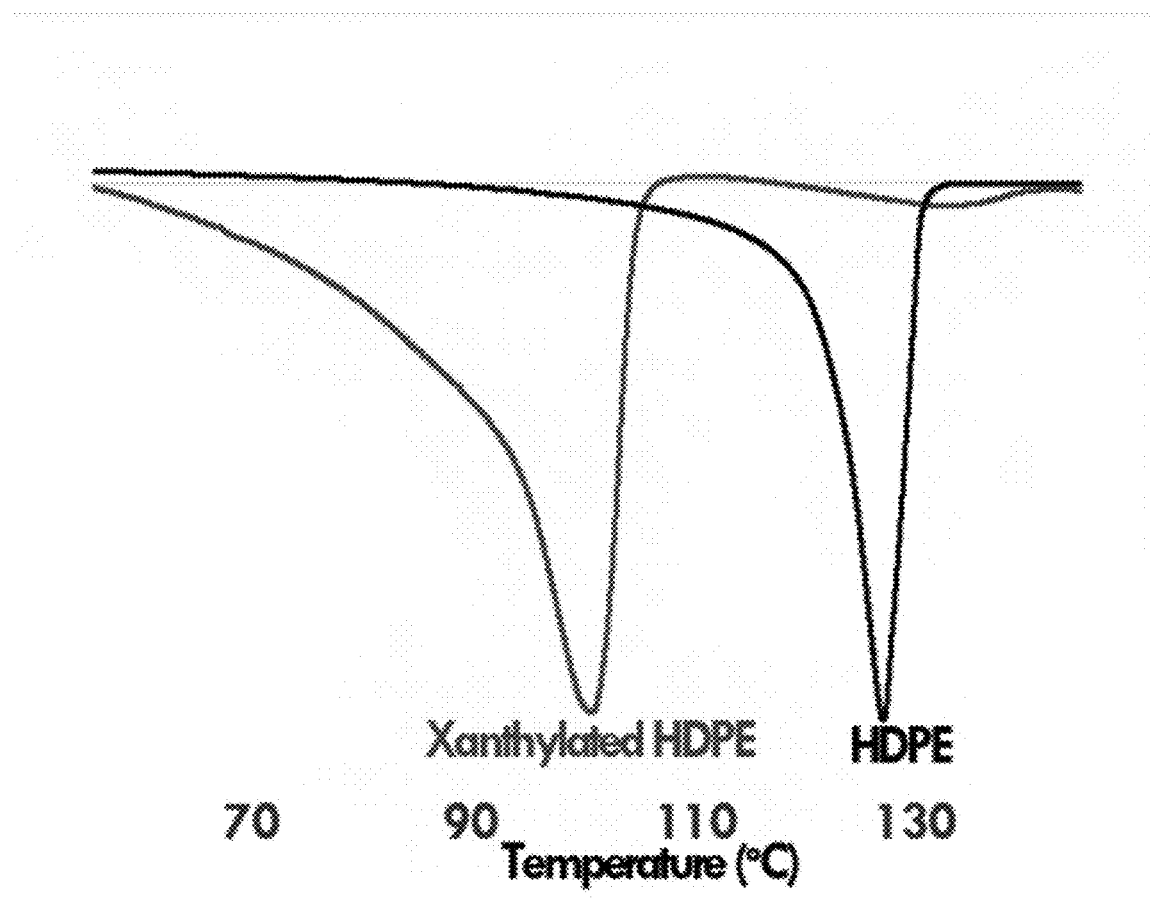
FIG. 7 shows DSC data of thermally xanthylated high density polyethylene, commercially obtained from Exxon.
Figure 8A:
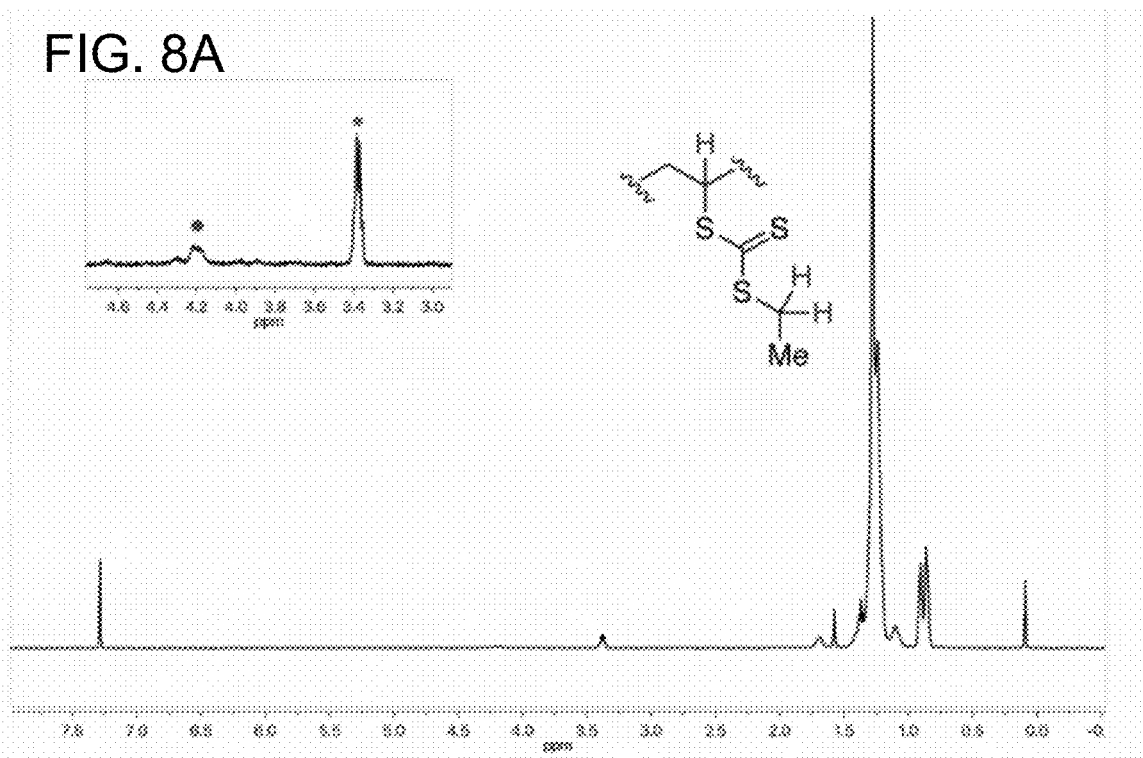
FIG. 8A shows characterization of 2 mol % trithiocarbonylated hyperbranched polyethylene by $^1H$ NMR spectroscopy taken in $CDCl_3$ with characteristic peaks at 3.35 and 4.17 ppm.
Figure 8B:
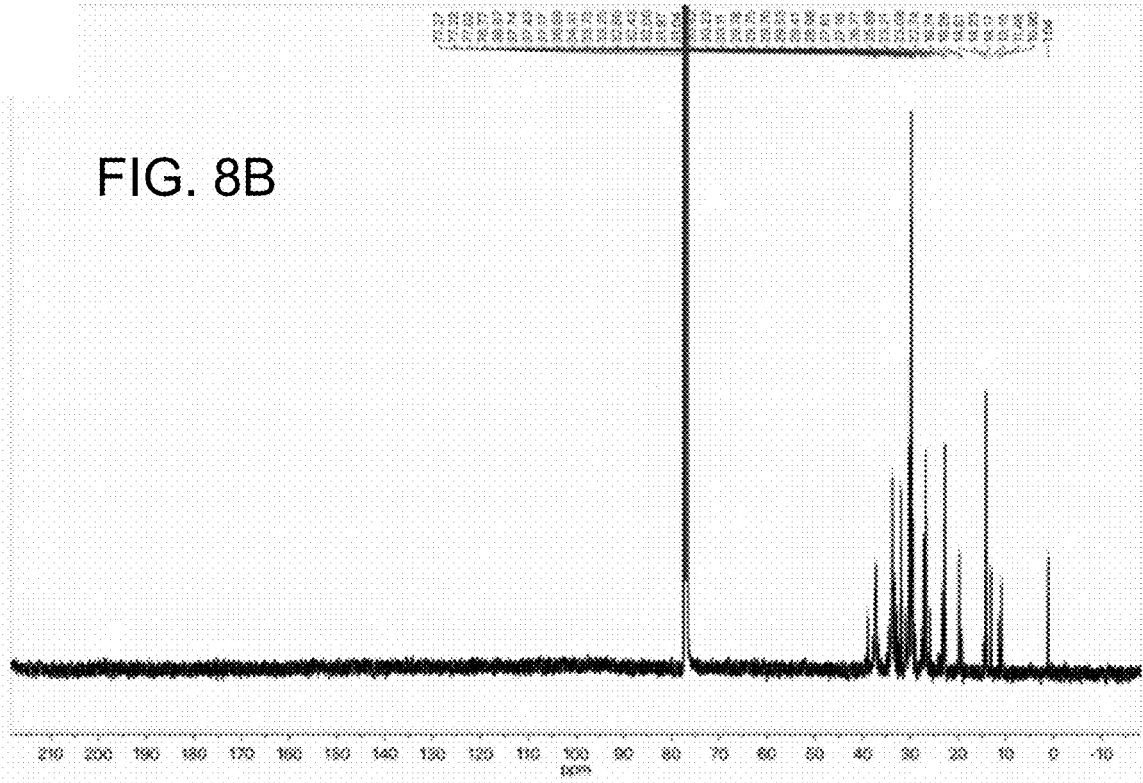
FIG. 8B shows characterization of 2 mol % trithiocarbonylated hyperbranched polyethylene by $^{13}C$ spectroscopy NMR taken in $CDCl_3$.
Figure 8E:
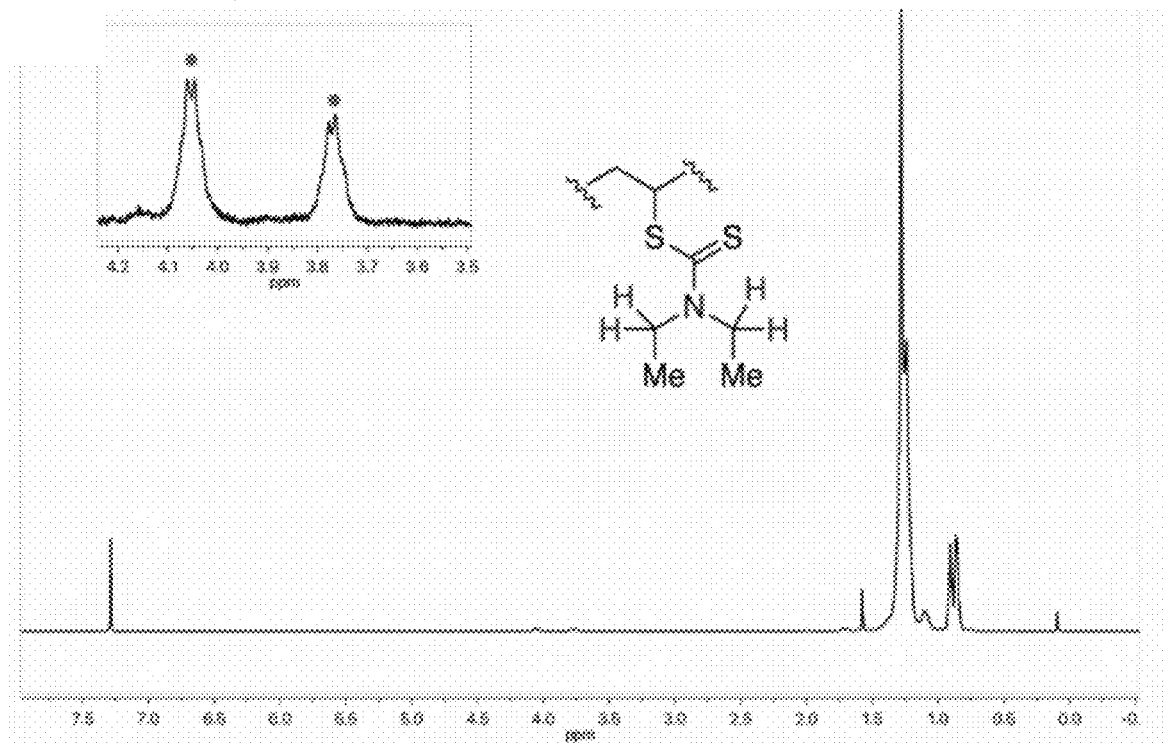
FIG. 8E shows characterization of 3 mol % dithiocarbamylated hyperbranched polyethylene by $^1H$ NMR spectroscopy taken in $CDCl_3$ with characteristic peaks at 3.76 and 4.06 ppm.
Figure 8F:
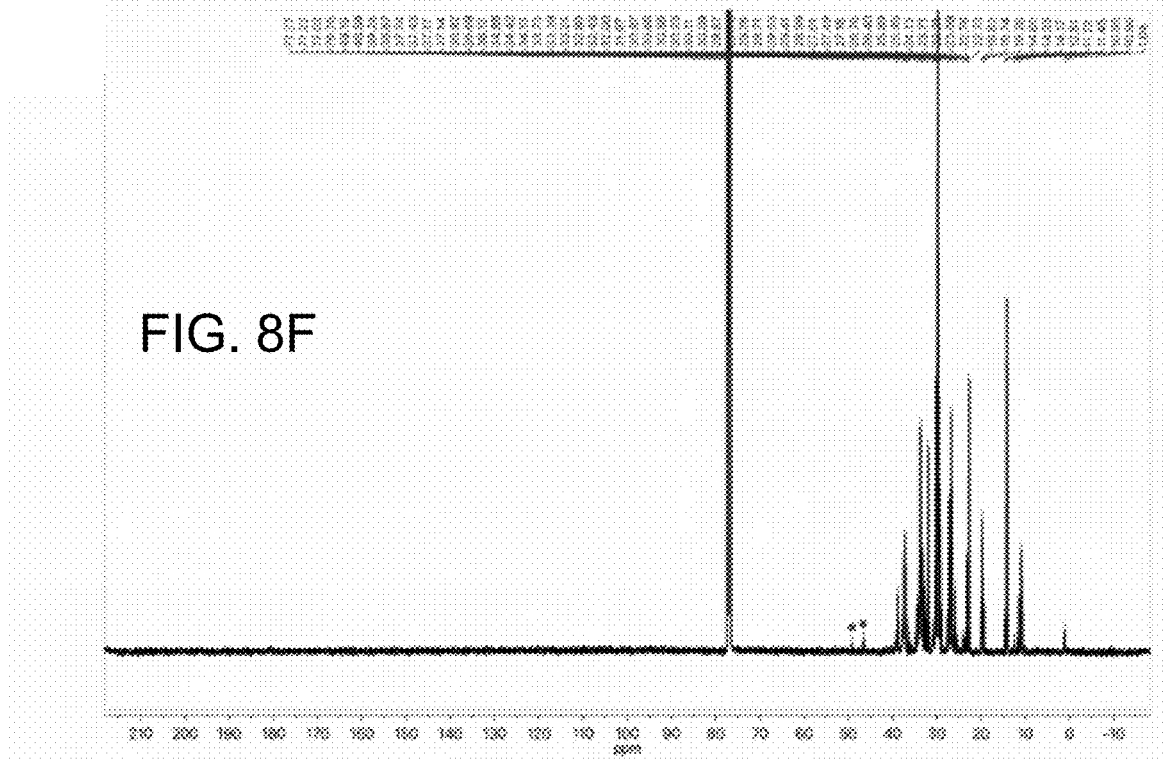
FIG. 8F shows characterization of 3 mol % dithiocarbamylated hyperbranched polyethylene by $^{13}C$ NMR spectroscopy taken in $CDCl_3$ with peaks at 46.58 and 49.19 ppm.
Figure 8G:
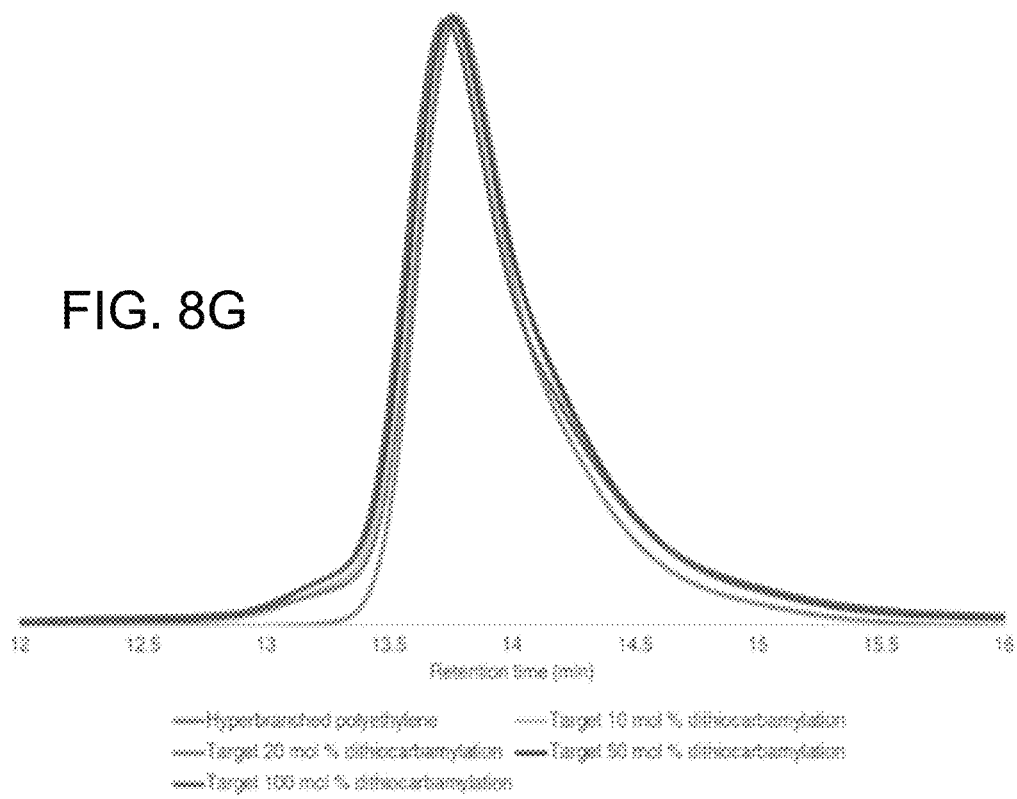
FIG. 8G shows characterization of 3 mol % dithiocarbamylated hyperbranched polyethylene by gel permeation chromatography in THF compared against polystyrene standards.
Figure 8H:
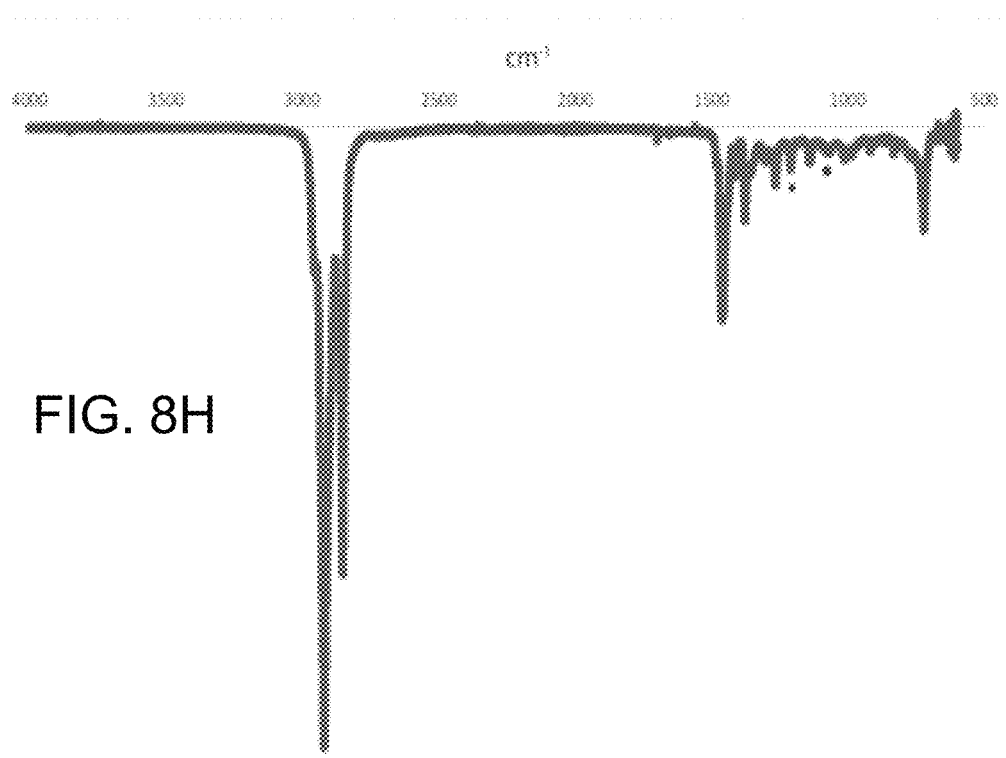
FIG. 8H shows characterization of 3 mol % dithiocarbamylated hyperbranched polyethylene by Infrared spectroscopy with distinct peaks at 1069 and 1209 $cm^{-1}$.

Xanthylation was thermally initiated on a commercial sample of high-density polyethylene at 130° C. At 1:20 equivalents of Compound 1 relative to repeat unit, 3 mol % of the polyolefin was xanthylated (Scheme 8). The functionalization resulted in a 30° C. change in melting temperature ($T_m$) from 128° C. to 102° C. (FIG. 7).

SCHEME 8

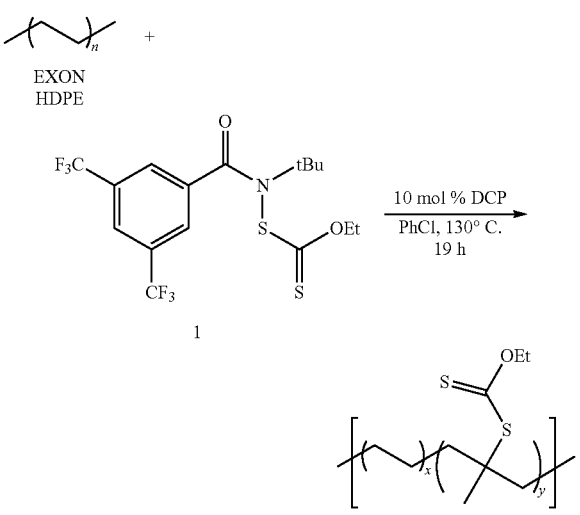

Achieved 3 mol % xanthylation at target 5 mol % xanthylation

Example 12: Investigation of Different Amidyl Reagents on Thermal Xanthylation of Hyperbranced Polyethelene The thermal initiation of different dithiocarbonyl amides was investigated on hyperbranched polyethylene (Scheme 9). Varying the Z group of the amidyl reagent proved to have a significant impact on the degree of functionalization of the polymer, while the molecular weight distribution remained relatively the same as the parent material Table 4).

SCHEME 9

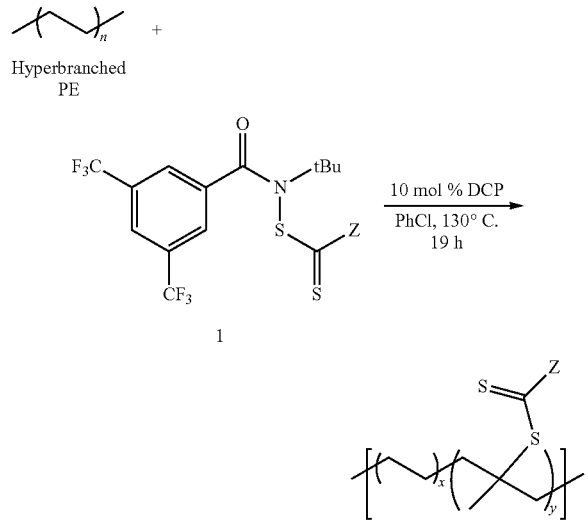

SCHEME 10

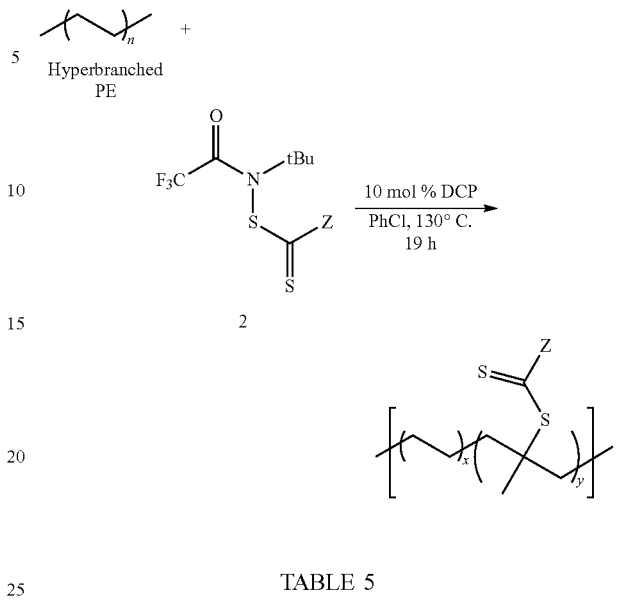

TABLE 4

Functionalization of hyperbranched polyethylene with dithiocarbonyl groups under thermal conditions

| Z | Equiv. 1:repeat unit | mol % funct. | Before | | | After | | |
|---|---|---|---|---|---|---|---|---|
| | | | $M_n$ | $M_w$ | Đ | $M_n$ | $M_w$ | Đ |
| —SEt | 1:10 | 3 | 42 | 44 | 1.05 | 45 | 50 | 1.12 |
| —SEt | 1:5 | 5 | 42 | 44 | 1.05 | 45 | 49 | 1.08 |
| —SEt | 1:2 | 3 | 42 | 44 | 1.05 | 45 | 48 | 1.06 |
| —SEt | 1:1 | 3 | 42 | 44 | 1.05 | 43 | 47 | 1.10 |
| —NEt$_2$ | 1:10 | 2 | 35 | 41 | 1.17 | 35 | 43 | 1.22 |
| —NEt$_2$ | 1:5 | 1 | 35 | 41 | 1.17 | 35 | 45 | 1.28 |
| —NEt$_2$ | 1:2 | 2 | 35 | 41 | 1.17 | 35 | 44 | 1.27 |
| —NEt$_2$ | 1:1 | 2 | 35 | 41 | 1.17 | 36 | 45 | 1.24 |
| —NMePh | 1:10 | 1 | 35 | 41 | 1.17 | 38 | 40 | 1.07 |

Representative Gel Permeation Chromatography spectra, performed with THF as the mobile phase, depict the change in molecular weight distribution as xanthate, trithiocarbonyl, and dithiocarbamyl groups are appended in this C—H functionalization method. Characterization of 2 mol % trithiocarbonylated hyperbranched polyethylene is shown in FIG. 8A through FIG. 8D. Characterization of 3 mol % dithiocarbamylated hyperbranched polyethylene is shown in FIG. 8E through FIG. 8H.

Example 12: Thermal Functionalization of Hyperbranched Polyethylene with Trifluoromethyl Amide Reagent The thermal functionalization of hyperbranched polyethylene was also investigated using an amide reagent that contained a trifluoromethyl group in place of the aryl substituent (Scheme 10). Functionalization occurred with Compound 2, demonstrating the possibility of using alternative amide structures for the functionalization of polyolefins (Table 5).

TABLE 5

Dithiocarbamylation studies varying the amidyl reagent

| Z | Equiv. 2:repeat unit | mol % funct. | Before | | | After | | |
|---|---|---|---|---|---|---|---|---|
| | | | $M_n$ | $M_w$ | Đ | $M_n$ | $M_w$ | Đ |
| —NMePh | 1:10 | 2 | 35 | 41 | 1.17 | 28 | 48 | 1.73 |
| —NMePh | 1:1 | 5 | 35 | 41 | 1.17 | 24 | 43 | 1.78 |

Example 13: Functionalized Polymers

C—H functionalization of various polymers was achieved by photochemical and thermal initiation methods without polymer chain degradation and with minimal change to the weight distribution of the material. Xanthylated polymers are a platform material to access diverse, functionalized polymers that unlock a range of new polymer properties.

This approach takes advantage of xanthates as one of the most versatile chemotypes in synthetic chemistry, amenable to a broad range of both radical-mediated and polar bond forming reactions.[16] For example, reagents recently developed by Shen and coworkers enable a one-step transformation into a trifluoromethylthiol group.[21,22] This functional group, well known to modulate the lipophilicity of medicinal compounds, is under-explored in polymer chemistry. Further, the xanthate group can be used directly as a chain-transfer agent for the reversible addition fragmentation chain-transfer (RAFT) polymerization of vinyl acetate.[23] Exposure of the polyethylethylene with 6 mol % xanthylation to the RAFT conditions led to graft-copolymers.

Xanthates also enable simple access to the thiol functional group by aminolysis or hydroylysis, which can be conducted in a one-pot procedure directly after photoinduced xanthylation. Characterization by $^1$H NMR and GPC confirms cleavage of the xanthylate upon aminolysis by a disappearance of the xanthate peaks in NMR and of the absorbance at 283 nm in the photodiode array spectrum of the GPC. The revealed thiol represents a valuable group for diversifying polymer functionality through a number of reactions, including thiol-ene chemistry as well as Michael addition, epoxide ring-opening, and the addition to isocyanates.[24,25]

Sequential addition of butyl amine and an epoxide generated hydroxyl-containing functionality in a one-pot procedure.

Similarly, the addition of acrylate or acrylamides to the thiol group enabled rapid Michael addition, which can be used to install a range of valuable groups. For instance, catechol groups known for their valuable adhesive properties can be incorporated into branched polymers.

The regioselectivity of this functionalization imparts important properties to polyethers. Most importantly, adding thiocarbonyl moieties to PEG creates polymeric materials that are hydrolytically degradable. The hydrolytic instability of thiocarbonyl compounds is well known, and the rate of hydrolysis is dependent on the thiocarbonyl chosen.

Furthermore, the long-standing challenge of crosslinking branched polyolefins can be solved through the reaction with commercially available, multi-functional acrylates to form polyolefin elastomers or thermosets.

Finally, thiol-ene functionalization works well in these systems to furnish materials such as the thiol-ene product below, whose saccharide group could act to improve the mixing of cellulose/polyolefin blends. The versatility of this strategy is a unique feature compared to previous technology, where the previous methods target the introduction of a single functionality and new C—H functionalization chemistry must be optimized for each new desired derivative.

Scheme 11 shows the diversification of polymer functionality, specifically polyolefin functionality, from a single xanthate precursor through a variety of chemistries.

Many modifications and other embodiments set forth herein will come to mind to one skilled in the art to which this subject matter pertains having the benefit of the teachings presented in the foregoing descriptions and the associated drawings. Therefore, it is to be understood that the subject matter is not to be limited to the specific embodiments disclosed and that modifications and other embodiments are intended to be included within the scope of the appended claims. Although specific terms are employed herein, they are used in a generic and descriptive sense only and not for purposes of limitation.

BIBLIOGRAPHY (1) Mike Chung, T. C. In *Functionalization of Polyolefins*; Functionalization of Polyolefins; Academic Press: London, 2002; pp 9-17.
(2) Boaen, N. K.; Hillmyer, M. A. *Chem. Soc. Rev.* 2005, 34 (3), 267.
(3) Moad, G. *Prog. Polym. Sci.* 1999, 24, 81.
(4) Zhang, M.; Colby, R H.; Milner, S. T.; Chung, T. C. M.; Huang, T.; deGroot, W. *Macromolecules* 2013, 46 (11), 4313.
(5) Liu, D.; Bielawski, C. W. *Polym. Int.* 2016, 66 (1), 70.
(6) Boaen, N. K.; Hillmyer, M. A. *Macromolecules* 2003, 36 (19), 7027.
(7) Kondo, Y.; Garcia-Cuadrado, D.; Hartwig, J. F.; Boaen, N. K.; Wagner, N. L.; Hillmyer, M. A. *Journal of the American Chemical Society* 2002, 124 (7), 1164.
(8) Bae, C.; Hartwig, J. F.; Boaen Harris, N. K.; Long, R. O.; Anderson, K. S.; Hillmyer, M. A. *Journal of the American Chemical Society* 2005, 127 (2), 767.

SCHEME 11

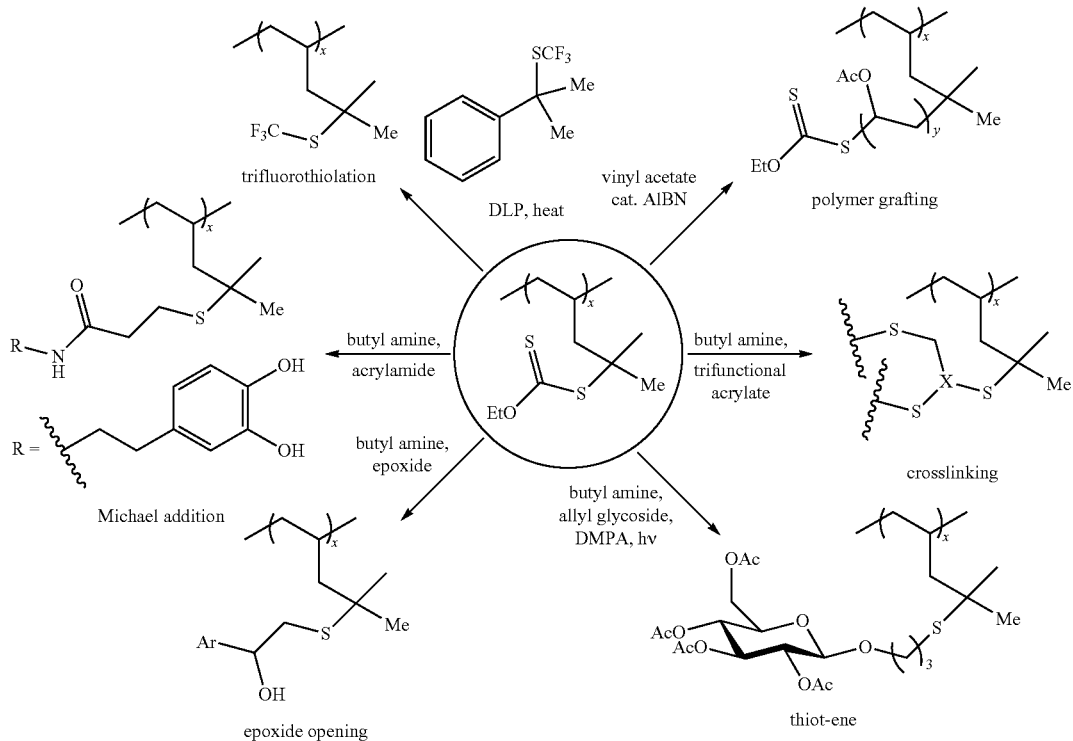

(9) Bunescu, A.; Lee, S.; Li, Q.; Hartwig, J. F. *ACS Cent. Sci.* 2017, 3 (8), 895.
(10) Foster, G. N.; Wasserman, S. H.; Yacka, D. J. *Die Angew. Makro. Chemie* 1997, 252, 11.
(11) Blanksby, S. J.; Ellison, G. B. *Accounts of Chemical Research* 2003, 36 (4), 255.
(12) Chu, J. C. K.; Rovis, T. *Nature* 2016, 539 (7628), 272.
(13) Nguyen, L. Q.; Knowles, R. R. *ACS Catal.* 2016, 6 (5), 2894.
(14) Quinn, R. K.; Könst, Z. A.; Michalak, S. E.; Schmidt, Y.; Szklarski, A. R.; Flores, A. R.; Nam, S.; Horne, D. A.; Vanderwal, C. D.; Alexanian, E. J. *Journal of the American Chemical Society* 2016, 138 (2), 696.
(15) Schmidt, V. A.; Quinn, R. K.; Brusoe, A. T.; Alexanian, E. J. *Journal of the American Chemical Society* 2014, 136 (41), 14389.
(16) Zard, S. Z. *Angew. Chem. It. Ed.* 1997, 36, 672.
(17) Czaplyski, W. L.; Na, C. G.; Alexanian, E. J. *Journal of the American Chemical Society* 2016, 138 (42), 13854.
(18) Lin, W.; Shao, Z.; Dong, J.-Y.; Chung, T. C. M. *Macromolecules* 2009, 42 (11), 3750.
(19) Zhou, Y.; He, J.; Li, C.; Hong, L.; Yang, Y. *Macromolecules* 2011, 44 (21), 8446.
(20) DePuy, C. H.; King, R. W. *Chemical Reviews* 1960, 60, 431.
(21) Yang, X.; Wu, T.; Phipps, R. J.; Toste, F. D. *Chemical Reviews* 2015, 115 (2), 826.
(22) Shao, X.; Xu, C.; Lu, L.; Shen, Q. *Accounts of Chemical Research* 2015, 48 (5), 1227.
(23) Moad, G.; Rizzardo, E.; Thang, S. H. *Aust. J. Chem.* 2006, 59 (10), 669.
(24) Le Neindre, M.; Nicolaÿ, R. *Polym. Chem.* 2014, 5 (16), 4601.
(25) Le Neindre, M.; Nicolaÿ, R. *Polym. Int.* 2013, 63 (5), 887.

That which is claimed:
1. A method for xanthylating a polymer, comprising:
contacting a polymer selected from the group consisting of polyolefins, polycarbonates, and polyesters with a compound of Formula I

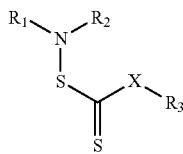

wherein,
$R_1$ is aryl, heteroaryl, —$COR_4$, or —$SO_2R_4$,
wherein said aryl or heteroaryl is optionally substituted, and
wherein $R_4$ is optionally substituted linear or branched $C_{1-6}$ alkyl, aryl, heteroaryl, cycloalkyl, or heterocycloalkyl;
$R_2$ is optionally substituted linear or branched $C_{1-6}$ alkyl, aryl, heteroaryl, cycloalkyl, or heterocycloalkyl;
$R_3$ is optionally substituted linear or branched $C_{1-6}$ alkyl, aryl, or heteroaryl; and
X is a bond, —O—, —S—, or —$NR^5$, wherein $R^5$ is optionally substituted linear or branched $C_{1-6}$ alkyl;
to form a xanthylated polymer.
2. The method of claim 1, wherein said xanthylated polymer comprises a structural unit of Formula II

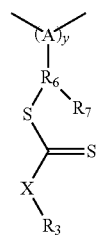

wherein,
y is an integer with a value between 1 and 1,000,000;
$R_6$ is a bond, or substituted linear or branched $C_{1-15}$ alkyl;
$R_7$ is absent or present, and when present is hydrogen or substituted linear or branched $C_{1-15}$ alkyl;
X is a bond, —O—, —S—, or —$NR^5$, wherein $R^5$ is optionally substituted linear or branched $C_{1-6}$ alkyl;
$R_3$ is optionally substituted linear or branched $C_{1-6}$ alkyl, aryl, or heteroaryl;
A is a repeat unit of a polymer covalently bound to the xanthate, selected from the group consisting of

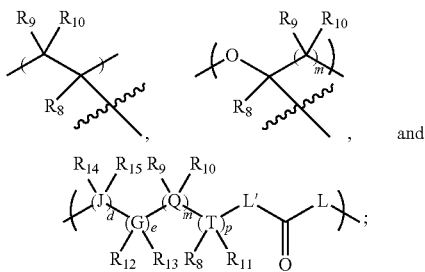

$R_8$, $R_9$, $R_{10}$, $R_{11}$, $R_{12}$, $R_{13}$, $R_{14}$, and $R_{15}$ in each instance, are absent or present, and when present are independently selected from the group consisting of hydrogen and optionally substituted linear or branched $C_{1-15}$ alkyl;
L and L' are each independently a bond or O;
J, G, Q, and T are independently selected from the group consisting of carbon, oxygen, (C=O), arene, and cycloalkane;
d, e, m and p, in each instance, are independently an integer between 0 and 20;
wherein at least one of d, e, m, and p is other than 0;
at least one of J, G, Q, and T is a carbon covalently bound to $R_6$; and
wherein the wavy line denotes the point of attachment of $R_6$ to the polymer backbone.
3. The method of claim 1, wherein said polymer is a branched polymer.
4. The method of claim 1, wherein said polymer is regioselectively xanthylated.
5. The method of claim 2, wherein said xanthylated polymer is a polyolefin which comprises a structural unit of Formula III

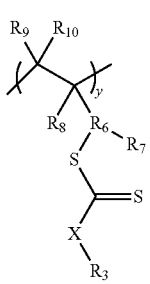

III wherein,

R$_6$ is a bond, or substituted linear or branched C$_{1-15}$ alkyl;

R$_7$ is absent or present, and when present is hydrogen or substituted linear or branched C$_{1-15}$ alkyl;

R$_8$, R$_9$, and R$_{10}$ in each instance, are independently selected from the group consisting of hydrogen and substituted linear or branched C$_{1-15}$ alkyl;

y is an integer with a value between 1 and 1,000,000;

X is a bond, —O—, —S—, or —NR$^5$, wherein R$^5$ is optionally substituted linear or branched C$_{1-6}$ alkyl; and R$_3$ is optionally substituted linear or branched C$_{1-6}$ alkyl, aryl, or heteroaryl.

6. The method of claim 5, wherein said polyolefin is a branched polyolefin.

7. The method of claim 5, wherein said xanthylated polyolefin comprises the structural unit of Formula IV

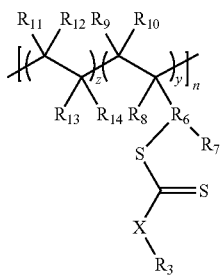

IV wherein,

R$_6$ is a bond, or substituted linear or branched C$_{1-15}$ alkyl;

R$_7$ is absent or present, and when present is hydrogen or substituted linear or branched C$_{1-15}$ alkyl;

R$_8$, R$_9$, R$_{10}$, R$_{11}$, R$_{12}$, R$_{13}$, and R$_{14}$, in each instance, are independently selected from the group consisting of hydrogen and substituted linear or branched C$_{1-15}$ alkyl;

X is a bond, —O—, —S—, or —NR$^5$, wherein R$^5$ is optionally substituted linear or branched C$_{1-6}$ alkyl;

R$_3$ is optionally substituted linear or branched C$_{1-6}$ alkyl, aryl, or heteroaryl;

n is an integer from 1 to 500,000; and z and y are integers from 1 to 1,000,000, wherein the ratio of z:y is in the range from about 100,000:1 to about 1:1.

8. The method of claim 7, wherein said xanthylated polyolefin comprises the structural unit:

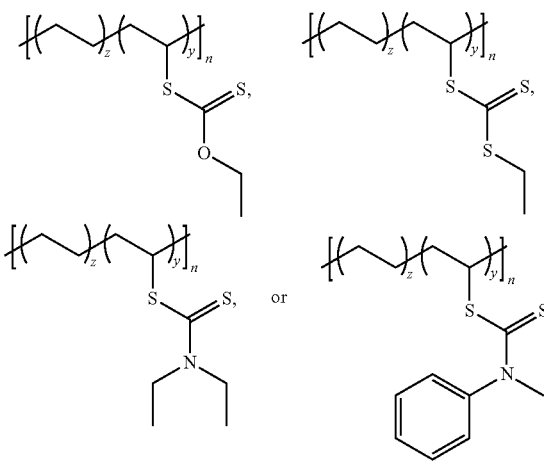

wherein n is an integer from 1 to 500,000; and z and y are integers from 1 to 1,000,000, wherein the ratio of z:y is in the range from about 100,000:1 to about 1:1.

9. The method of claim 2, wherein said xanthylated polymer is a polyether which comprises a structural unit of Formula V

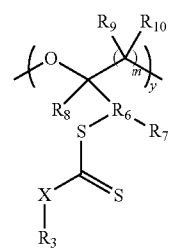

V wherein,

R$_6$ is a bond, or substituted linear or branched C$_{1-15}$ alkyl;

R$_7$ is absent or present, and when present is hydrogen or substituted linear or branched C$_{1-15}$ alkyl;

R$_8$ R$_9$, and R$_{10}$ are each independently selected from the group consisting of hydrogen and substituted linear or branched C$_{1-15}$ alkyl;

X is a bond, —O—, —S—, or —NR$^5$, wherein R$^5$ is optionally substituted linear or branched C$_{1-6}$ alkyl;

R$_3$ is optionally substituted linear or branched C$_{1-6}$ alkyl, aryl, or heteroaryl;

m is an integer between 0 and 20; and y is an integer with a value between 1 and 1,000,000.

10. The method of claim 9, wherein said polyether comprises the structural unit of Formula VI

VI wherein, $R_6$ is a bond, or substituted linear or branched $C_{1-15}$ alkyl;

$R_7$ is absent or present, and when present is hydrogen or substituted linear or branched $C_{1-15}$ alkyl;

X is a bond, —O—, —S—, or —NR$^5$, wherein R$^5$ is optionally substituted linear or branched $C_{1-6}$ alkyl;

$R_3$ is optionally substituted linear or branched $C_{1-6}$ alkyl, aryl, or heteroaryl;

$R_8$, $R_9$, $R_{10}$, $R_{11}$, $R_{12}$, $R_{13}$, and $R_{14}$ in each instance, are independently selected from the group consisting of hydrogen and substituted linear or branched $C_{1-15}$ alkyl;

m is an integer between 0 and 20;

z and y are integers from 1 to 1,000,000, wherein the ratio of z:y is in the range from about 100,000:1 to about 1:1; and n is an integer from 1 to 500,000.

11. The method of claim 10, wherein said polyether has the structure:

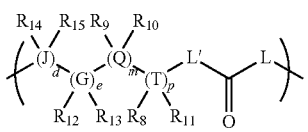

wherein z and y are integers from 1 to 1,000,000, wherein the ratio of z:y is in the range from about 100,000:1 to about 1:1; and n is an integer from 1 to 500,000.

12. The method of claim 2, wherein said xanthylated polymer is a polyester or polycarbonate which comprises a structural unit of Formula VII

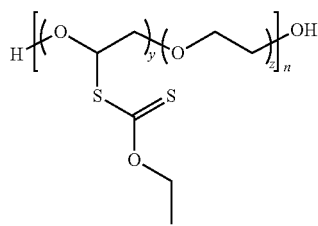

wherein, $R_8$, $R_9$, $R_{10}$, $R_{11}$, $R_{12}$, $R_{13}$, $R_{14}$, and $R_{15}$ in each instance, are absent or present, and when present are independently selected from the group consisting of hydrogen and optionally substituted linear or branched $C_{1-15}$ alkyl;

L and L' are each independently a bond or O;

J, G, Q, and T are each independently selected from the group consisting of carbon, oxygen, (C=O), arene, and cycloalkane;

d, e, m and p, in each instance, are independently an integer between 0 and 20;

wherein at least one of d, e, m, and p is other than 0;

at least one of $R_8$, $R_9$, $R_{10}$, $R_{11}$, $R_{12}$, $R_{13}$, $R_{14}$, and $R_{15}$ is

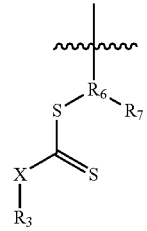

wherein the wavy line denotes the point of attachment of $R_6$ to the polymer backbone;

$R_6$ is a bond, or substituted linear or branched $C_{1-15}$ alkyl;

$R_7$ is absent or present, and when present is hydrogen or substituted linear or branched $C_{1-15}$ alkyl;

X is a bond, —O—, —S—, or —NR$_5$, wherein R$^5$ is optionally substituted linear or branched $C_{1-6}$ alkyl;

$R_3$ is optionally substituted linear or branched $C_{1-6}$ alkyl, aryl, or heteroaryl; and y is an integer with a value between 1 and 1,000,000.

13. The method of claim 12, wherein said polymer comprises the structural unit of Formula VIII

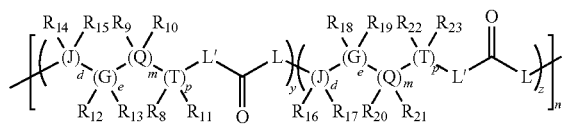

wherein, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, and $R_{23}$ in each instance, are absent or present, and when present are independently selected from the group consisting of hydrogen and optionally substituted linear or branched $C_{1-15}$ alkyl;

L and L' are each independently a bond or 0;

J, G, Q, and T are each independently selected from the group consisting of carbon, oxygen, (C=O), arene, and cycloalkane;

d, e, m and p, in each instance, are independently an integer between 0 and 20;

wherein at least one of d, e, m, and p is other than 0;

at least one of $R_8$, $R_9$, $R_{10}$, $R_{11}$, $R_{12}$, $R_{13}$, $R_{14}$, and $R_{15}$ is

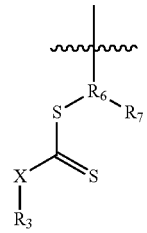

wherein the wavy line denotes the point of attachment of $R_6$ to the polymer backbone;

$R_6$ is a bond, or substituted linear or branched $C_{1-15}$ alkyl;

$R_7$ is absent or present, and when present is hydrogen or substituted linear or branched $C_{1-15}$ alkyl;

X is a bond, —O—, —S—, or —NR$_5$, wherein R$^5$ is optionally substituted linear or branched $C_{1-6}$ alkyl;

$R_3$ is optionally substituted linear or branched $C_{1-6}$ alkyl, aryl, or heteroaryl;

z and y are integers from 1 to 1,000,000, wherein the ratio of z:y is in the range from about 100,000:1 to about 1:1; and n is an integer from 1 to 500,000.

14. The method of claim 13, wherein said polymer comprises the structural unit

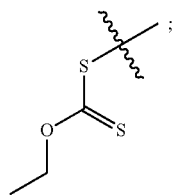

wherein * denotes possible points of attachment of

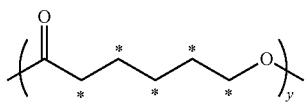

and y is an integer from 1 to 1,000,000.

15. The method of claim 14, wherein said polymer comprises the structural unit

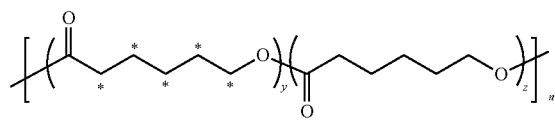

wherein * denotes possible points of attachment of

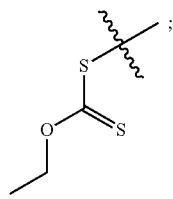 [SMILES: *SC(=S)OCC]

z and y are integers from 1 to 1,000,000, wherein the ratio of z:y is in the range from about 100,000:1 to about 1:1; and n is an integer from 1 to 500,000.

16. The method of claim 1, wherein $R_1$ is —$COR_4$ or —$SO_2R_4$, and $R_4$ is optionally substituted aryl or heteroaryl.

17. The method of claim 16, wherein $R_1$ is —$COR_4$ and $R_4$ is aryl substituted one, two, or three times with $CF_3$.

18. The method of claim 17, wherein $R_4$ is

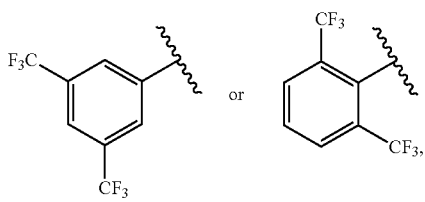 [SMILES: *c1cc(C(F)(F)F)cc(C(F)(F)F)c1 ; *c1c(C(F)(F)F)cccc1C(F)(F)F]

wherein the wavy line denotes the point of attachment.

19. The method of claim 1, wherein $R_2$ is optionally substituted linear or branched $C_{1-6}$ alkyl.

20. The method of claim 1, wherein —X—$R^3$ is selected from the group consisting of —$OCF_2CF_3$, —$OCH_2CH_3$, —$N(CH_2CH_3)_2$, —$SCH_2CH_3$, and phenyl.

21. The method of claim 20, wherein said compound of Formula I has the structure

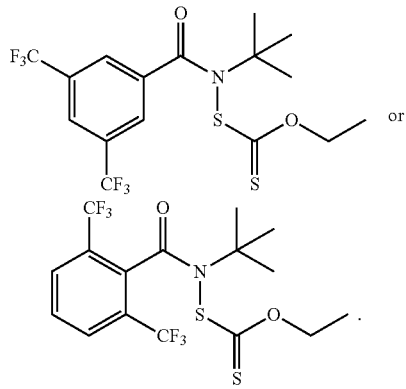

22. The method of claim 1, wherein said contacting occurs in the presence of a free radical initiator selected from the group consisting of halogen molecules, azo compounds, organic and inorganic peroxides, heat, and light.

23. The method of claim 22, wherein said free radical initiator is an organic peroxide or a wavelength of light.

24. The method of claim 23, wherein said wavelength of light is between about 250 nm and about 500 nm.

25. The method of claim 1, wherein said method is conducted at a temperature in a range from about 0° C. to about 300° C.

26. The method of claim 1, wherein said compound of Formula I is present in a range from about 1 mol % to about 50 mol % compared to a polymer repeat unit.

27. A xanthylated polymer comprising at least one structural unit of Formula II

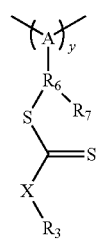

II wherein,
y is an integer with a value between 1 and 1,000,000;
$R_6$ is a bond, or substituted linear or branched $C_{1-15}$ alkyl;
$R_7$ is absent or present, and when present is hydrogen or substituted linear or branched $C_{1-15}$ alkyl;
X is a bond, —O—, or —S—;
$R_3$ is optionally substituted linear or branched $C_{1-6}$ alkyl, aryl, or heteroaryl;
A is a repeat unit of a polymer covalently bound to the xanthate, selected from the group consisting of

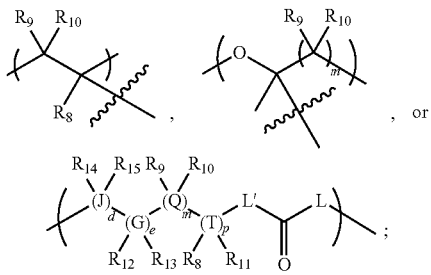

$R_8$, $R_9$, $R_{10}$, $R_{11}$, $R_{12}$, $R_{13}$, $R_{14}$, and $R_{15}$ in each instance, are absent or present, and when present are independently selected from the group consisting of hydrogen and optionally substituted linear or branched $C_{1-15}$ alkyl;
L and L' are each independently a bond or O;
J, G, Q, and T are independently selected from the group consisting of carbon, oxygen, (C=O), arene, and cycloalkane;
d, e, m and p, in each instance, are independently an integer between 0 and 20;
wherein at least one of d, e, m, and p is other than 0;
at least one of J, G, Q, and T is a carbon covalently bound to $R_6$; and
wherein the wavy line denotes the point of attachment of $R_6$ to the polymer backbone.

28. A xanthylated polymer comprising at least one structural unit of Formula II

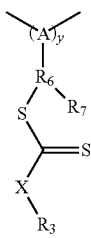

II wherein,
y is an integer with a value between 1 and 1,000,000;
$R_6$ is a bond, or substituted linear or branched $C_{1-15}$ alkyl;
$R_7$ is absent or present, and when present is hydrogen or substituted linear or branched $C_{1-15}$ alkyl;
X is —$NR^5$, wherein $R^5$ is optionally substituted linear or branched $C_{1-6}$ alkyl;
$R_3$ is aryl or heteroaryl;
A is a repeat unit of a polymer covalently bound to the xanthate, selected from the group consisting of

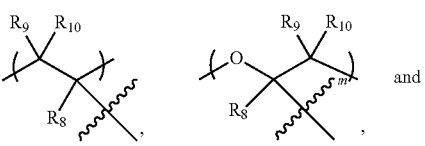

and

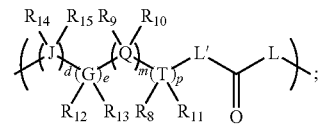

$R_8$, $R_9$, $R_{10}$, $R_{11}$, $R_{12}$, $R_{13}$, $R_{14}$, and $R_{15}$ in each instance, are absent or present, and when present are independently selected from the group consisting of hydrogen and optionally substituted linear or branched $C_{1-15}$ alkyl;
L and L' are each independently a bond or O;
J, G, Q, and T are independently selected from the group consisting of carbon, oxygen, (C=O), arene, and cycloalkane;
d, e, m and p, in each instance, are independently an integer between 0 and 20;
wherein at least one of d, e, m, and p is other than 0;
at least one of J, G, Q, and T is a carbon covalently bound to $R_6$; and
wherein the wavy line denotes the point of attachment of $R_6$ to the polymer backbone.

* * * * *

UNITED STATES PATENT AND TRADEMARK OFFICE
CERTIFICATE OF CORRECTION

PATENT NO. : 11,390,721 B2  
APPLICATION NO. : 16/753390  
DATED : July 19, 2022  
INVENTOR(S) : Erik Alexanian et al.

Page 1 of 1

It is certified that error appears in the above-identified patent and that said Letters Patent is hereby corrected as shown below:

In the Claims

At Claim 12, Column 66, Line 20, delete "$NR_5$" and insert -- $NR^5$ --, therefor.  
At Claim 13, Column 66, Line 42, delete "or 0" and insert -- or O --, therefor.  
At Claim 13, Column 66, Line 66, delete "$NR_5$" and insert -- $NR^5$ --, therefor.  
At Claim 27, Column 69, Line 15, delete "or" and insert -- and --, therefor.  
At Claim 28, Column 70, Lines 15-20, delete

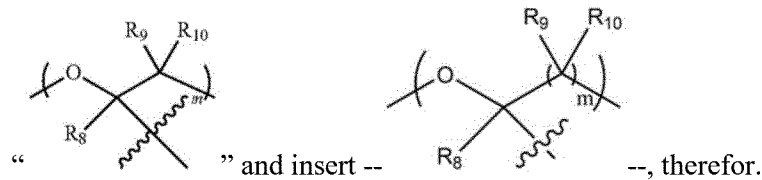

--, therefor.

Signed and Sealed this  
Twenty-first Day of November, 2023

Katherine Kelly Vidal  
*Director of the United States Patent and Trademark Office*